US012594860B2

(12) United States Patent
Mochizuki

(10) Patent No.: US 12,594,860 B2
(45) Date of Patent: Apr. 7, 2026

(54) VEHICLE SEAT DEVICE

(71) Applicant: TS TECH CO., LTD., Asaka (JP)

(72) Inventor: Haruki Mochizuki, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 394 days.

(21) Appl. No.: 18/246,975

(22) PCT Filed: Aug. 23, 2021

(86) PCT No.: PCT/JP2021/030765
§ 371 (c)(1),
(2) Date: Mar. 28, 2023

(87) PCT Pub. No.: WO2022/070670
PCT Pub. Date: Apr. 7, 2022

(65) Prior Publication Data
US 2023/0382274 A1     Nov. 30, 2023

Related U.S. Application Data

(60) Provisional application No. 63/199,300, filed on Dec. 18, 2020, provisional application No. 63/198,099, filed on Sep. 29, 2020.

(30) Foreign Application Priority Data

Mar. 18, 2021   (JP) ................................. 2021-045107
Mar. 29, 2021   (JP) ................................. 2021-056158
(Continued)

(51) Int. Cl.
*B60N 2/14*     (2006.01)
*B60N 2/56*     (2006.01)
*B60N 2/90*     (2018.01)

(52) U.S. Cl.
CPC ................. *B60N 2/14* (2013.01); *B60N 2/56* (2013.01); *B60N 2/90* (2018.02)

(58) Field of Classification Search
CPC ............... B60N 2/14; B60N 2/90; B60N 2/56
See application file for complete search history.

(56) References Cited

U.S. PATENT DOCUMENTS

2009/0033130 A1   2/2009   Marquette et al.
2017/0029062 A1   2/2017   Tada
2022/0032823 A1   2/2022   Mochizuki et al.

FOREIGN PATENT DOCUMENTS

JP        H10217811  A     8/1998
JP        2002160556        6/2002
(Continued)

OTHER PUBLICATIONS

PCT International Search Report (w/ English translation) and Written Opinion for corresponding PCT Application No. PCT/JP2021/030765, mailed Nov. 9, 2021, 10 pages.
(Continued)

*Primary Examiner* — Anthony D Barfield
(74) *Attorney, Agent, or Firm* — Dority & Manning, P.A.

(57) ABSTRACT

A vehicle seat device includes a rotating member rotatably supported by a base member via a rotary support part; a pressure receiving member supported by a seat cushion frame on the rotating member and receives the load of a seat cushion; and a rotary drive actuator that brings power for rotating the rotating member, wherein another actuator distinct from the rotary drive actuator is disposed to avoid a position overlapping with the rotary drive actuator in plan view. Thereby, the vehicle seat device can avoid increase in height even when another actuator is provided in addition to the rotary drive actuator.

10 Claims, 36 Drawing Sheets

(30)        Foreign Application Priority Data

Mar. 30, 2021    (JP) ................................. 2021-058085
Mar. 30, 2021    (JP) ................................. 2021-058086

(56)              References Cited

FOREIGN PATENT DOCUMENTS

| | | |
|---|---|---|
| JP | 2004123044 | 4/2004 |
| JP | 2017030465 | 2/2017 |
| JP | 2018016259 | 2/2018 |
| JP | 2019043292 | 3/2019 |
| JP | 202008315 | 6/2020 |
| JP | 2020090267 A | 6/2020 |
| JP | 2020131870 A | 8/2020 |
| JP | 2020132093 | 8/2020 |
| JP | 2020147171 | 9/2020 |
| WO | WO2018021579 | 2/2018 |
| WO | WO2020110984 | 6/2020 |

OTHER PUBLICATIONS

Japanese Office Action for Application No. 2021-056158 Dated Dec. 18, 2024.
Japanese Office Action for Application No. 2021-058085 Dated Nov. 22, 2024.
Japanese Office Action for Application No. 2021-045107 Dated Dec. 18, 2024.

rear right ← → left front

<u>lock state</u>

14X

<u>unlock state</u>

*Fig.15* lock state

(A)

(B)

unlock state (A)

(B)

(A)

(B)

<u>lock state</u>

(A)

(B)

unlock state

(A)

(B)

lock state unlock state

VEHICLE SEAT DEVICE

CROSS REFERENCE TO RELATED APPLICATIONS

This application is the U.S. National Stage entry of International Application No. PCT/JP2021/030765, filed on Aug. 23, 2021, which, in turn, claims priority to U.S. Provisional Patent Application No. 63/198,099, filed on Sep. 29, 2020; U.S. Provisional Patent Application No. 63/199, 300, filed on Dec. 18, 2020; Japanese Patent Application No. 2021-045107, filed on Mar. 18, 2021; Japanese Patent Application No. 2021-056158, filed on Mar. 29, 2021; Japanese Patent Application No. 2021-058085, filed on Mar. 30, 2021; and Japanese Patent Application No. 2021-058086, filed on Mar. 30, 2021; all of which are hereby incorporated herein by reference in their entireties for all purposes.

TECHNICAL FIELD

The present invention relates to a vehicle seat device including a base member, a rotating member rotatably supported on the base member via an annular rotary support part, a seat cushion frame provided on the rotating member, a pressure receiving member supported on the seat cushion frame to receive a load of a seat cushion, and a rotary drive actuator that exerts power for rotating the rotating member.

BACKGROUND ART

Such a vehicle seat device is disclosed in Patent Document 1, for example. Also, a vehicle seat device including an actuator that exerts power for making the vehicle seat slide along the slide rails is disclosed in Patent Document 2. Further, a vehicle seat device including an air conditioner for supplying cooling air to the seat cushion is disclosed in Patent Document 3.

PRIOR ART DOCUMENT(S)

Patent Document(s)

Patent Document 1: JP2004-123044A
Patent Document 2: JP2017-30465A
Patent Document 3: JP2019-43292A
Patent Document 4: JP2002-160556A
Patent Document 5: WO2020/110984A1

SUMMARY OF THE INVENTION

Task to be Accomplished by the Invention

<First Task>
In addition to the function of rotating the seat cushion as disclosed in the aforementioned Patent Document 1, the vehicle seat device may be provided with a function of causing the seat cushion to slide as disclosed in Patent Document 2, and in such a case, it is not desirable if arrangement of multiple actuators increases the height of the vehicle seat device.

The present invention was made in view of such circumstances, and a first object thereof is to provide a vehicle seat device which can avoid increase in height even when another actuator is provided in addition to the rotary drive actuator.

<Second Task>
Incidentally, in the vehicle seat device disclosed in Patent Document 1, an arc-shaped rotating gear is fixed to a rotation mechanism main body (which corresponds to the base member of the invention of the present application) that supports a rotating ring (which corresponds to the rotating member the invention of the present application), and the rotary drive actuator is mounted on a bracket extending out from the rotating ring and such that the rotary drive actuator is disposed outside of the rotation mechanism main body and the output gear of the actuator meshes with the rotating gear. As a result, the vehicle seat device becomes large in a direction perpendicular to the rotation axis of the rotating member.

Also, in a vehicle seat device provided with an air conditioner as disclosed in Patent Document 3, it is desired to efficiently supply cooling air to the seat cushion to enhance the cooling efficiency.

The present invention was made in view of such circumstances, and a second object thereof is to provide a vehicle seat device which is compact in the direction perpendicular to the rotation axis of the rotating member and enables efficient cooling of the seat cushion.

<Third Task>
Incidentally, as described in Patent Documents 4 and 5 for example, there is conventionally known a vehicle seat device including: a base body provided to be capable of being fixed to a floor portion of a vehicle body; a rotary support body which is joined to a seat body to rotate integrally and supports the seat body; a bearing that supports the rotary support body on the base body to be rotatable about a vertical axis; a lock mechanism provided between the base body and the rotary support body to be capable of selectively locking the rotary support body in one of multiple rotation positions; a rattling suppression member which, in a state in which the rotary support body is locked in the rotation position by the lock mechanism, closely contacts the base body and the rotary support body to suppress rattling of the rotary support body; and an interlocking member which interlocks the rattling suppression member with the lock mechanism such that the rattling suppression member releases the close contact state with the base body and the rotary support body in response to the lock mechanism unlocking the rotation position of the rotary support body, wherein particularly, a deformation suppression mechanism which allows rotation of the rotary support body relative to the base body but suppresses excessive deformation of the rotary support body in a radially outward direction is interposed between the rotary support body and the base body. Note that in such a vehicle seat device, "a radial direction" refers to a radial direction of an imaginary circle having a center on the rotation axis of the rotary support body (and hence the seat body), and "a circumferential direction" refers to a circumferential direction of the imaginary circle.

However, in the conventional device, the rattling suppression member is disposed, relative to the deformation suppression mechanism and the bearing, in a substantially same position or in an inner position with respect to the radial direction, namely, disposed on a relatively inner side in the radial direction, and therefore, there are following problems. Namely, when the rattling suppression member closely contacts the base body and the rotary support body to suppress rattling of the rotary support body in the state in which the rotation position of the rotary support body is locked, the farther the contact action points of the rattling suppression member with the rotary support body and the base body are from the rotational center of the rotary support body, the more effectively (or more strongly) the suppression effect is exerted due to the lever ratio. Therefore, in the structure in which the rattling suppression member is disposed on an inner side in the radial direction as in the conventional device, the rattling suppression effect could not be expected sufficiently.

The present invention was made in view of such circumstances, and a third object thereof is to provide a vehicle seat device capable of solving the above problems of the conventional device with a simple structure.

<Fourth Task>

As described above, in the conventional device as described in Patent Documents 4, 5, since the rattling suppression member is disposed, relative to the bearing, in a substantially same position or in an inner position (namely, on an inner side in the radial direction) with respect to the radial direction, the rattling suppression effect could not be expected sufficiently.

Thus, to enhance the rattling suppression effect, it may be conceived to dispose the rattling suppression member on a radially outer side of the bearing, but this arrangement alone is not sufficient for rattling suppression. Namely, the present inventor has clarified that rattling suppression measures should be taken by taking into account a change of load distribution that the rotary support body receives from the seat body due to the weight shift of the occupant seated on the seat in the forward, rearward, leftward, and rightward directions.

For example, in a case where the seat body receives an uneven load as a result of forward, rearward, leftward, or rightward leaning of the seated occupant or the like, a force that causes a part of the rotary support body on an outer side of the bearing to sink downward is applied directly under a part of the seat body where the load distribution is high (namely, right under a load input point from the seat body to the rotary support body), while a force in a direction to cause the part of the rotary support body on an outer side of the bearing to lift upward to be separated from the base body is applied directly under a part of the seat body where the load distribution is low (namely, right under the aforementioned load input point). Such an uneven application of force may cause rattling in the rotary support body.

The present invention is proposed in view of the above, and a fourth object thereof is to provide a vehicle seat device capable of solving the above problems of the conventional device with a simple structure.

Means to Accomplish the Task

<Means to Accomplish the First Task and Effect Thereof>

To achieve the first object, the present invention has a first feature that a vehicle seat device comprises: base member; a rotating member rotatably supported by the base member via an annular rotary support part; a seat cushion frame provided on the rotating member; a pressure receiving member supported by the seat cushion frame to receive a load of a seat cushion; and a rotary drive actuator that exerts power to rotate the rotating member, wherein an other actuator which is distinct from the rotary drive actuator is disposed to avoid a position overlapping with the rotary drive actuator in plan view. According to this first feature, the rotary drive actuator and the other actuator do not overlap vertically, and therefore, increase in height of the vehicle seat device can be avoided.

Further, the present invention has, in addition to the first feature, a second feature that the rotary drive actuator is disposed rearward of the other actuator in a state in which the seat cushion frame is in a forward-facing position where an occupant on the seat cushion faces in a forward direction of a vehicle. According to this second feature, the rotary drive actuator is positioned rearward of the other actuator in the state in which the seat cushion frame is in the forward-facing position, and thus, the second feature can contribute to making the vehicle seat device compact in the vehicle width direction.

Further, the present invention has, in addition to the second feature, a third feature that the seat cushion frame comprises a pair of side frames spaced from each other and extending in parallel to each other and a pan frame coupling one end portions of these side frames, wherein in the state in which the seat cushion frame is in the forward-facing position, the rotary drive actuator is disposed in a position rearward of the pan frame, and the other actuator is disposed below the pan frame. According to this third feature, it is possible to contribute to making the vehicle seat device compact in the lateral direction perpendicular to the longitudinal direction of the side frames, while avoiding increase in size of the vehicle seat device in the longitudinal direction of the side frames due to arrangement of the other actuator.

Further, the present invention has, in addition to the third feature, a fourth feature that the other actuator is disposed closer to one of the side frames than a central part between the pair of side frames, and the rotary drive actuator is disposed closer to the central part between the pair of side frames than the other actuator is. According to this fourth feature, the rotary drive actuator and the other actuator can be disposed together in a compact manner by being displaced toward one of the pair of side frames.

Further, the present invention has, in addition to the first to fourth features, a fifth feature that the rotary drive actuator is disposed inside the rotary support part in plan view, and the other actuator is disposed outside the rotary support part in plan view. According to this fifth feature, the rotary drive actuator and the other actuator can be effectively disposed to avoid mutual interference between them.

Further, the present invention has, in addition to the third feature, a sixth feature that an ECU which controls activation of the rotary drive actuator and the other actuator is disposed below the pan frame. According to this sixth feature, in the state in which the seat cushion frame is in the forward-facing position, the rotary drive actuator is positioned in a position rearward of the pan frame, and the other actuator and the ECU are positioned below the pan frame. Therefore, it is possible to contribute to making the vehicle seat device compact in the lateral direction perpendicular to the longitudinal direction of the side frames while avoiding increase in size of the vehicle seat device in the longitudinal direction of the side frames due to arrangement of the other actuator and the ECU.

Further, the present invention has, in addition to the third feature, a seventh feature that a blower that supplies cooling air to the seat cushion is disposed below the pan frame. According to this seventh feature, in the state in which the seat cushion frame is in the forward-facing position, the rotary drive actuator is positioned rearward of the pan frame and the other actuator and the blower is positioned below the pan frame. Therefore, it is possible to contribute to making the vehicle seat device compact in the lateral direction perpendicular to the longitudinal direction of the side frames while avoiding increase in size of the vehicle seat device in the longitudinal direction of the side frames due to arrangement of the other actuator and the blower.

Further, the present invention has, in addition to any one of the first to seventh features, an eighth feature that the rotary drive actuator is mounted on an actuator support plate fixed to the rotating member, and the other actuator is disposed in a position forward of the actuator support plate in the state in which the seat cushion frame is in the forward-facing position. According to this eighth feature, it is possible to arrange the actuator support plate and the other actuator so as not to overlap in the up-down direction, thereby to contribute to making the vehicle seat device compact in the up-down direction.

<Means to Accomplish the Second Task and Effect Thereof>

To achieve the second object, the present invention has a first feature that a vehicle seat device comprises: a base member (29), a rotating member (30) rotatably supported by the base member (29) via an annular rotary support part (36); a seat cushion frame (16) provided on the rotating member (30); a pressure receiving member (19) supported by the seat cushion frame (16) to receive a load of a seat cushion (11a); and a rotary drive actuator (55) which exerts power to rotate the rotating member (30), wherein the rotary drive actuator (55) and a connection port (67) formed in the pressure receiving member (19) are arranged inside the rotary support part (36) in plan view, and a blower (69, 97) of an air conditioner (68, 96) that supplies air to the seat cushion (11a) from below is connected to the connection port (67). According to this first feature, since the rotary drive actuator is disposed inside the rotary support part in plan view, the vehicle seat device can be made compact in the direction perpendicular to the rotation axis of the rotating member, and since the connection port to which the blower of the air conditioner is connected is formed in the pressure receiving member so as to be disposed inside the rotary support part in plan view, the cooling air can be effectively sent to various parts of the seat cushion so that the cooling efficiency can be improved. Further, the present invention has, in addition to the first feature, a second feature that the rotary drive actuator (55) is disposed to avoid a position overlapping with the connection port (67) and the blower (69, 97) in plan view. According to this second feature, the rotary drive actuator does not vertically overlap with the connection port and the blower, and therefore, the vehicle seat device can be made compact in the up-down direction.

Further, the present invention has, in addition to the second feature, a third feature that an actuator support plate (62) that supports the rotary drive actuator (55) is fixed to the rotating member (30) so as to avoid a position overlapping with the connection port (67) and the blower (69, 97) in plan view. According to this third feature, since the actuator support plate fixed to the rotating member does not vertically overlap with the connection port and the blower, and the rotary drive actuator is supported by the actuator support plate, it is possible to contribute to making the vehicle seat device compact in the up-down direction.

Further, the present invention has, in addition to the third feature, a fourth feature that the seat cushion frame (16) comprises a pair of side frames (16a) spaced from each other and extending in parallel to each other, and the rotary drive actuator (55) is disposed in a position displaced from the connection port (67) and the blower (69, 97) in a longitudinal direction of the side frames (16a) in plan view. According to this fourth feature, since the rotary drive actuator is disposed to be displaced from the connection port and the blower in the longitudinal direction of the pair of side frames of the seat cushion frame, it is possible to avoid enlargement of the vehicle seat device in the lateral direction perpendicular to the side frames.

Further, the present invention has, in addition to the fourth feature, a fifth feature that the rotary drive actuator (55) is disposed in a position forward of a rotational center (C) of the rotating member (30) in a state in which the seat cushion frame (16) is in a forward-facing position where an occupant on the seat cushion (11a) faces in a forward direction of a vehicle, and the connection port (67) and the blower (69, 97) are arranged in positions rearward of the rotary drive actuator (55). According to this fifth feature, in the state in which the seat cushion frame is in the forward-facing position, the rotary drive actuator is disposed forward of the rotational center of the rotating member, and the connection port and the blower are positioned rearward of the rotary drive actuator, and therefore, it is possible to avoid enlargement of the vehicle seat device in the vehicle width direction.

Further, the present invention has, in addition to any one of the first to fifth features, a sixth feature that the connection port (67) is formed in the pressure receiving member (19) in a shape surrounding the rotational center (C) of the rotating member (30) in plan view. According to this sixth feature, since the connection port is in a shape surrounding the rotational center of the rotating member in plan view, the connection port is disposed in a position corresponding to the substantially central part of the seat cushion, and therefore, it is possible to supply cooling air to various parts of the seat cushion more effectively and to further improve the cooling efficiency.

Further, the present invention has, in addition to the sixth feature, a seventh feature that the blower (69) is mounted on a lower surface of the pressure receiving member (19) while being disposed directly under the connection port (67). According to this seventh feature, since the blower is mounted on the lower surface of the pressure receiving member directly under the connection port, it is possible to make the air conditioner compact, while making a special component part for supporting the blower unnecessary thereby to reduce the number of component parts.

Further, the present invention has, in addition to any one of the first to sixth features, an eighth feature that a seating sensor (71) is mounted on the pressure receiving member (19) in a position above the rotary drive actuator (55) and not overlapping with the connection port (67) and the blower (69, 97) in plan view. According to this eighth feature, since the seating sensor is mounted on the pressure receiving member in a position above the rotary drive actuator and not overlapping with the connection port and the blower in plan view, it is possible to avoid decrease of strength of the pressure receiving member at the part where the seating sensor is mounted as much as possible.

Further, the present invention has, in addition to any one of the first to eighth features, a ninth feature that in a state in which the seat cushion frame (16) is in a forward-facing position where an occupant on the seat cushion (11a) faces in a forward direction of a vehicle, the rotary drive actuator (55) is disposed rearward of an other actuator (73) disposed to correspond to a front portion of the seat cushion frame (16) while avoiding overlap with the other actuator (73) in plan view. According to this ninth feature, it is possible to arrange the rotary drive actuator and the other actuator so as not to overlap with each other in the up-down direction in the state in which the seat cushion frame is in the forward-facing position, thereby to contribute to making the vehicle seat device compact in the up-down direction.

<Means to Accomplish the Third Task and Effect Thereof>

To achieve the third object, the present invention has a first feature that a vehicle seat device comprises: a base body (140) provided to be fixable to a floor portion (116) of a vehicle body; a rotary support body (130) which is joined to a seat body (S) so as to rotate integrally and supports the seat body (S); a bearing (145) which supports the rotary support body (130) on the base body (140) to be rotatable about a vertical axis; a lock mechanism (L) which is provided between the base body (140) and the rotary support body (130) and is capable of selectively locking the rotary support body (130) in one of multiple rotation positions; a rattling suppression member (170) which, in a state in which a rotation position of the rotary support body (130) is locked by the lock mechanism (L), suppresses rattling of the rotary support body (130) by closely contacting the base body (140) and the rotary support body (130); and an interlocking member (160) which interlocks the rattling suppression member (170) with the lock mechanism (L) such that the rattling suppression member (170) releases a close contact state with the base body (140) and the rotary support body (130) in response to the lock mechanism (L) unlocking the rotation position, wherein a deformation suppression mechanism (H) which allows rotation of the rotary support body (130) relative to the base body (140) but suppresses excessive deformation of the rotary support body (130) outward in a radial direction is interposed between the rotary support body (130) and the base body (140) in a position outward of the bearing (145) in the radial direction, and the rattling suppression member (170) is disposed between the deformation suppression mechanism (H) and the bearing (145) in the radial direction or to straddle a space between the deformation suppression mechanism (H) and the bearing (145) and an inside of the deformation suppression mechanism (H). According to this first feature, the contact action points of the rattling suppression member with the rotary support body and the base body can be located distant from the rotational center of the rotary support body, and therefore, the rattling suppression effect of the rattling suppression member can be exerted more strongly than in the conventional device due to the lever ratio from the rotational center.

Further, the present invention has, in addition to the first feature, a second feature that the rattling suppression member (170) is configured by integrally joining a main body part (171) which can be pushed in and press-contacted between a first receiving part (181) provided on the base body (140) and a second receiving part (182) provided on the rotary support body (130) and a driven part (172) which receives, from a drive part (162) of the interlocking member (160), a driving force for driving the main body part (171) in a direction opposite to a direction of pushing in between the first and second receiving parts (181, 182) to disable the rattling suppression member (170) at the time of unlocking, wherein the main body part (171) and the driven part (172) are arranged in parallel to each other in a direction perpendicular to a direction in which they rotate in conjunction with the rotary support body (130). According to this second feature, in the rattling suppression member, the main body part for rattling suppression and the driven part for receiving a driving force (unlocking force) from the interlocking member at the time of unlocking are arranged in parallel in the direction perpendicular to their rotation direction so that the functions are divided therebetween. As a result, optimal design in accordance with the respective functions of the main body part and the driven part is possible, and this increases the degree of design freedom of the rattling suppression member.

Further, the present invention has, in addition to the second feature, a third feature that the main body part (171) and the driven part (172) are arranged to be parallel to each other in the radial direction. According to this third feature, since the parallel arrangement direction of the main body part and the driven part is a radial direction of the rotary support body, even though the main body part and the driven part are arranged in parallel, the rattling suppression member can be vertically flattened as a whole, and therefore, can be disposed in a narrow space between the rotary support body and the base body without difficulty.

Further, the present invention has, in addition to the second feature, a fourth feature that the interlocking member (160) has the drive part (162) between the deformation suppression mechanism (H) and the bearing (145) in the radial direction. According to this fourth feature, the drive part of the interlocking member can be disposed in a position close to the driven part of the rattling suppression member, and therefore, at the time of unlocking, the interlocking member (drive part) can efficiently drive the rattling suppression member (driven part).

Further, the present invention has, in addition to the second feature, a fifth feature that a spring (176) which gives the rattling suppression member (170) an elastic force capable of pushing the main body part (171) in between the first and second receiving parts (181, 182) to be press-contacted therewith and a spring support member (177) which supports the base end of the spring (176) on the rotary support body (130) are provided in positions where mutual interference between the deformation suppression mechanism (H) and each of the spring (176) and the spring support member (177) can be avoided. According to this fifth feature, even with the structure for spring-urging the rattling suppression member in one circumferential direction, the spring and the spring support member thereof can be supported on the rotary support body without difficulty while avoiding interference with the deformation suppression mechanism.

Further, the present invention has, in addition to the second feature, a sixth feature that the first and second receiving parts (181, 182) are arranged to oppose each other in an up-down direction so as to sandwich the main body part (171) in the up-down direction when the main body part (171) is pushed in and press-contacted between the receiving parts (181, 182), a receiving surface (172*f*) of the driven part (172) consists of a first inclined surface which is inclined downward toward the drive part (162) in a circumferential direction of the rotary support body (130), and a pressure contact surface (171*f*2) of the main body part (171) that can be press-contacted with a lower receiving part (182) of the first and second receiving parts (181, 182) consists of a second inclined surface which is inclined upward toward the lower receiving part (182) in the circumferential direction. According to this sixth feature, at the time of unlocking, the drive part of the interlocking member drives the receiving surface of the driven part (namely, the first inclined surface) in the reverse direction while pushing it downward. Due to this driving, the pressure contact surface of the main body part of the rattling suppression member (namely, the second inclined surface) slides on the lower receiving part while descending, and therefore, the press-contacting state of the main body part with the upper receiving part can be removed quickly and easily. Thus, operation switching of the rattling suppression member to the temporary disabled state is performed smoothly.

Further, the present invention has, in addition to the second feature, a seventh feature that the interlocking member (160) is formed in a circular annular shape to pass between the deformation suppression mechanism (H) and the bearing (145) in the radial direction and is supported by the rotary support body (130) to be relatively rotatable, the interlocking member (160) is formed with one or multiple slits (161s) arranged in the radial direction and extending in the circumferential direction of the rotary support body (130), wherein an upper portion (172a) of the driven part (172) is fitted in the slit (161s) to be slidable in the circumferential direction. According to this seventh feature, when the rotary support body is locked again in the predetermined rotation position from a temporary unlock state and the main body part of the rattling suppression member is pushed in and press-contacted between the first and second receiving parts, the driven part is slidably fitted in the aforementioned slit, whereby lateral shaking is suppressed effectively. Thus, the rattling suppression member can make the main body part be press-contacted with the first and second receiving parts properly while maintaining a stable posture.

Further, the present invention has, in addition to the fifth feature, an eighth feature that the interlocking member (160) is formed in a circular annular shape to pass between the deformation suppression mechanism (H) and the bearing (145) in the radial direction, multiple rattling suppression members (170) each consisting of the above rattling suppression member are provided to be spaced in the circumferential direction of the rotary support body (130), multiple spring support members (177) corresponding to these rattling suppression members (170) and each consisting of the above spring support member are fixed to the rotary support body (130) to be spaced in the circumferential direction, and the spring support members (177) each have an interlocking member receiving part (177ha) that supports the interlocking member (160) to be relatively rotatable. According to this eighth feature, the spring support members can be used as means for supporting the interlocking member having a circular annular shape, which can contribute to simplifying the structure of the device.

Further, the present invention has, in addition to the second feature, a ninth feature that the deformation suppression mechanism (H) comprises a first hook (F1) fixedly provided on the base body (140) and a second hook (F2) fixedly provided on the rotary support body (130) to correspond to the first hook (F1), and is disposed such that the second hook (F2) is located outward of the first hook (F1) in the radial direction, and the first receiving part (181) is fixed to the base body (140) in a position inward of the first hook (F1) in the radial direction while the second receiving part (182) is fixed to the rotary support body (130) to be on a lower side of the first receiving part (181) so that the main body part (171) can be sandwiched between the first and second receiving parts (181, 182) in the up-down direction. According to this ninth feature, even though the whole of the rattling suppression member is radially disposed between the bearing and the deformation suppression mechanism, it is possible to ensure that in the narrow space between them, the first and second receiving parts have effective receiving surfaces that are sufficiently wide in the radial direction, and the rattling suppression effect can be enhanced.

Further, the present invention has, in addition to the ninth feature, a tenth feature that a rear surface of the first receiving part (181) is supported by the first hook (F1). According to this tenth feature, since the rear surface of the first receiving part is supported by the first hook, the first hook can be used as reinforcing support means for the first receiving part, and therefore, it is possible to simplify the structure of the device while enhancing the support stiffness of the first receiving part.

Further, the present invention has, in addition to the second feature, an eleventh feature that the deformation suppression mechanism (H) comprises a first hook (F1) fixedly provided on the base body (140) to integrally include the first receiving part (181) and a second hook (F2) fixedly provided on the rotary support body (130) to integrally include the second receiving part (182) and is disposed such that the first hook (F1) is located outward of the second hook (F2) in the radial direction and the second receiving part (182) is located lower than the first receiving part (181), the main body part (171) of the rattling suppression member (170) is disposed between the first and second hooks (F1, F2), the driven part (172) of the rattling suppression member (170) is disposed between the second hook (F2) and the bearing (145), and the main body part (171) can be sandwiched between the first and second receiving parts (181, 182) in the up-down direction. According to this eleventh feature, the first and second hooks themselves are respectively used as the first and second receiving parts, whereby the structure of the device is simplified, and further, the dead space between the first and second hooks can be effectively used as an installation space for a part (main body part) of the rattling suppression member, and thus, the feature can contribute to making the device compact accordingly.

Further, the present invention has, in addition to the eleventh feature, a twelfth feature wherein the main body part (171) and the driven part (172) are integrally joined to each other via a connecting portion (173) which extends outward in the circumferential direction of the deformation suppression mechanism (H) to be capable of avoiding mutual interference with the deformation suppression mechanism (H). According to this twelfth feature, even when arrangement is made such that the rattling suppression member (the main body part and the driven part) straddles inside and outside of the deformation suppression mechanism, the main body part and the driven part inside and outside thereof can be integrally joined by the aforementioned connecting portion without difficulty while avoiding interference with the deformation suppression mechanism.

<Means to Accomplish the Fourth Task and Effect Thereof>

To achieve the fourth object, the present invention has a first feature that a vehicle seat device comprises: a base body (240) coupled to and supported on a floor portion (216) of a vehicle body; a rotary support body (230) which is joined to a seat body (S) so as to rotate integrally and supports the seat body (S); a bearing (245) which supports the rotary support body (230) on the base body (240) to be rotatable about a vertical axis; a lock mechanism (L) which is provided between the base body (240) and the rotary support body (230) and is capable of selectively locking the rotary support body (230) in one of multiple rotation positions; a rattling suppression member (270) which, in a state in which the rotary support body (230) is locked in a rotation position by the lock mechanism (L), suppress rattling of the rotary support body (230) by being brought into a contact state in which the rattling suppression member closely contacts the rotary support body (230) and the base body (240); and an interlocking member (260) which interlocks the rattling suppression member (270) with the lock mechanism (L) such that the rattling suppression member (270) releases the contact state in response to the lock mechanism (L) unlocking the rotation position of the rotary support body (230), wherein the rattling suppression member (270) is disposed radially outward of the bearing (245), and at least a part of the rattling suppression member (270) is disposed in a position overlapping with a joint part (231) between the seat body (S) and the rotary support body (230) in plan view.

According to this first feature, since the rattling suppression member is disposed radially outward of the bearing, the contact action points of the rattling suppression member with the rotary support body and the base body can be located distant from the rotational center of the rotary support body, and therefore, the rattling suppression effect of the rattling suppression member can be exerted more strongly than in the conventional device according to the lever ratio from the rotational center. Also, even when the distribution of load received by the seat body becomes uneven due to weight shift of the occupant seated on the seat in the forward, rearward, leftward, and rightward directions and occurrence of rattling between the rotary support body and the base body is concerned, in the present invention, since particularly at least a part of the rattling suppression member is disposed in a position overlapping, in plan view, with the joint part between the seat body and the rotary support body, the rattling suppression member which is right under the joint part (namely, the load input point from the seat body to the rotary support body) can exert the rattling suppression effect more effectively, whereby rattling can be suppressed effectively.

Further, the present invention has, in addition to the first feature, a second feature that at least a part of the rattling suppression member (270) is disposed in a position overlapping, in plan view, with a coupling part (SL) with which the base body (240) is coupled to the floor portion (216). According to this second feature, the rattling suppression member is arranged to also overlap with the part where the base body which receives the rattling suppression member is coupled to the vehicle body floor portion, whereby the rattling suppression effect can be exerted more effectively and rattling can be suppressed more efficiently.

Further, the present invention has, in addition to the first feature, a third feature that a seat sitting part (Sc) of the seat body (S) where an occupant is to be seated is provided with left and right side frames (211a) constituting a skeleton of left and right side portions of the seat sitting part (Sc), and the joint part (231) is a joint part including bolts (231b) that join the left and right side frames (211a) to left and right side portions of the rotary support body (230), respectively. According to this third feature, since the joint part between the seat body and the rotary support body (namely, the aforementioned load input point) is a joint part including bolts that join the left and right side frames of the seat sitting part to the left and right side portions of the rotary support body, respectively, the rattling suppression member can be disposed directly under the firm load input part from each side frame to the rotary support body, and thus, the rattling suppression effect can be exerted effectively.

Further, the present invention has, in addition to the first feature, a fourth feature that the rotary support body (230) and the base body (240) are formed substantially rectangular in plan view, the rattling suppression member (270) includes a main body part (271) which is supported at each of four corner portions of the rotary support body (230) to be radially slidable and is movable between a predetermined rattling suppression position and a predetermined suppression release position, and the main body part (271) has a tapered tip (271a) which can be pushed in like a wedge and press-contacted between a first receiving part (281) fixed to each of the four corner portions of the base body (240) and a second receiving part (282) fixed to each of the four corner portions of the rotary support body (230). According to this fourth feature, the rattling suppression member and the first and second receiving parts which receive this can be arranged compactly by using the dead space at the four corners of the rotary support body and the base body each having a rectangular shape. Also, even when the main body part of the rattling suppression member is formed longer in the sliding direction thereof (radial direction), the main body part of the rattling suppression member not only can be arranged at each of the four corner portions of the rotary support body without difficulty but also can be extended to directly under the joint part positioned at each of the four corner portions without difficulty.

Further, the present invention has, in addition to the fourth feature, a fifth feature that a spring support member (277) which supports a spring (276) for always urging the main body part (271) toward the rattling suppression position is fixed at each of the four corner portions of the rotary support body (230), and the main body part (271) is supported by the spring support member (277) to be radially slidable. According to this fifth feature, the spring support member is also used as sliding guide means for the rattling suppression member, and this can contribute to simplifying the structure of the device accordingly.

Further, the present invention has, in addition to the fourth feature, a sixth feature that the interlocking member (260) is integrally provided with an interlocking member main body (261) which is formed in a circular ring plate shape, is disposed radially outward of and concentrically with the bearing (245), and is rotatable relative to the rotary support body (230) in accordance with locking/unlocking of the lock mechanism (L), and a drive part (262) which is connected to the interlocking member main body (261) and drives the main body part (271) to the suppression release position in response to the unlocking. According to this sixth feature, regardless of the circumferential position of the lock mechanism, the lock mechanism and the rattling suppression member can be linked by the interlocking member, and the degree of design freedom of the lock mechanism can be increased accordingly.

Further, the present invention has, in addition to the fourth feature, a seventh feature that a support frame (291) integrally including the second receiving part (282) and fixed to each of the four corner portions of the rotary support body (230) supports the main body part (271) to be radially slidable. According to this seventh feature, the support frame which also serves as the second receiving part is also used as sliding guide means for the rattling suppression member, and the feature can contribute to simplifying the structure of the device accordingly.

Further, the present invention has, in addition to the sixth feature, an eighth feature that a spring support member (277) that supports a spring (276) for always urging the main body part (271) toward the rattling suppression position is fixed at each of the four corner portions of the rotary support body (230), and the interlocking member main body (261) is supported by the spring support member (277) in a rotationally slidable manner. According to this eighth feature, the spring support member is also used as sliding support means for the interlocking member, and this can contribute to simplifying the structure of the device accordingly.

Further, the present invention has, in addition to the fourth feature, a ninth feature that the first and second receiving parts (281, 282) are arranged to oppose each other in an up-down direction, such that the tip (271a) can be inserted between the first and second receiving parts (281, 282) so as to be sandwiched in the up-down direction. According to this ninth feature, when the main body part of the rattling suppression member is pushed in and press-contacted between the first and second receiving parts, the main body part can be reliably sandwiched in the up-down direction, and therefore, vertical rattling of the rattling suppression member can be suppressed more effectively.

BRIEF DESCRIPTION OF THE DRAWINGS

Description of the Drawings Showing
Embodiment(s) of the Means to Accomplish the
First and Second Tasks

FIG. 5 is a sectional view taken along line 5-5 in FIG. 3.

FIG. 8 is a plan view of a second embodiment corresponding to FIG. 2.

Description of the Drawings Showing
Embodiment(s) of the Means to Accomplish the
Third Task

FIG. 14 is an enlarged view of a part indicated by arrow 14X in FIG. 12.

FIG. 15 is an enlarged view of a part indicated by arrow 15X in FIG. 13.

Description of the Drawings Showing
Embodiment(s) of the Means to Accomplish the
Fourth Task

LIST OF REFERENCE NUMERALS

Figure 1:
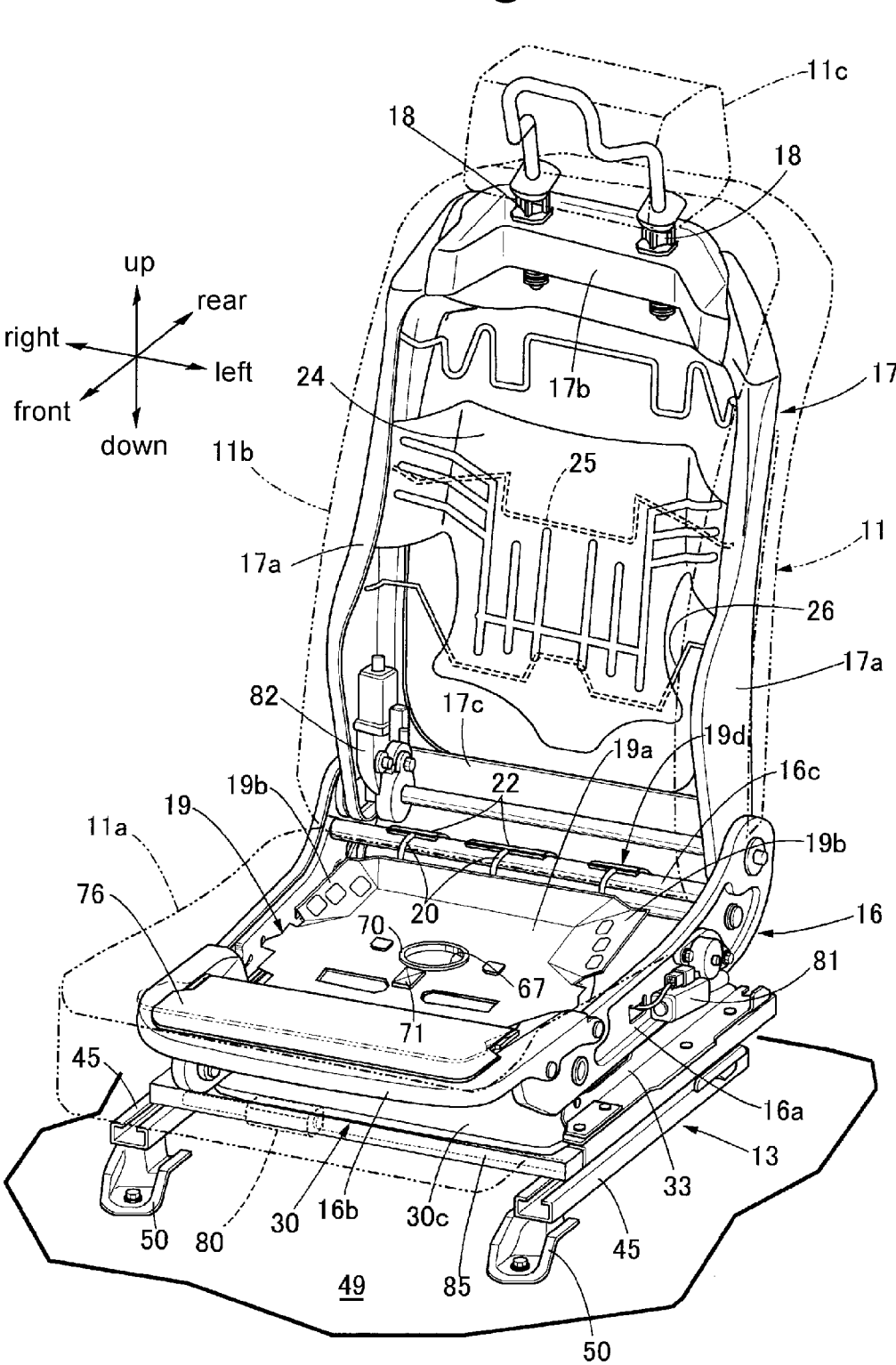
FIG. 1 is a perspective view showing a first embodiment of a vehicle seat device, with a seat body being omitted.

List of Reference Numerals in the Drawings
showing Embodiment(s) of the Means to
Accomplish the First Task

11a seat cushion
16 seat cushion frame

16*a* side frame
19 pressure receiving member
29 base member
30 rotating member
36 rotary support part
55 rotary drive actuator
62 actuator support plate
73 seat front portion tilt actuator as another actuator
95 ECU
97 blower List of Reference Numerals in the Drawings
showing Embodiment(s) of the Means to
Accomplish the Second Task 11*a* seat cushion
16 seat cushion frame
16*a* side frame
19 pressure receiving member
29 base member
30 rotating member
36 rotary support part
55 rotary drive actuator
62 actuator support plate
67 connection port
68, 96 air conditioner
69, 97 blower
71 seating sensor
73 seat front portion tilt actuator as another actuator
C rotational center List of Reference Numerals in the Drawings
showing Embodiment(s) of the Means to
Accomplish the Third Task F1, F2 first and second hooks
H deformation suppression mechanism
L lock mechanism
S seat body
110 seat device
116 floor portion
130 rotary support body
140 base body
145 bearing
160 interlocking member
161*s* slit
162 drive part
176 spring
177 spring support member
177*ha* interlocking member receiving part
170 rattling suppression member
171 the main body part
171*f2* pressure contact surface as second inclined surface
172 driven part
172*f* receiving surface as first inclined surface
172*a* upper portion of driven part
173 connecting portion
181, 182 first and second receiving parts List of Reference Numerals in the Drawings
showing Embodiment(s) of the Means to
Accomplish the Fourth Task L lock mechanism
S seat body
SL front-rear slide mechanism as coupling part
Sc seat sitting part 210 seat device
211*a* side frame
216 floor portion
230 rotary support body
231 joint part
231*b* bolt
240 base body
245 bearing
260 interlocking member
261 interlocking member main body
262 drive part
270 rattling suppression member
271 the main body part of rattling suppression member
271*a* tip of rattling suppression member
276 spring
277 spring support member
281, 282 first and second receiving parts
291 support frame

MODE(S) FOR CARRYING OUT THE
INVENTION

Embodiment(s) of the Means to Accomplish the
First and Second Tasks

In the following, embodiments of the present invention
will be described with reference to the appended drawings.
In the following description, "front/rear," "left/right," and
"up/down" directions refer to the directions as viewed from
an occupant seated on the seat when the seat is in such a
posture that the occupant faces forward.

First of all, in FIGS. 1 to 7 showing the first embodiment,
a seat body 11 of a vehicle seat device includes a seat
cushion 11*a* supported by a seat cushion frame 16, a
seatback 11*b* which is supported by a seatback frame 17
coupled to the seat cushion frame 16 and is disposed above
the seat cushion 11*a*, and a headrest 11*c* supported by guide
tubes 18 provided on the seatback frame 16 such that the
height of the headrest 11*c* is adjustable. The seat cushion
frame 16 and the seatback frame 17 are rotatable together
with the seat body 11.

Figure 2:
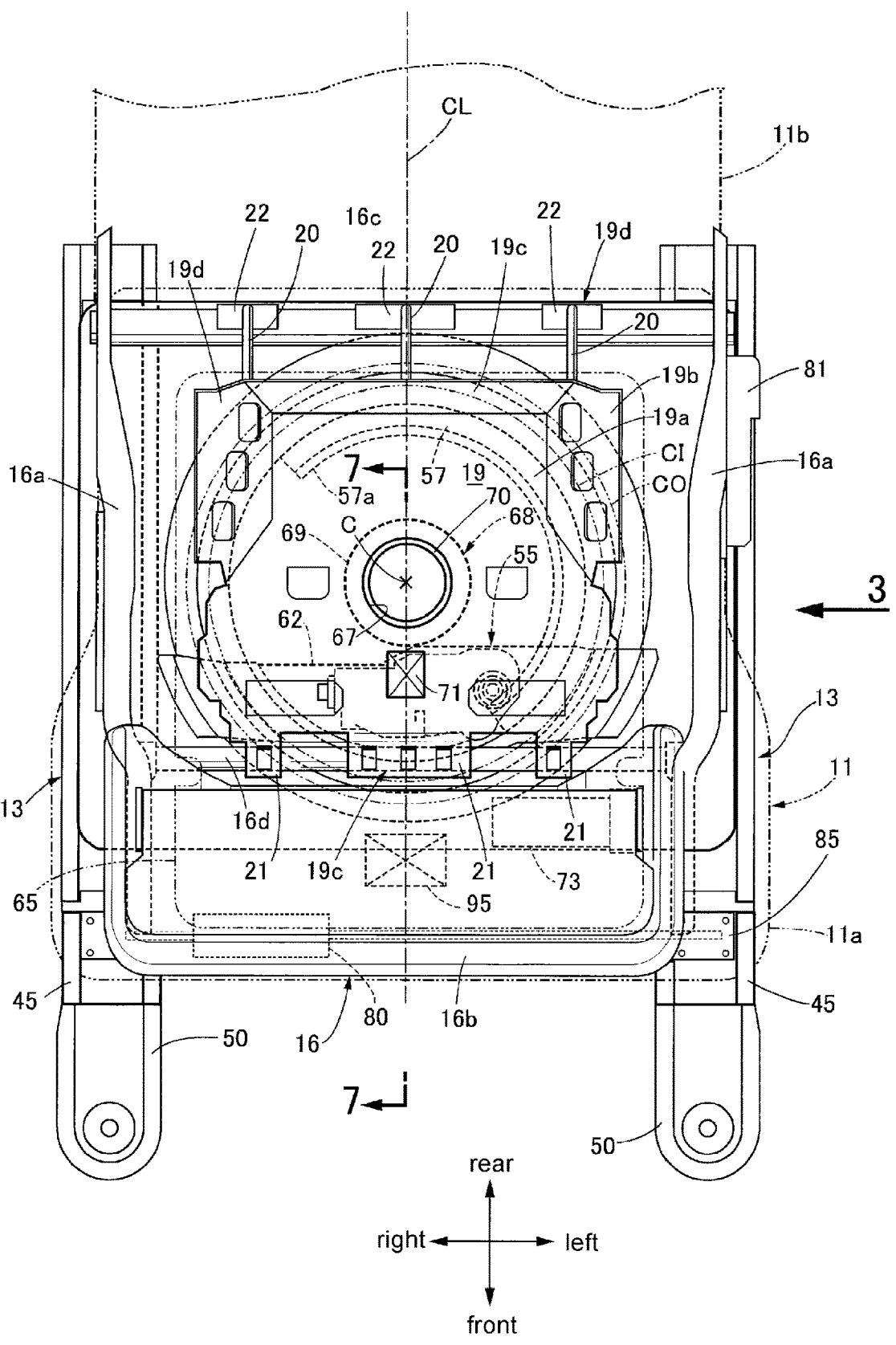
FIG. 2 is a plan view of a main part of the vehicle seat device as seen from above.
Figure 3:
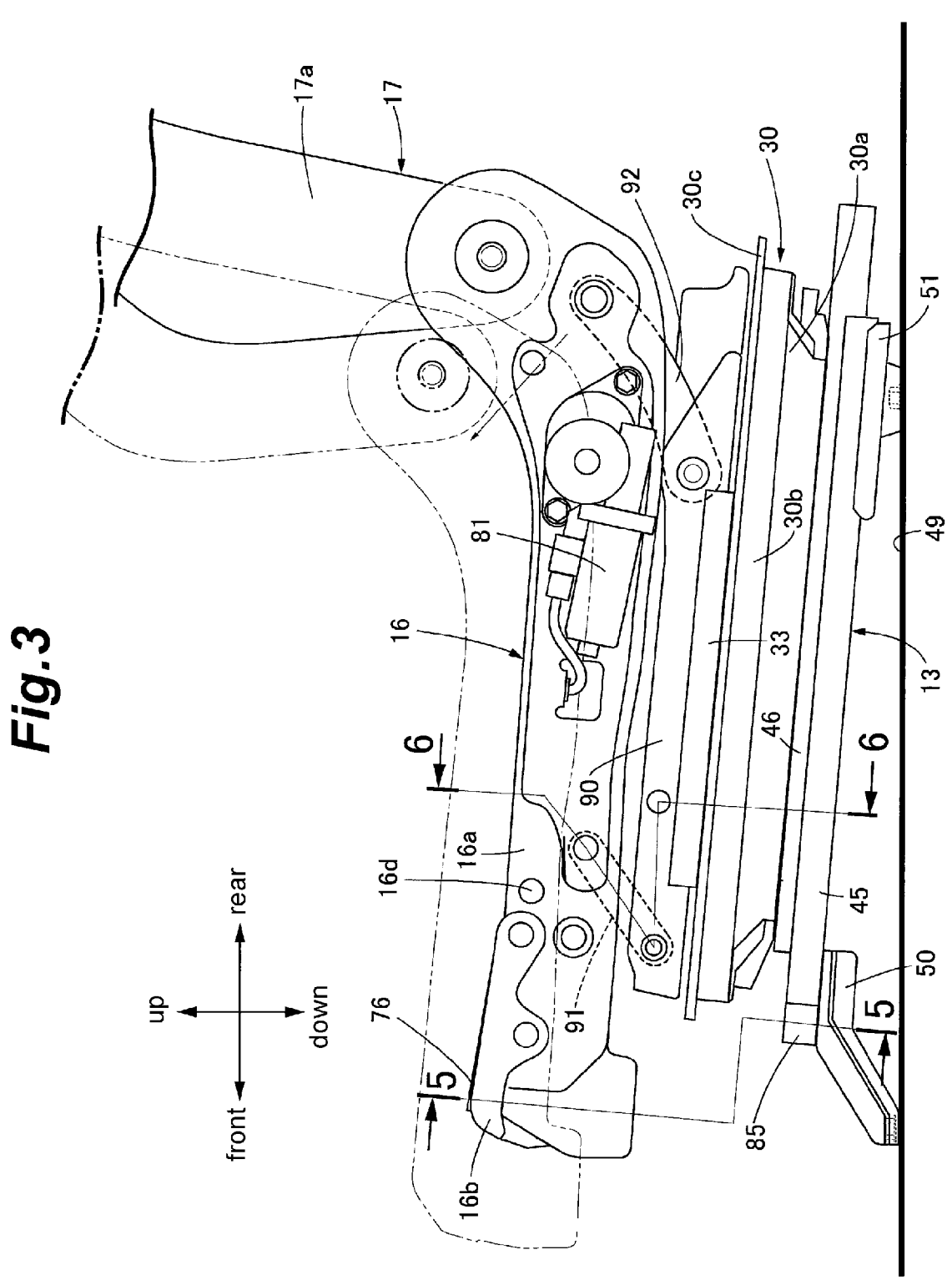
FIG. 3 is a side view of a main part of the vehicle seat device as seen in a direction of arrow 3 in FIG. 2.

Referring to FIGS. 2 and 3 also, the seat cushion frame 16
includes a pair of side frames 16*a* disposed to extend linearly
in the front-rear direction and arranged in positions spaced
from each other in the left-right direction when the seat
cushion frame 16 is in a forward-facing position where the
occupant on the seat cushion 11*a* faces in the forward
direction of the vehicle, a pan frame 16*b* coupling the front
end portions of the side frames 16*a*, a rear pipe 16*c* coupling
rear end portions of the pair of side frames 16*a*, and a front
pipe 16*d* coupling front portions of the pair of side frames
16*a* such that a part thereof overlaps with the rear portion of
the pan frame 16*a*.

The seatback frame 17 includes a pair of seatback side
frames 16*a* disposed in positions spaced from each other in
the left-right direction and extending in the up-down direc-
tion, an upper frame 17*b* coupling the upper end portions of
these seatback side frames 16*a*, and a lower frame 17*c*
coupling the lower end portions of the seatback side frames
16*a*.

A pressure receiving member 19 for receiving the load of
the seat cushion 11*a* from above is mounted to the seat
cushion frame 16. This pressure receiving member 19
includes a pressure receiving member main body 19*a* which
has a plate-like shape and extends substantially in parallel to
the side frames 16*a* in a position between the side frames
16*a*, a pair of inclined side parts 19*b* extending from the pressure receiving member main body 19a toward the respective side frames 16a in an inclined manner such that the height increases toward the side frames 16a, a front mounting part 19c that extends out forward from multiple parts of the front portion of the pressure receiving member main body 19a and engages with the front pipe 16d of the seat cushion frame 16, and a rear mounting part 19d that extends rearward from the rear end portion of the pressure receiving member main body 19a to be upward inclined toward rear and engages with the rear pipe 16c of the seat cushion frame 16.

The pressure receiving member 19 is made of resin with multiple metallic wires 20, which are spaced from each other in the width direction, insert-molded therein. The front mounting part 19c includes multiple front mounting pieces 21 that engage with multiple parts of the coupling the pipe 16d from above, and the rear mounting part 19d includes multiple rear mounting pieces 22 that engage with the rear pipe 16c from above. The front mounting pieces 21 and the rear mounting pieces 22 are reinforced by wires 20. Thus, this pressure receiving member 19 can bend upon receipt of the load of the occupant to resiliently support the occupant.

Between the pair of seatback side frames 16a, a back-side pressure receiving member 24 made of resin or the like to be elastically deformable is disposed, and this back-side pressure receiving member 24 is supported to extend between the left and right seatback side frames 16a via an upper coupling wire 25 and a lower coupling wire 26.

Figure 4:
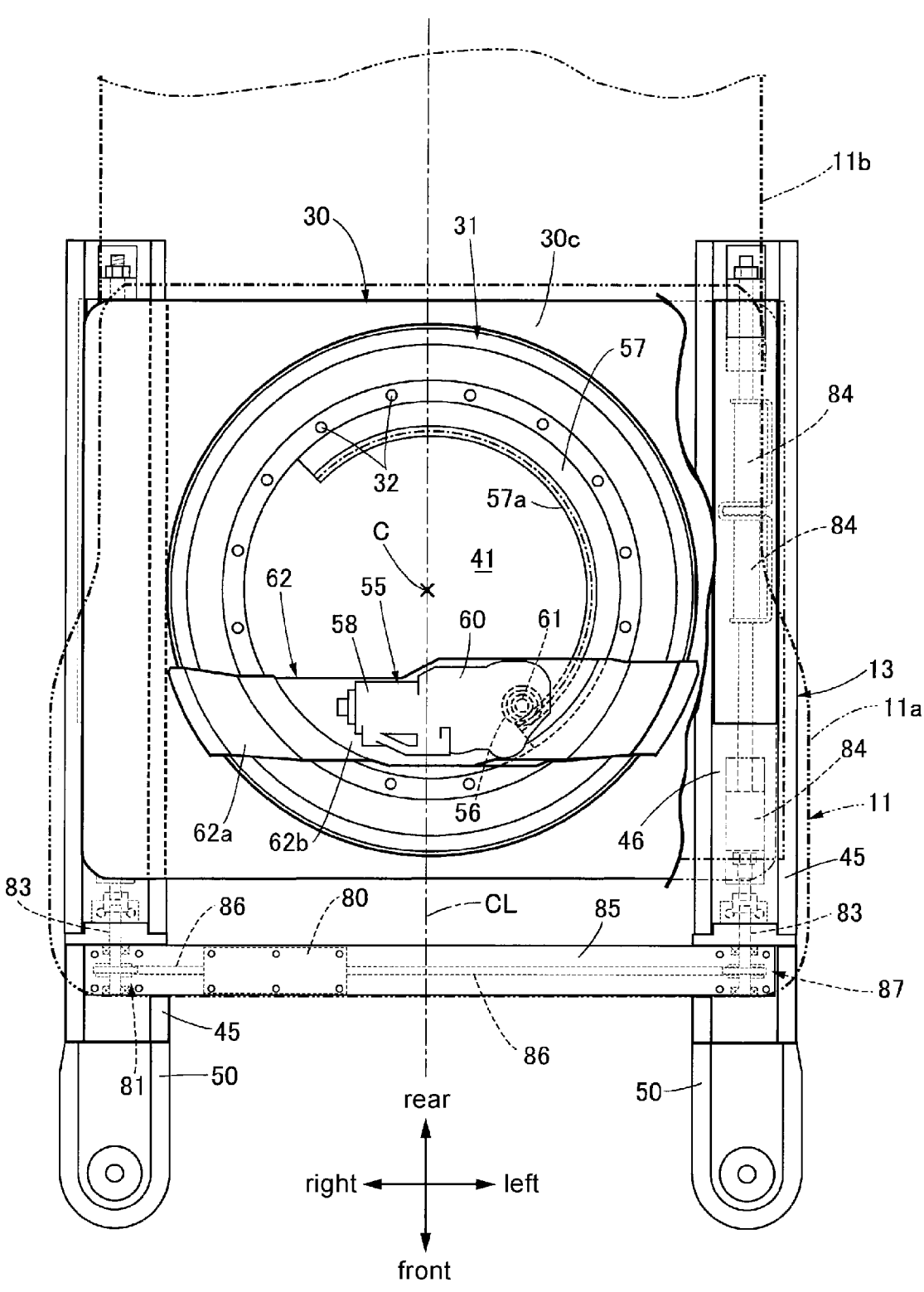
FIG. 4 is a plan view of a main part of the vehicle seat device as seen from above, with a seat cushion frame being omitted.
Figure 5:
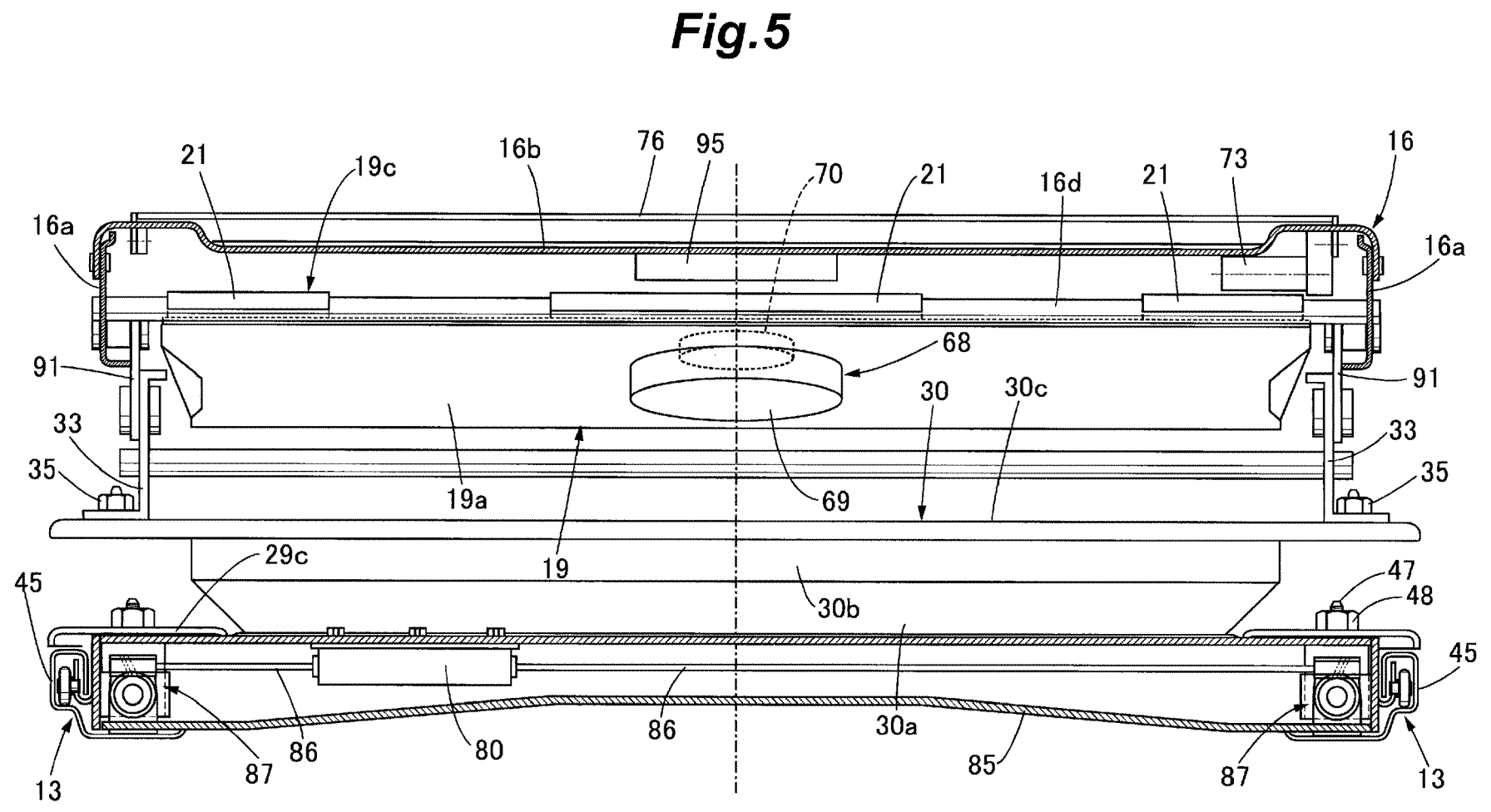
Figure 6:
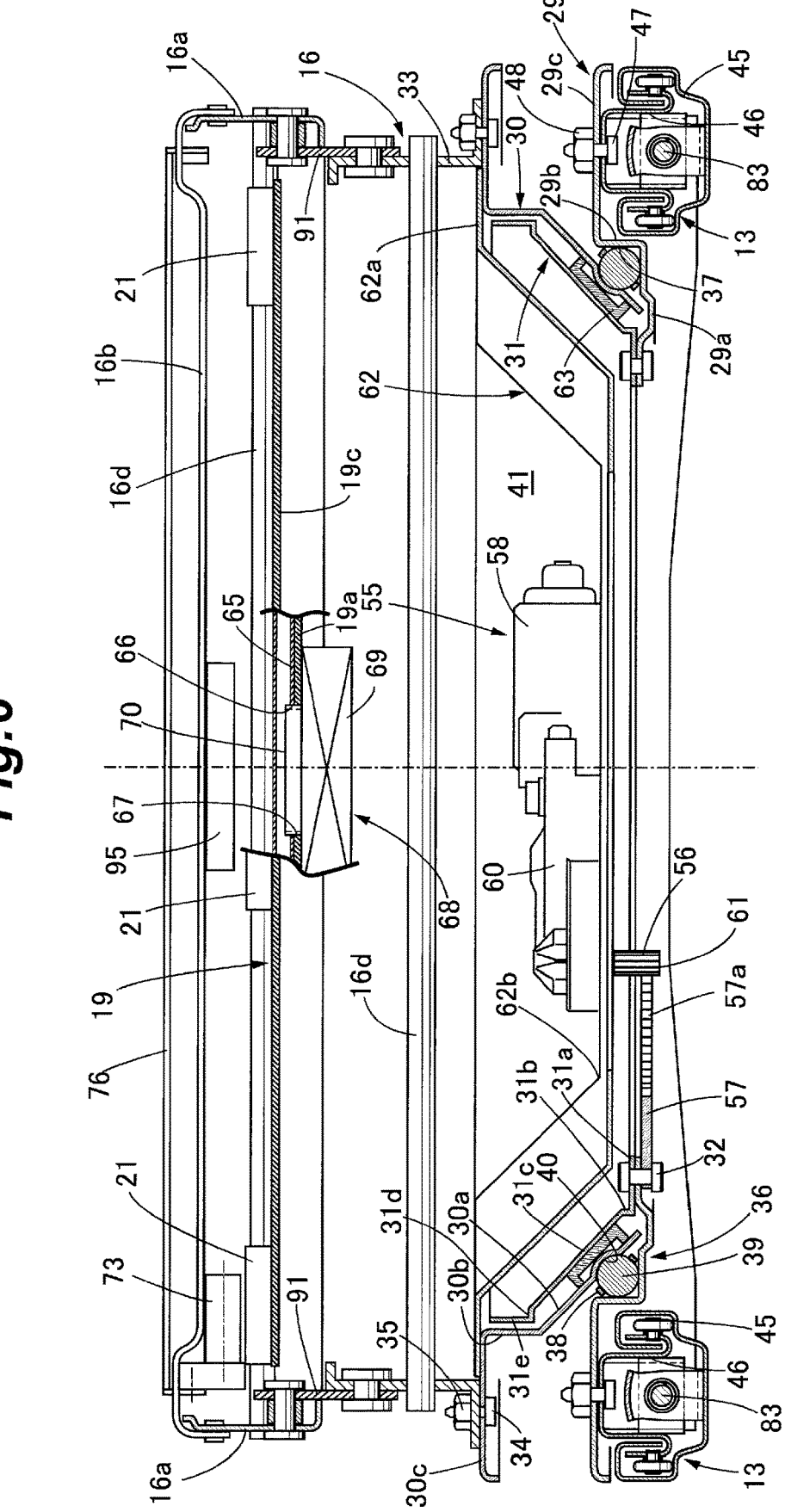
FIG. 6 is a sectional view taken along line 6-6 in FIG. 3.

Referring to FIGS. 4 to 6 also, the seat cushion frame 16 is provided on a rotating member 30 rotatably supported by a base member 29 which is movable along a pair of slide rails 13, and a cover member 31 that covers a part of the rotating member from above is fixed to the base member 29.

The base member 29 includes a first bottom wall portion 29a which is annular in shape, a first side wall portion 29b which stands upward from an outer peripheral portion of the first bottom wall portion 29a and is cylindrical in shape, and a first flange portion 29c that extends outward from an upper end portion of the first side wall portion 29b, and the first flange portion 29c is formed rectangular in shape.

The cover member 31 includes a second bottom wall portion 31a which is annular in shape and contacts the first bottom wall portion 29a of the base member 29 from above, a second side wall portion 31b which slightly stands upward from an outer periphery of the second bottom wall portion 31a and is cylindrical in shape, a first tapered part 31c which is formed to have a larger diameter toward its upper end and is connected to an upper end part of the second side wall portion 31b, a flat wall part 31d which extends out laterally from an upper end part of the first tapered part 31c and is annular in shape, and a third side wall portion 31e which stands upward from an outer periphery of the flat wall part 31d and is cylindrical in shape, and the second bottom wall portion 31a is joined to the first bottom wall portion 29a of the base member 29 by multiple rivets 32.

The rotating member 30 includes a second tapered part 30a which is disposed in a position opposing the first tapered part 31c of the cover member 31 from outside and is formed to have a larger diameter toward its upper end, a fourth side wall portion 30b which stands upward from an upper end portion of the second tapered part 30a to oppose the third side wall portion 31e of the cover member 31 from outside and is cylindrical in shape, and a second flange portion 30c which extends outward from the fourth side wall portion 30b, and the second flange portion 30c is formed in a rectangular shape. Further, support members 33 that extend in parallel to the slide rails 13 are fastened to the second flange portion 30c with multiple first bolts 34 and multiple first nuts 35.

Referring to FIG. 6, the rotating member 30 is rotatably supported on the base member 29 via a rotary support part 36, and this rotary support part 36 is constituted by balls 39 accommodated in a recess 37 defined by the first bottom wall portion 29a and the first side wall portion 29b of the base member 29 to be substantially L-shaped in the cross section, such that the balls 39 are held by multiple parts of an annular retainer 38 in the circumferential direction and are disposed between the base member 29 and the rotating member 30, the first tapered part 31c of the rotating member 30 is formed with an annular recess 40 for allowing the balls 39 to roll.

Incidentally, at the central part of the rotating member 30, a circular accommodation part 41 configured by the second tapered part 30a and the fourth side wall portion 30b of the rotating member 30 is formed to be open upward and downward, and the cover member 31 is disposed to be accommodated in the accommodation part 41.

The slide rails 13 are spaced from each other in the left-right direction and extend in parallel to each other in the vehicle front-rear direction, and each consist of a fixed rail 45 and a movable rail 46 slidably fitted to the fixed rail 45. The first flange portion 29c of the base member 29 is fastened to the movable rails 46 with multiple second bolts 47 and multiple second nuts 48. Further, the front portions of the fixed rails which extend along the vehicle front-rear direction are fixed to the floor surface 49 of the vehicle via respective front brackets 50, while the rear portions of the fixed rails 45 are fixed to the floor surface 49 via respective rear brackets 51. Moreover, the front brackets 50 are formed taller than the rear brackets 51, and the slide rails 13 extend in the vehicle front-rear direction in an inclined manner so as to be lower toward the rear in the vehicle front-rear direction.

The rotating member 30 is rotationally driven by the power exerted by a rotary drive actuator 55 and has an input gear 57 on the base member 29 side such that the input gear 57 meshes with an output gear 56 which is caused to rotate by the rotational power exerted by the rotary drive actuator 55 which is fixed on the rotating member 30 side.

The rotary drive actuator 55 includes an electric motor 58 having a rotation axis extending in the vehicle width direction, a gear box 60 coupled to a case 59 of the electric motor 58, and an output shaft 61 having a rotation axis parallel to a rotation axis C of the rotating member 30 and protruding from the gear box 60, and the output gear 56 is provided on the output shaft 61. In the gear box 60, a gear speed reduction mechanism (not shown in the drawings) for transmitting the rotational power of the electric motor 58 to the output shaft 61 after changing the rotation direction by 90 degrees while reducing the rotation speed is accommodated, and this gear speed reduction mechanism includes a worm gear such that the rotational power from the output shaft 61 side is prevented from being transmitted to the electric motor 58 side.

In this embodiment, the rotating member 30 is rotationally driven within a range of 180 degrees, and the input gear 57 is formed in an arc-shape over approximately 180 degrees, with a gear part 57a being provided on an inner peripheral portion, and is fixed to the lower surface of an inner peripheral portion of the first bottom wall portion 29a of the base member 29 such that the gear part 57a protrudes radially inward from the inner periphery of the first bottom wall portion 29a. Thereby, the gear part 57a is disposed to face the rotation axis C of the rotating member 30. In the fixation of the input gear 57 to the base member 29, some of the multiple rivets 32 which join the second bottom wall portion 31a of the cover member 31 to the first bottom wall portion 29a of the base member 29 are used to join the second bottom wall portion 31a and the input gear 57 to the first bottom wall portion 29a, with the first bottom wall portion 29a being interposed therebetween.

Incidentally, an actuator support plate 62 is attached to the rotating member 30, and the rotary drive actuator 55 is supported on this actuator support plate 62.

The actuator support plate 62 is disposed forward of the rotation axis C of the rotating member 30 and rearward of the pan frame 16b and the front pipe 16d and extends perpendicularly to the longitudinal direction of the slide rails 13 to have joined plate parts 62a which are joined to the upper surface of the third flange portion 30c of the rotating member 30 at both end portions. Between the two joined plate parts 62a, an actuator accommodation part 62b which is recessed into the accommodation part 41 whose upper end opening is lower than the support members 3, and the rotary drive actuator 55 is mounted to the upper surface of this actuator accommodation part 62b. Thereby, the rotary drive actuator 55 is disposed below the pressure receiving member 19 while avoiding interference with the pressure receiving member 19.

Incidentally, between the first tapered part 31c of the cover member 31 and the second tapered part 30a of the rotating member 30, an annular slider 63 that slidably contacts each of the tapered parts 31c, 30a thereof is interposed. This slider 63 is used to enable the cover member 31 and the rotating member 30 to be also usable in a vehicle seat device in which the rotating member 30 is configured to be rotated manually instead of using electric power of the rotary drive actuator 55, where in the vehicle seat device in which the manual rotation is allowed, an annular member that constitutes a part of the mechanism for suppressing the rattling of the rotating member 30 in the lock state in which the rotation of the rotating member 30 is prohibited is interposed between the first tapered part 31c and the second tapered part 30a in place of the slider 63.

Figure 7:
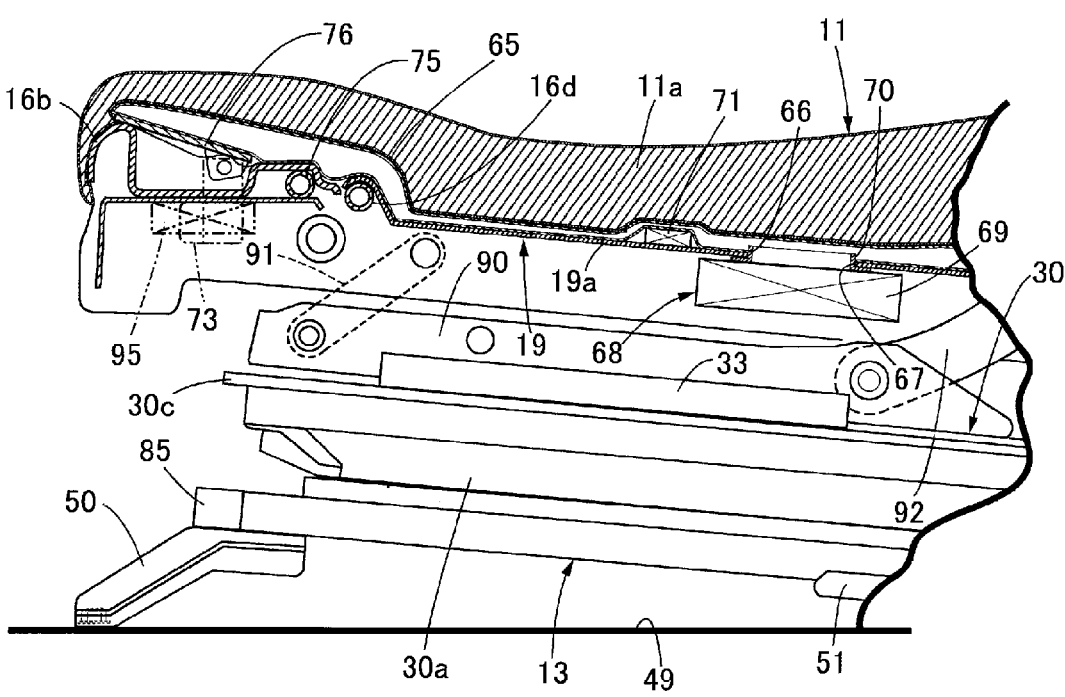
FIG. 7 is a sectional view of a main part of the vehicle seat device taken along line 7-7 in FIG. 2.

Incidentally, the seat cushion 11a may be supplied with cooling air from below and, as shown in FIGS. 6 and 7, a bag member 65 made of a flexible material is interposed between the pressure receiving member main body 19a of the pressure receiving member 19 and the seat cushion 11a, and the upper surface of this bag member 65 that faces the seat cushion 11a is formed with multiple vent holes (not shown in the drawings). Further, the lower surface of the bag member 65 is formed with an air inlet 66.

On the other hand, the pressure receiving main body 19a of the pressure receiving member 19 is formed with a connection port 67 corresponding to the air inlet 66, and a blower 69 of an air conditioner 68 for supplying air to the seat cushion 11a from below is connected to the connection port 67.

Incidentally, the rotary drive actuator 55 and the connection port 67 which is formed in the pressure receiving member 19 are disposed, in plan view, on an inner side of the rotary support part 36 provided between the rotating member 30 and the base member 29; in this embodiment, inward of the inner peripheral edge of the rotating member 30, namely, the periphery of the lower end portion of the second tapered part 30a.

Moreover, the rotary drive actuator 55 is disposed to avoid a position overlapping with the connection port 67 in plan view; particularly, the actuator support plate 62 supporting the rotary drive actuator 55 is fixed to the rotating member 30 so as to avoid a position overlapping with the connection port 67 in plan view.

Also, the rotary drive actuator 55 and the connection port 67 are disposed in positions displaced in the longitudinal direction of the pair of side frames 16a of the seat cushion frame 16, and in this embodiment, in a state in which the seat cushion frame 16 is in the forward-facing position where the occupant on the seat cushion 11a faces in the forward direction of the vehicle, the rotary drive actuator 55 and the actuator support plate 62 are disposed in a position forward of the rotational center C of the rotating member 30 and the connection port 67 is disposed in a position rearward of the rotary drive actuator 55.

Incidentally, the connection port 67 is formed in the pressure receiving member 19 in a shape surrounding the rotational center C of the rotating member 30 in plan view, and the blower 69 is mounted to the lower surface of the pressure receiving member main body 19a of the pressure receiving member 19 while being disposed directly under the connection port 67, and a discharge pipe 70 of the blower 69 is fitted in the connection port 67 and the air inlet 66 so as to supply air into the bag member 67.

As described above, because the blower 69 is disposed directly under the connection port 67, the blower 69 is disposed, together with the connection port 67, in a position displaced from the rotary drive actuator 55 and the actuator support plate 62 in the longitudinal direction of the side frames 16a so as to avoid a position overlapping with the rotary drive actuator 55 and the actuator support plate 62 in plan view, and in the state in which the seat cushion frame 16 is in the forward-facing position where the occupant on the seat cushion 11a faces in the forward direction of the vehicle, while the rotary drive actuator 55 is disposed forward of the rotational center C of the rotating member 30, the blower 69 is disposed rearward of the rotary drive actuator 55.

On the pressure receiving member main body 19a of the pressure receiving member 19, a seating sensor 71 for detecting seating of an occupant on the seat cushion 11a is mounted. This seating sensor 71 is disposed in a position above the rotary drive actuator 55 and not overlapping with the connection port 67 and the blower 69 in plan view, and in this embodiment, in the state in which the seat cushion frame 16 is in the forward-facing position where the occupant on the seat cushion 11a faces in the forward direction of the vehicle, the seating sensor 71 is disposed in a position displaced forward of the blower 69.

Incidentally, this vehicle seat device is provided, besides the rotary drive actuator 55, with a seat front portion tilt actuator 73 which exerts power for moving the front portion of the seat cushion 11a up and down, and the seat front portion tilt actuator 73, which is another actuator distinct from the rotary drive actuator 55, is disposed in a position corresponding to the front portion of the seat cushion frame 16 so as to avoid overlapping with the rotary drive actuator 55 and the actuator support plate 62 in plan view in the state in which the seat cushion frame 16 is in the forward-facing position where the occupant on the seat cushion 11a faces in the forward direction of the vehicle. Namely, the rotary drive actuator 55 and the actuator support plate 62 are disposed rearward of the seat front portion tilt actuator 73 in the state in which the seat cushion frame 16 is in the forward-facing position.

Referring to FIG. 7, a movable support member 76 having a rear end portion pivotably supported by the side frames 16a via a support shaft 75 is disposed above the pan frame 16*b*, and the seat front portion tilt actuator 73 for making this movable support member 76 pivot up and down is disposed below the pan frame 16*b* and is mounted to the pan frame 16*b*. Namely, in the state in which the seat cushion frame 16 is in the forward-facing position, the rotary drive actuator 55 is disposed in a position rearward of the pan frame 16*b*, while the seat front portion tilt actuator 73 is disposed below the pan frame 16*b*.

The movable support member 76 is interposed between the pan frame 16*b* and the front portion of the seat cushion 11*a* and the bag member 65, and the front portion of the seat cushion 11*a* moves up and down when the movable support member 76 is caused to pivot up and down by the seat front portion tilt actuator 73.

Moreover, while the seat front portion tilt actuator 73 is disposed closer to one of the side frames 16*a* than the central part between the pair of side frames 16*a*, the rotary drive actuator 55 is disposed closer to the central part between the pair of side frames 16*a* than the seat front portion tilt actuator 73 is. Namely, in this embodiment, the seat front portion tilt actuator 73 is disposed to be closer to the left side frame 16*a* than a center line CL which extends in parallel to the side frames 16*a* to pass through the rotational center of the rotating member 30, while the rotary drive actuator 55 is disposed in a position such that the center line CL passes through the substantially central part thereof.

Also, while the rotary drive actuator 55 is disposed inside the rotary support part 36 in plan view, the seat front portion tilt actuator 73 is disposed outside the rotary support part 36 in plan view. In FIG. 2, in which an inner periphery of the rotary support part 36 is shown by an imaginary circle CI and an outer periphery of the rotary support part 36 is shown by an imaginary circle OC, the rotary drive actuator 55 is present inside the imaginary circle CI and the seat front portion tilt actuator 73 is present outside the imaginary circle OC.

Further, this vehicle seat device is provided with a sliding actuator 80 for exerting power to cause the seat body 11 to slide forward and backward along the slide rails 13 together with the base member 29, a seat tilt actuator 81 for moving the seat body 11 up and down together with the seat cushion frame 16 and the seatback frame 17, and a tilting actuator 82 for exerting power to cause the seatback 11*b* to tilt forward and backward together with the seatback frame 17.

To enable the base member 29 and the seat body 11 to slide along the guide rails 13, a feed screw 83 is accommodated between the fixed rail 45 and the movable rail 46 such that the feed screw 83 extends in the longitudinal direction of the rails 45, 46, and this feed screw 83 penetrates through nuts 84 fixed at multiple locations of the fixed rails 45 while being threadably engaged with the nuts 84.

On the other hand, an actuator case 85 is provided between the front end portions of the movable rails 46 of the pair, and the sliding actuator 80 is accommodated and fixed in this actuator case 85. The sliding actuator 80 is an electric motor having a rotation axis extending in a direction perpendicular to the pair of slide rails 13, and an output shaft 86 of the sliding actuator 80 extends out from the sliding actuator 80 to both sides.

Each outer end portion of the output shaft 86 is coupled to the corresponding feed screw 83 via a rotation direction conversion mechanism 87 and, when the feed screws 83 are rotated by activation of the sliding actuator 80, the movable rails 46, namely, the base member 29, slide forward and backward along the slide rails 13.

To move the seat body 11 up and down together with the seat, a link support member 90 is fixed on each of the support members 33 fixed on the second flange portion 30*c* of the rotating member 30 such that the link support member 90 extends in the longitudinal direction of the side frames 16*a*, and two end portions of a front link 91 are pivotably coupled to a front portion of the link support member 90 and the side frame 16*a*, respectively, while two end portions of a rear link 92 are pivotably coupled to a rear portion of the link support member 90 and the side frame 16*a*, respectively.

The seat tilt actuator 81 is mounted on an outer side surface of one of the pair of side frames 16*a* and when the front links 91 and the rear links 92 are caused to pivot by activation of this seat tilt actuator 81, the seat body 11 moves up and down together with the seat cushion frame 16 and the seatback frame 17.

The tilting actuator 82 is mounted on an inner side of the lower portion of one of the pair of seatback side frames 17*a* of the seatback frame 17. In this embodiment, the seat tilt actuator 81 is mounted on the outer side surface of the left side frame 16*a* and the tilting actuator 82 is mounted on the inner side of the lower portion of the right seatback side frame 17*a* in a state in which the seatback frame 16 is in the forward facing position.

Thus, the rotary drive actuator 55, the seat front portion tilt actuator 73, the sliding actuator 80, the seat tilt actuator 81, and the tilting actuator 82 are disposed in positions not overlapping with each other in plan view.

The activation of the rotary drive actuator 55, the seat front portion tilt actuator 73, the sliding actuator 80, the seat tilt actuator 81, and the tilting actuator 82 is controlled by an ECU 95, and this ECU 95 is disposed below the pan frame 16*b* and is fixedly supported on the pan frame 16*b*.

Next, effects of the first embodiment will be described. Since the rotating member 30 is rotatably supported on the base member 29 via the annular rotary support part 36, and the rotary drive actuator 55, which exerts power to rotate the rotating member 30, and the connection port 67, which is formed such that the blower 69 of the air conditioner 68 is connected to the pressure receiving member 19 which is supported on the seat cushion frame 16 provided on the rotating member 30 to receive the load of the seat cushion 11*a*, are arranged inside the rotary support part 36 in plan view, the vehicle seat device can be made compact in the direction perpendicular to the rotation axis C of the rotating member 30 and the cooling air can be effectively sent to various parts of the seat cushion 11*a* so that the cooling efficiency can be improved. Further, since the rotary drive actuator 55 is disposed to avoid a position overlapping with the connection port 67 and the blower 69 in plan view, the rotary drive actuator 55 does not vertically overlap with the connection port 67 and the blower 69, and the vehicle seat device can be made compact in the up-down direction.

Further, since the actuator support plate 62 supporting the rotary drive actuator is fixed to the rotating member 30 so as to avoid a position overlapping with the connection port 67 and the blower 69 in plan view, the actuator support plate 62 fixed to the rotating member 30 does not vertically overlap with the connection port 67 and the blower 69, and with the rotary drive actuator 55 supported by this actuator support plate 62, this can contribute to making the vehicle seat device compact in the up-down direction.

Since the seat cushion frame 16 is provided with the pair of side frames 16*a* which are spaced from each other and extend in parallel to each other, and the rotary drive actuator 55 is disposed in a position displaced from the connection port 67 and the blower 69 in the longitudinal direction of the side frames 16*a* in plan view, it is possible to avoid enlargement of the vehicle seat device in the lateral direction perpendicular to the side frames 16*a*.

Further, in the state in which the seat cushion frame 16 is in the forward-facing position where the occupant on the seat cushion 11*a* faces in the forward direction of the vehicle, the rotary drive actuator 55 is disposed in a position forward of the rotational center C of the rotating member 30, and the connection port 67 and the blower 69 are disposed in a position rearward of the rotary drive actuator 55, and thus, it is possible to avoid enlargement of the vehicle seat device in the vehicle width direction.

Further, since the connection port 67 is formed in the pressure receiving member 19 in a shape surrounding the rotational center C of the rotating member 30 in plan view, the connection port 67 is disposed in a position corresponding to the substantially central part of the seat cushion 11*a*, and therefore, it is possible to supply the cooling air to various parts of the seat cushion 11*a* more effectively and to further improve the cooling efficiency.

Moreover, since the blower 69 is mounted on the lower surface of the pressure receiving member 19 while being disposed directly under the connection port 67, it is possible to make the air conditioner 68 compact, while making a special component part for supporting the blower 69 unnecessary thereby to reduce the number of component parts.

Further, since the seating sensor 71 is mounted on the pressure receiving member 19 in a position above the rotary drive actuator 55 and not overlapping with the connection port 67 and the blower 69 in plan view, it is possible to avoid decrease of strength of the pressure receiving member 19 at the part where the seating sensor 71 is mounted as much as possible.

Further, since the seat front portion tilt actuator 73 which is another actuator distinct from the rotary drive actuator 55 is disposed to avoid a position overlapping with the rotary drive actuator 55 in plan view, the rotary drive actuator 55 and the seat front portion tilt actuator 73 do not overlap vertically, and therefore, increase in height of the vehicle seat device can be avoided.

Moreover, in the state in which the seat cushion frame 16 is in the forward-facing position where the occupant on the seat cushion 11*a* faces in the forward direction of the vehicle, the rotary drive actuator 55 is disposed rearward of the seat front portion tilt actuator 73, which is disposed to correspond to the front portion of the seat cushion frame 16 in a position forward of the actuator support plate 62 on which the rotary drive actuator 55 is mounted and which is fixed to the rotating member 30.

In this embodiment, the rotary drive actuator 55 is disposed rearward of the pan frame 16*b* of the front portion of the seat cushion frame 16, and the seat front portion tilt actuator 73 is disposed below the pan frame 16*b*. Thereby, it is possible to arrange the rotary drive actuator 55 and the seat front portion tilt actuator 73 so as not to overlap in the up-down direction, to thereby contribute to making the vehicle seat device compact in the up-down direction while contributing to making the vehicle seat device compact in the vehicle width direction.

Further, since the seat front portion tilt actuator 73 is disposed closer to one of the side frames 16*a* than the central part between the pair of side frames 16*a*, and the rotary drive actuator 55 is disposed closer to the central part between the pair of side frames 16*a* than the seat front portion tilt actuator 73 is, the rotary drive actuator 55 and the seat front portion tilt actuator 73 can be disposed together in a compact manner in positions displaced toward one of the pair of side frames 16*a*.

Moreover, since the rotary drive actuator 55 is disposed inside the rotary support part 36, and the seat front portion tilt actuator 73 is disposed outside the rotary support part 36, the rotary drive actuator 55 and the seat front portion tilt actuator 73 can be effectively disposed to avoid mutual interference between them.

Furthermore, since the ECU 95 that controls activation of the rotary drive actuator 55, the seat front portion tilt actuator 73, the sliding actuator 80, the seat tilt actuator 81, and the tilting actuator 82 is disposed below the pan frame 16*b*, it is possible to contribute to making the vehicle seat device compact in the lateral direction perpendicular to the longitudinal direction of the side frames 16*a* while avoiding increase in size of the vehicle seat device in the longitudinal direction of the side frames 16*a* due to arrangement of the seat front portion tilt actuator 73 and the ECU 95.

Figure 8:
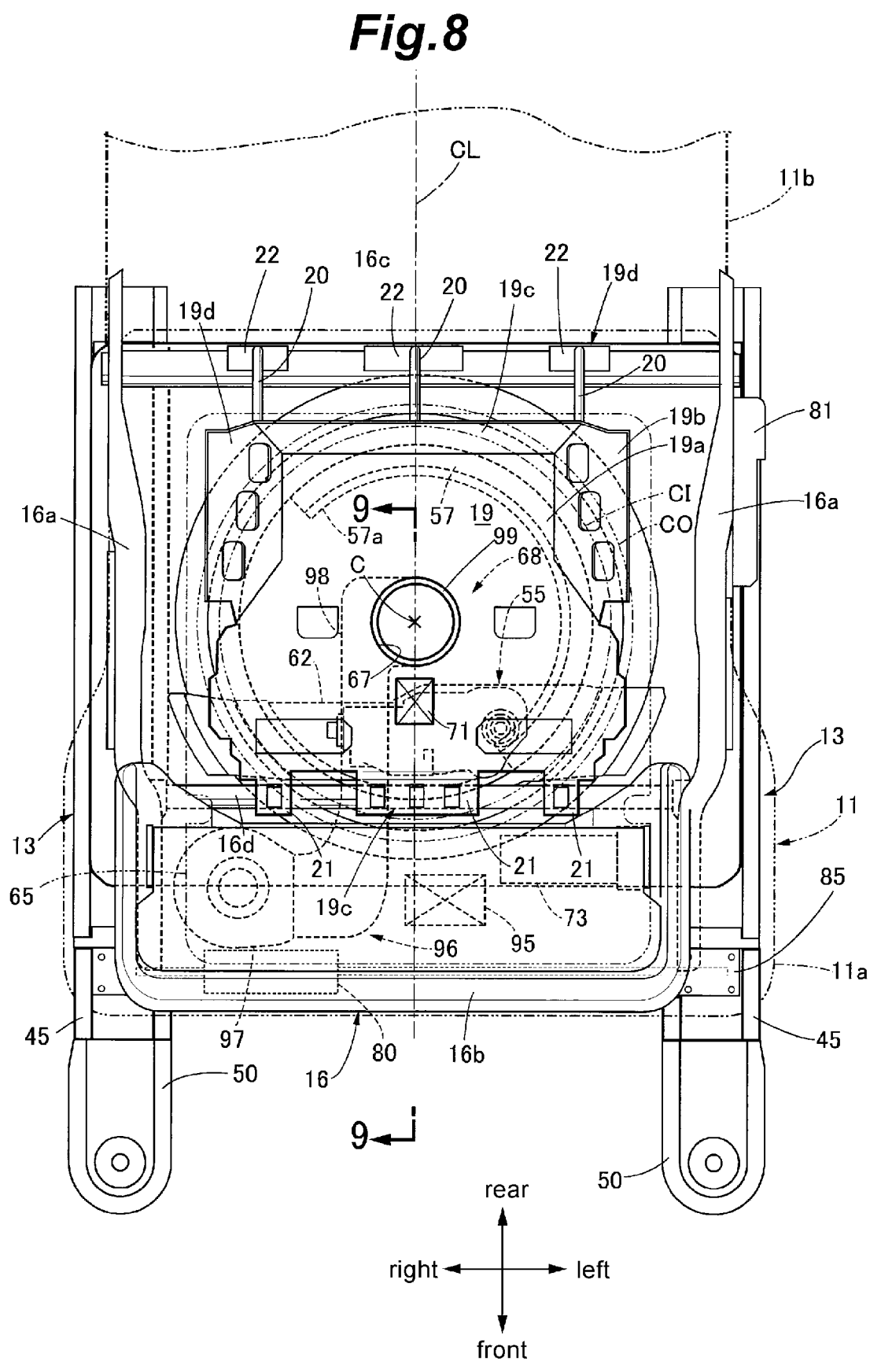
Figure 9:
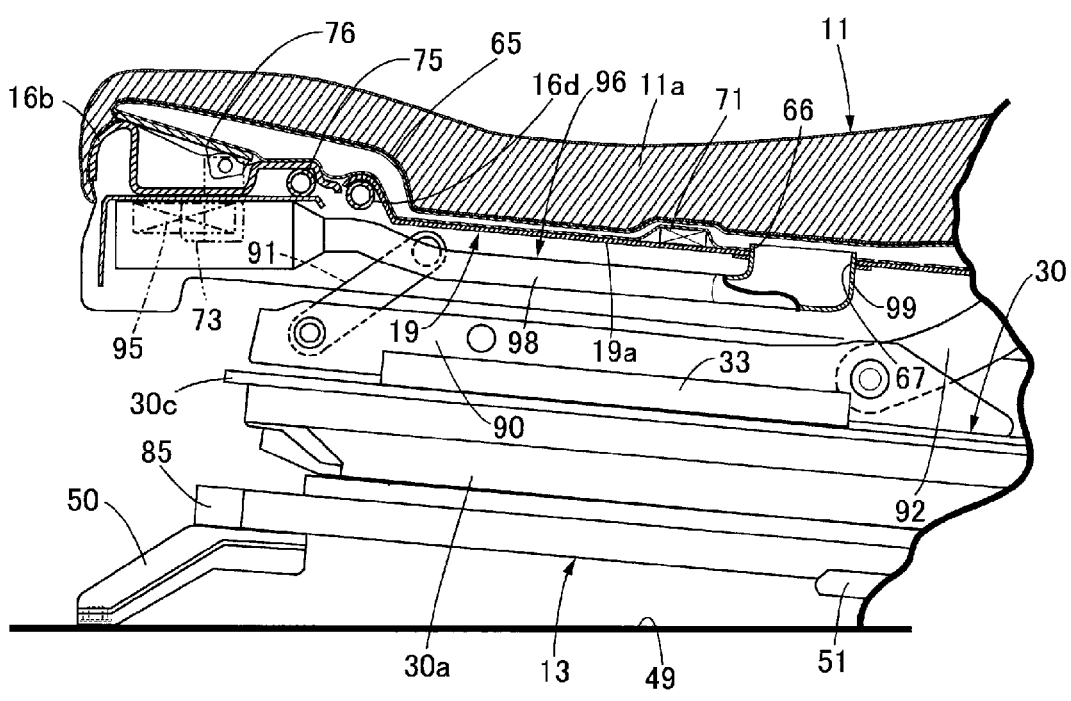
FIG. 9 is a sectional view taken along line 9-9 in FIG. 8.

A second embodiment of the present invention will now be described with reference to FIGS. 8 and 9, in which the parts corresponding to those in the first embodiment will be denoted by the same reference signs and will be shown only in the drawings without detailed description.

The connection port 67 formed in the pressure receiving main body 19*a* of the pressure receiving member 19 is adapted such that a blower 97 of an air conditioner 96 is connected thereto, and the air conditioner 96 includes the blower 97 which is disposed below the pan frame 16*b* of the seat cushion frame 16 and is mounted to the pan frame 16*b*, a duct 98 extending from the blower 97 toward the connection port 67 to guide the air from the blower 97, and a connection pipe 99 connected to an end portion of the duct 97 opposite from the blower 97 and fitted in the connection port 67.

Further, in the state in which the seat cushion frame 16 is in the forward-facing position where the occupant on the seat cushion 11*a* faces in the forward direction of the vehicle, the rotary drive actuator 55 is disposed rearward of the pan frame 16*b* of the front portion of the seat cushion frame 16, the seat front portion tilt actuator 73 and the ECU 95 are disposed below the pan frame 16*b*, and the blower 97 is mounted to the pan frame 16*b* in a position avoiding a position overlapping with the seat front portion tilt actuator 73 and the ECU 95 in plan view.

In this second embodiment, it is possible to contribute to making the vehicle seat device compact in the lateral direction perpendicular to the longitudinal direction of the side frames 16*a* of the seat cushion frame 16 while avoiding increase in size of the vehicle seat device in the longitudinal direction of the side frames 16*a* due to arrangement of the seat front portion tilt actuator 73 and the blower 97.

In the foregoing, embodiments of the present invention have been described, but the present invention is not limited to the first and second embodiments, various design modifications may be made without departing from the invention as set forth in the claims.

For example, in the above-described embodiments, description was made of the case where the plate-shaped pressure receiving member 19 was used, but the present invention may be applied to a case where a pressure receiving member configured by coupling multiple seat springs formed by bent metal wires with a resin coupling member is used.

Embodiment(s) of the Means to Accomplish the Third Task

In the following description of the embodiment(s), "front/ rear," "left/right," and "up/down" directions refer to "front/ rear," "left/right," and "up/down" directions as viewed from a person seated on the seat in such a posture that the seated person faces in the forward direction of the vehicle.

Figure 10:
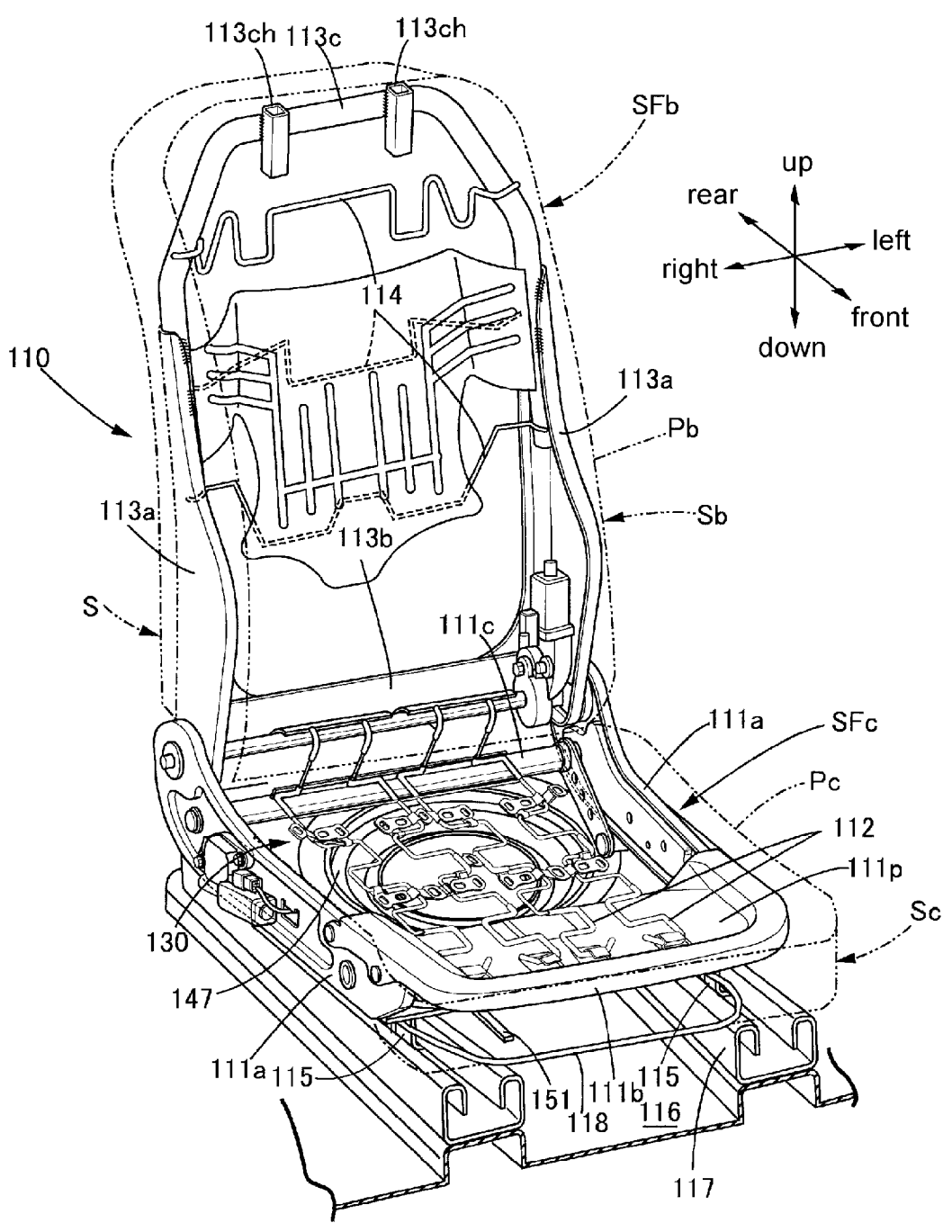
FIG. 10 is an overall perspective view showing a first embodiment of a vehicle seat device.

First of all, a first embodiment will be described with reference to FIGS. 10 to 20. In FIG. 10, a seat body S of a vehicle seat device 110 installed in a vehicle includes a seat sitting part Sc on which buttocks of an occupant are to be placed, and a seatback part Sb which stands up from a rear portion of the seat sitting part Sc to support the back and waist of the occupant.

A seat frame SF constituting the skeleton of the seat body S includes a sitting part frame SFc constituting the skeleton of the seat sitting part Sc and a back frame SFb constituting the skeleton of the seatback part Sb, the sitting part frame SFc is covered by a seat cushion pad Pc, and the back frame SFb is covered by a seatback pad Pb. The back frame SFb is supported at the rear end portion of the sitting part frame SFc via an electric or manual reclining mechanism (either is conventionally known) to be pivotable forward and backward.

The sitting part frame SFc includes a pair of left and right side frames 111a laterally spaced from each other and extending in the front-rear direction, a front frame 111b coupling the front end portions of the side frames 111a, and a rear pipe 111c coupling the rear end portions of the side frames 111a. A pan frame 111p that connects between the side frames 111a is fixed to the front frame 111b. Further, front and rear end portions of multiple seat springs 112 which are spaced from each other in the left-right direction and extend in the front-rear direction in a zigzag bent manner are provided to bridge between the front frame 111b and the rear pipe 111c.

Also, the back frame SFb includes a pair of left and right side frames 113a laterally spaced from each other and extending in the up-down direction, a lower lateral frame 113b coupling the lower end portions of the left and right side frames 113a, and an upper lateral frame 113c coupling the upper end portions of the left and right side frames 113a. Further, left and right end portions of multiple seat springs 114 are provided to bridge between the left and right side frames 113a, and headrest support parts 113ch for supporting the headrest are fixedly provided on the upper lateral frame 113c.

Referring to FIGS. 10 to 16 also, the vehicle seat device 110 includes a base body 140 which functions as a base frame thereof at the lowest part, and the base body 140 is formed rectangular in plan view, with a large circular hole 140h at the central part. A pair of left and right movable rails 115 extending in the front-rear direction are secured to the lower surfaces of the left and right side portions of the base body 140, respectively, and these movable rails 115 are respectively supported to be slidable forward and backward by a pair of left and right fixed rails 117 which are secured to the floor portion 116 of the vehicle body to extend in the front-rear direction.

Between each movable rail 115 and the corresponding fixed rail 117, a conventionally known front-rear position adjustment mechanism (not shown in the drawings) which can arbitrarily adjust and fix the front-rear position of the movable rail 115 (namely, the base body 140, and hence the seat body S) is provided, and the front-rear position adjustment mechanism is manually operated with an operation lever 118 which is interlockingly coupled thereto and protrudes forward of the lower portion of the seat sitting part Sc.

Note that the aforementioned front-rear position adjustment mechanism may be omitted, and in such a case, the base body 140 is fixed on the floor portion 116 of the vehicle body such that the front-rear position thereof is not adjustable.

Further, between the base body 140 and the seat sitting part Sc, a seat rotation mechanism R that supports the seat sitting part Sc (and hence the seat body S) to be rotatable about a vertical axis is provided. Namely, a rotary support body 130 which is rotatable together with the seat sitting part Sc is disposed above the base body 140, and the rotary support body 130 is secured (for example, fastened by multiple bolts 131) to the seat sitting part Sc (more specifically, the left and right side frames 111a of the sitting part frame SFc) at all four corner portions.

The rotary support body 130 is formed rectangular in plan view with a large circular hole 130h at the central part, and a bearing 145 (for example, a ball bearing) for supporting the rotary support body 130 to be rotatable about a vertical axis is interposed between the inner peripheral end parts of the rotary support body 130 and the base body 140.

A base plate 141 integrally having a lower ball receiving recess of the bearing 145 overlaps with and is secured to the upper surface of the base body 140, while the rotary support body 130 integrally has, in an inner peripheral portion thereof, an upper ball receiving recess of the bearing 145, and the inner peripheral end of the rotary support body 130 is held in a rotationally slidable manner by an annular holding plate 147 via a slider 146 having a circular annular shape. The holding plate 147 integrally includes an outer peripheral upright wall 147w having a stepped short cylindrical shape and a radially inward flange part 147f connected to the lower end of the outer peripheral upright wall 147w, and the flange part 147f overlaps with and is secured to the inner peripheral end part of the base plate 141 (and hence the base body 140) by multiple bolts 148.

Between the rotary support body 130 and the base body 140, a deformation suppression mechanism H which allows rotation of the rotary support body 130 relative to the base body 140 but suppresses excessive deformation of the rotary support body 130 in the radially outward direction is provided radially outside the bearing 145 (more specifically, at all four corner portions of the rotary support body 130/the base body 140). The deformation suppression mechanism H includes a first hook F1 fixedly provided on the base body 140 and a second hook F2 fixedly provided on the rotary support body 130 to correspond to (namely, to be engageable with) the first hook F1, and particularly in the first embodiment, is disposed such that the second hook F2 is located outward of the first hook F1 in the radial direction.

Thus, the first and second hooks F1, F2 are configured such that they define a gap therebetween at ordinary times, but in a case where the rotary support body 130 may deform or move excessively in a radially outward direction such as at the time of vehicle collision or the like, the tip hook parts of the two hooks F1, F2 engage each other to be capable of restricting excessive deformation or movement.

Further, between the rotary support body 130 and the base body 140, a lock mechanism L which can selectively lock the rotary support body 130 (and hence the seat body S) in one of multiple rotation positions, a rattling suppression mechanism G which, in a state in which the rotation position of the rotary support body 130 is locked by the lock mechanism L, suppresses rattling of the rotary support body 130, and an interlocking mechanism I which normally allows the rattling suppression function of the rattling suppression mechanism G to be effectively demonstrated but interlocks the rattling suppression mechanism G with the lock mechanism L so as to temporarily disable the aforementioned rattling suppression function in response to the lock mechanism L unlocking the rotation position of the rotary support body 130 are interposed. In the following, concrete examples of these mechanisms L, G, I will be described in order.

The lock mechanism L includes a bell-cranked lock lever 151 having an intermediate portion supported by a pivot 151*p* at a front portion of the rotary support body 130 so as to be pivotally operable, a link member 152 which couples a tip end of a tip arm 151*a* of the lock lever 151 to a later-described interlocking member 160 of the interlocking mechanism I via pivots, a lock spring 153 which is stretched between the lock lever 151 and the rotary support body 130 to urge the lock lever 151 in a lock direction (clockwise in FIGS. 12 and 13), a lock hole 132 provided in a short-cylindrical intermediate upright wall 130*w* of the rotary support body 130, lock holes 142 provided in the outer peripheral upright wall 147*w* of the holding plate 147, and a locking claw 154 protrudingly provided on the tip arm 151*a* of the lock lever 151 to be capable of being engaged with and disengaged from the lock holes 132, 142. A base part arm 151*b* of the lock lever 151 protrudes forward from below the front portion of the seat sitting part Sb and functions as an operation lever that can be manually operated by the occupant.

Figure 11:
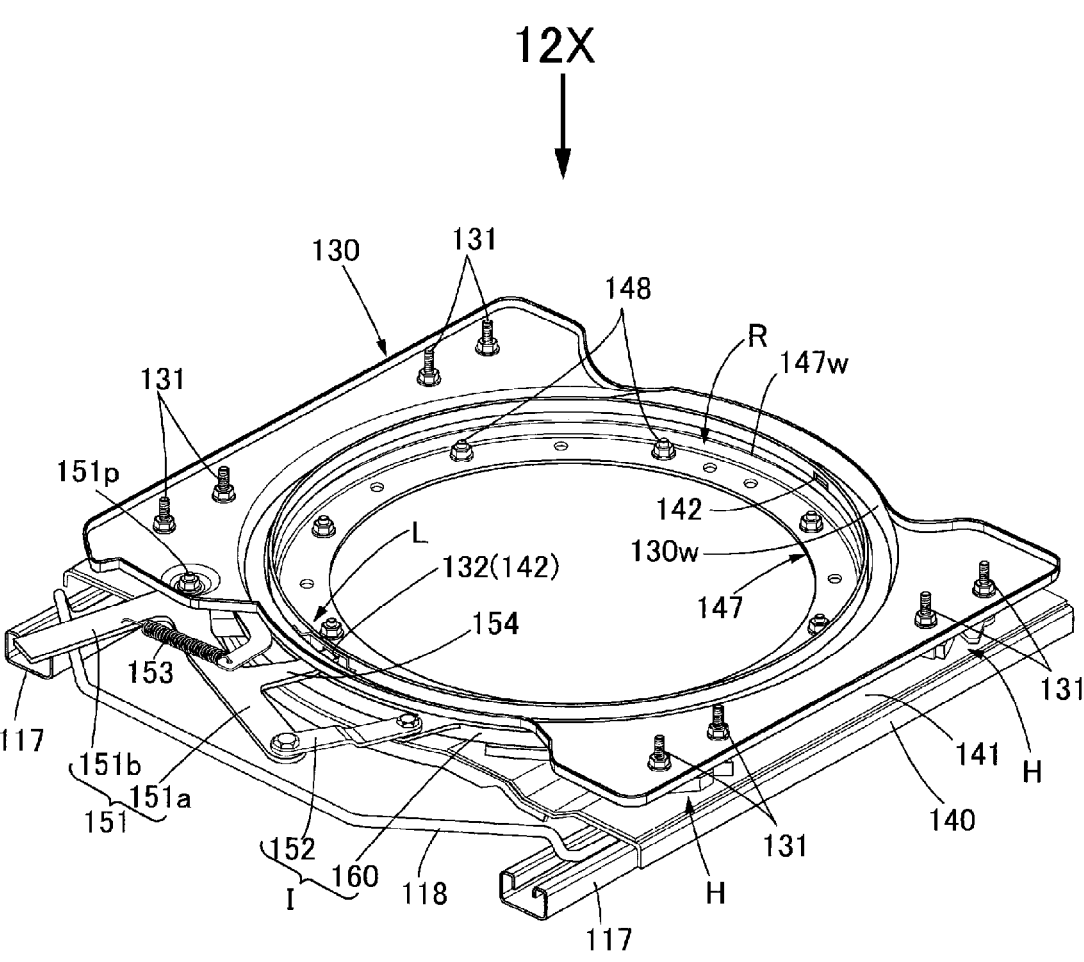
FIG. 11 is a perspective view showing a main part (particularly, a rotary support body and elements below it) of a seat sitting part of the seat device.

Only one lock hole 132 is provided near the lock lever 151 to correspond to the locking claw 154, but multiple lock holes 142 are provided corresponding to multiple rotation positions of the seat body S to be locked by the lock mechanism L. For example, in the illustrated example, the rotation position of the seat body S can be selected in two stages from two rotation positions, namely, a front rotation position where the seat body S faces forward and a back rotation position which is phase-shifted by 180 degrees therefrom to face rearward, and accordingly, the lock holes 142 are provided in a front portion and a rear portion of the holding frame 147 in positions phase-shifted by 180 degrees from each other, as shown in FIGS. 11 and 12.

Figure 12:
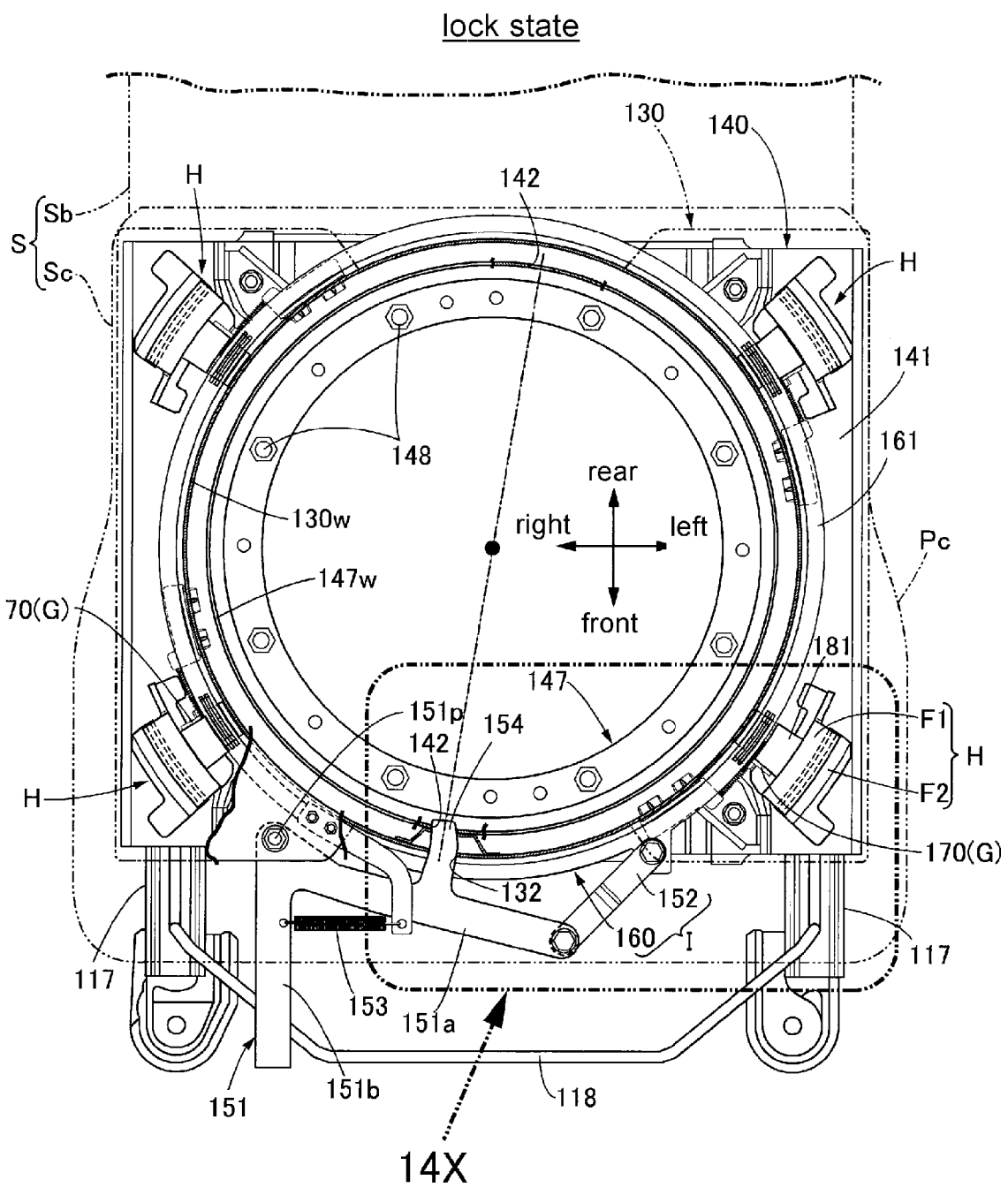
FIG. 12 is a view seen in a direction of arrow 12X in FIG. 11 (a lock mechanism is in a lock state).
Figure 14:
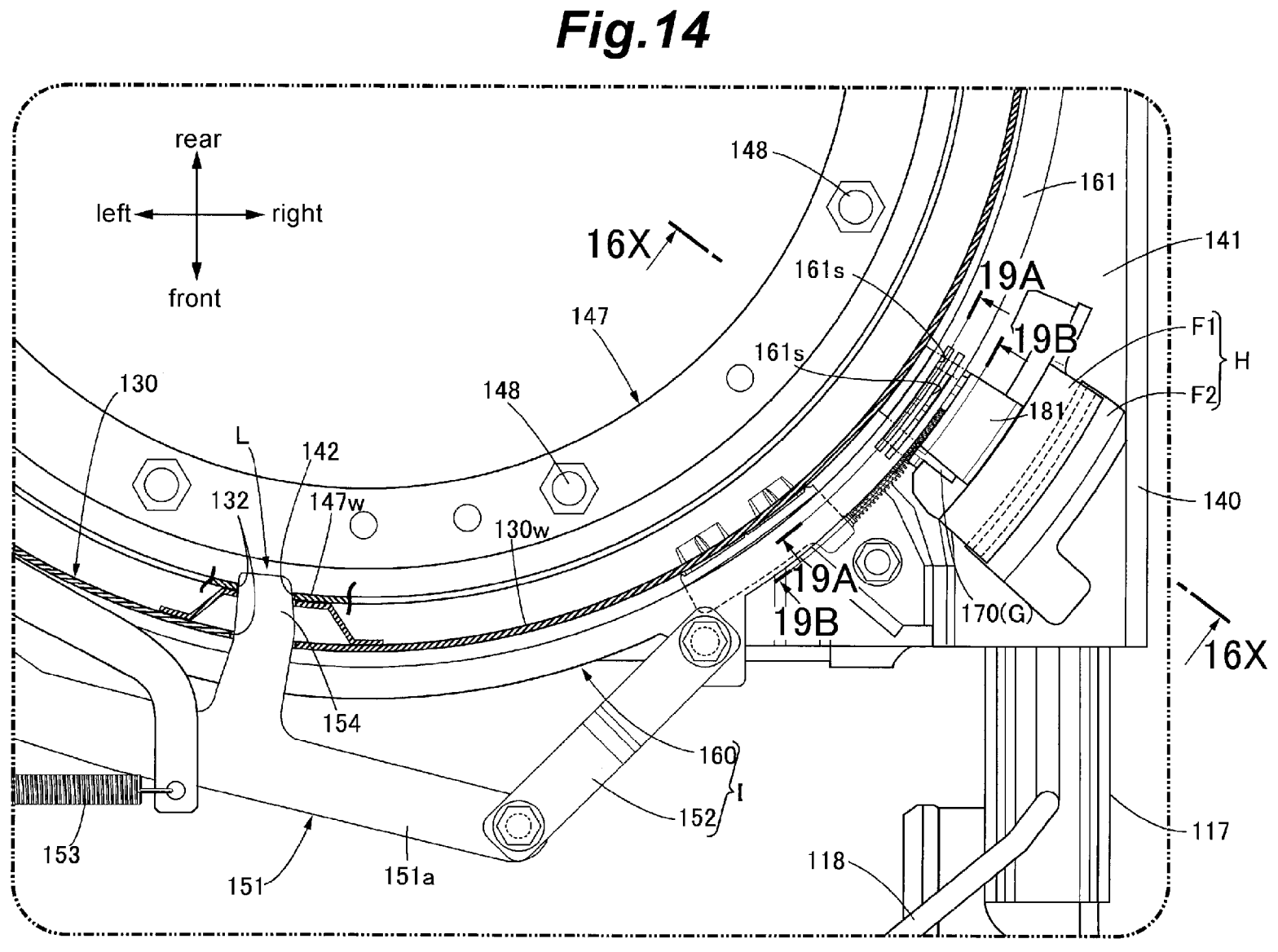

Thus, when the lock lever 151 is not operated, the lock mechanism L is in a lock state shown in FIGS. 12 and 14 and the locking claw 154 engages with the lock holes 132, 142 so that the rotation position of the rotary support body 130, and hence the seat body S, is locked. Also, at the time of unlock operation of the lock lever 151, the lock mechanism L is brought in an unlock state shown in FIGS. 13 and 15 and the locking claw 154 is disengaged from the lock holes 132, 142, whereby rotation of the rotary support body 130, and hence the seat body S, is permitted so that the rotation position of the seat body S can be arbitrarily changed.

The interlocking mechanism I includes, as a main part, an interlocking member 160 which interlocks the rattling suppression mechanism G with the lock mechanism L. The interlocking member 160 of the embodiment integrally includes an interlocking member main body 161 formed in a circular annular shape to pass between the deformation suppression mechanism H and the bearing 145 in the radial direction and is supported by the rotary support body 130 to be relatively rotatable, and a drive part 162 which is integrally formed on the interlocking member main body 161 and, in response to unlock operation of the lock mechanism L, gives a driving force to a later-described rattling suppression member 170 of the rattling suppression mechanism G.

Thus, since the interlocking member 160 is linked with the lock lever 151 via the link member 152, the interlocking member 160 is rotatable around the intermediate upright wall 130*w* of the rotary support body 130 by a predetermined small stroke in accordance with locking/unlocking of the lock mechanism L.

Next, referring to FIGS. 17 to 20 also, one example of the rattling suppression mechanism G which suppresses rattling of the rotary support body 130 in a state in which the rotation position of the rotary support body 130 is locked by the lock mechanism L will be described. The rattling suppression mechanism G includes, as a main component part thereof, a rattling suppression member 170 which suppresses the aforementioned rattling by closely contacting the base body 140 and the rotary support body 130, and particularly in the first embodiment, the rattling suppression member 170 is radially disposed between the deformation suppression mechanism H and the bearing 145.

The rattling suppression member 170 is configured by integrally joining a main body part 171 which can be pushed in and press-contacted between a first receiving part 181 provided on the base body 140 and a second receiving part 182 provided on the rotary support body 130 and a driven part 172 which receives, from the interlocking member 160, a driving force for driving the main body part 171 in a direction opposite to the direction of pushing in between the first and second receiving parts 181, 182 to disable the rattling suppression member 170 at the time of unlocking. The main body part 171 and the driven part 172 of the present embodiment are arranged in parallel to each other in a direction perpendicular to the direction in which they rotate in conjunction with the rotary support body 130 (radial direction in the embodiment). Also, as is apparent in FIG. 16, the first receiving part 181 of the present embodiment is formed in an L-shape in cross section and is erected on and fixed to the base plate 141 (and hence the base body 140) in a position radially inward of the first hook F1 while the second receiving part 182 is formed in an L-shape in cross section and is fixed to the rotary support body 130 to be on a lower side of the first receiving part 181 so that the main body part 171 can be sandwiched between the first and second receiving parts 181, 182 in the up-down direction. Further, the rear surface of the first receiving part 181 is supported by the first hook F1, and thus, the first receiving part 181 is reinforced by the first hook F1.

Moreover, the first and second receiving parts 181, 182 are arranged to oppose each other in the up-down direction such that when the main body part 171 of the rattling suppression member 170 is pushed in and press-contacted between the two receiving parts 181, 182, the main body part 171 is sandwiched by them in the up-down direction.

Also, a receiving surface 172*f* of the driven part 172 of the rattling suppression member 170 functions as a first inclined surface that is inclined downward toward the drive part 162 of the interlocking member 160 in the circumferential direction of the rotary support body 130, and a front surface 162*f* of the drive part 162 which serves as a pushing surface and is slidably engaged with the first inclined surface (the receiving surface 172*f*) is formed as an inclined surface which is inclined upward toward the driven part 172 at the same inclination angle as that of the receiving surface 172*f*.

Further, a lower pressure contact surface 171*f*2 of the main body part 171 which can be press-contacted with the second receiving part 182, which is the lower one of the first and second receiving parts 181, 182, functions as a second inclined surface that is inclined upward toward the lower, second receiving part 182 in the circumferential direction, and a pressure receiving surface 182*f* of the lower, second receiving part 182 which is press-contacted with the second inclined surface (the pressure contact surface 171*f*2) in a slidable manner is formed as an inclined surface that is incline downward toward the main body part 171 at the same inclination angle as that of the pressure contact surface 171f2.

In addition, a pressure receiving surface 181f of the upper, first receiving part 181 and an upper pressure contact surface 171f1 of the main body part 171 to be press-contacted therewith are each formed as a horizontal surface.

Thus, the main body part 171 is formed in a tapered wedge-like shape sandwiched by the upper, horizontal pressure contact surface 171f1 and the lower, upward-inclined pressure contact surface 171f2, and when under the elastic force of the spring 176, this is pushed in between the receiving parts 181f, 182f of the first and second receiving parts 181, 182 like a wedge, the two pressure contact surfaces 171f1, 171f2 press-contact the two receiving parts 181f, 182f tightly, thereby capable of functioning to suppress rattling of the rotary support body 130 (and hence the seat body S).

Also, the interlocking member main body 161 of the interlocking member 160 is formed in a U-shape in cross section so as to be open on the lower side, and the horizontal ceiling wall portion of this is formed with one or multiple slits 161s arranged in the radial direction and extending in the circumferential direction of the rotary support body 130. These slits 161s are arranged adjacent to the drive part 162 in the circumferential direction, and an upper portion 172a of the driven part 172 fitted in the interlocking member main body 161 is fitted in each slit 161s to be slidable in the circumferential direction.

Further, the rattling suppression mechanism G includes a spring 176 that gives the rattling suppression member 170 an elastic force capable of pushing the main body part 171 in between the first and second receiving parts 181, 182 to be press-contacted therewith and a spring support member 177 that supports the base end of the spring 176 on the rotary support body 130. A tip of the spring 176 is fitted in a depression formed in the main body part 171 and the tip of the spring 176 is engaged with the inner end of the depression. The spring 176 and the spring support member 177 are provided in a position where mutual interference between the deformation suppression mechanism H and them can be avoided.

Further, the spring support member 177 includes a vertical wall portion 177v fixed to the intermediate upright wall 130w of the rotary support body 130 (in the embodiment, secured with clips) and a lateral wall portion 177h integrally connected to the outer side surface of the vertical wall portion 177v, and a horizontal upper surface of the lateral wall portion 177h integrally has an interlocking member receiving part 177ha which supports the interlocking member main body 161 in a rotationally slidable manner relative to each other.

Incidentally, in the first embodiment, the rattling suppression member 170 is provided at each of all four corner portions of the rotary support body 130 (and hence to be spaced in the circumferential direction) and thus, four rattling suppression members 170 are provided in all. Therefore, corresponding to the four rattling suppression members 170, four spring support members 177 are respectively fixed to all four corner portions of the rotary support body 130 (and hence to be spaced in the circumferential direction).

Next, operation of the first embodiment will be described.

Figure 19:
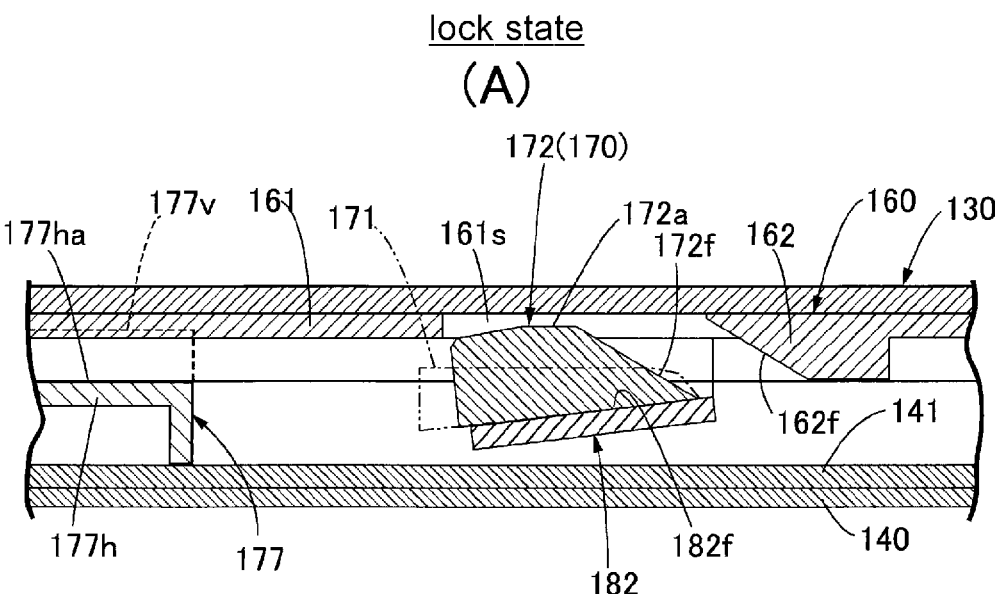
FIG. 19 shows a relative positional relationship between an interlocking member, a rattling suppression member, and first and second receiving parts in the lock state, where (A) is a sectional view taken along line 19A-19A in FIG. 14 and (B) is a sectional view taken along line 19B-19B in FIG. 14.
Figure 19:
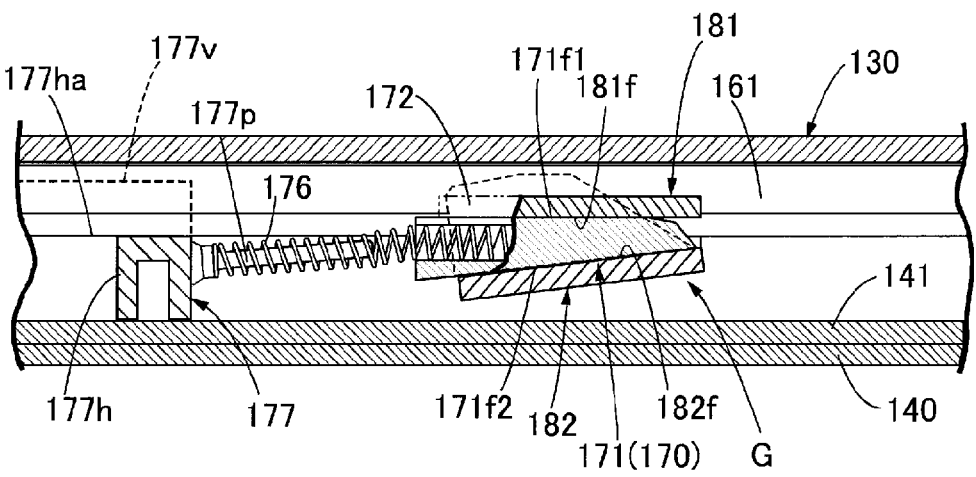

FIGS. 11, 12, and 14 show the state in which the lock mechanism L locks the seat body S in the forward-facing rotation position, and in this state, the locking claw 154 of the lock lever 151 engages with each of the lock holes 132, 142 of the rotary support body 130 and the base body 140 (the holding plate 147) and restricts the rotation of the seat body S. At this time, as shown in FIG. 19, the rattling suppression member 170 of the rattling suppression mechanism G is in a state in which the driven part 172 thereof is not engaged with the drive part 162 of the interlocking member 160 (namely, free), and therefore, the tapered main body part 171 which receives the elastic force of the spring 176 is pushed in between the receiving surfaces 181f, 182f of the first and second receiving parts 181, 182 like a wedge, and the pressure contact surfaces 171f1, 171f2 of the main body part 171 are press-contacted with the receiving surfaces 181f, 182f, whereby the rattling of the rotary support body 130, and hence the seat body S, is suppressed.

Figure 13:
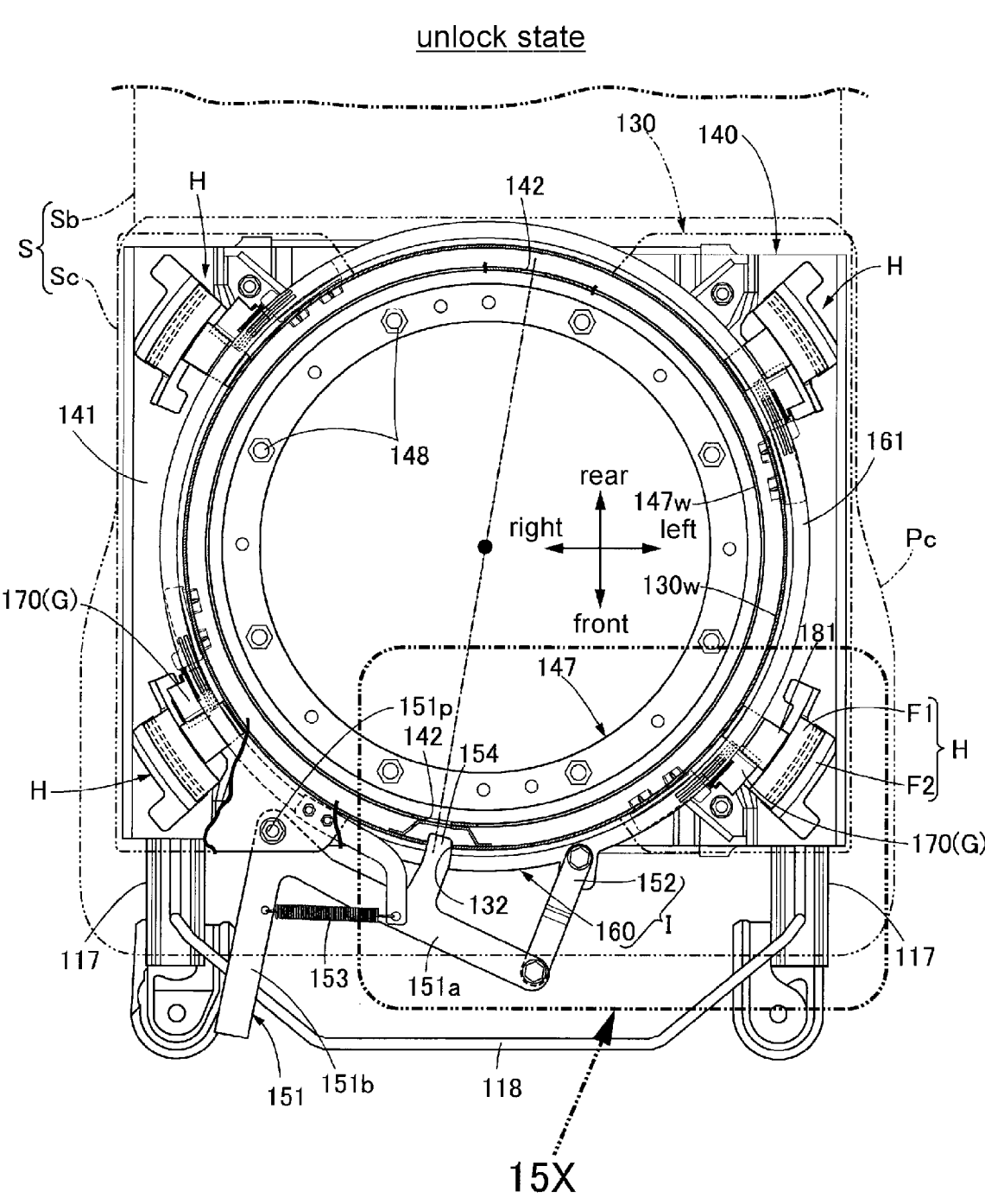
FIG. 13 is a view seen in a direction of arrow 12X in FIG. 11 (the lock mechanism is in an unlock state).
Figure 15:
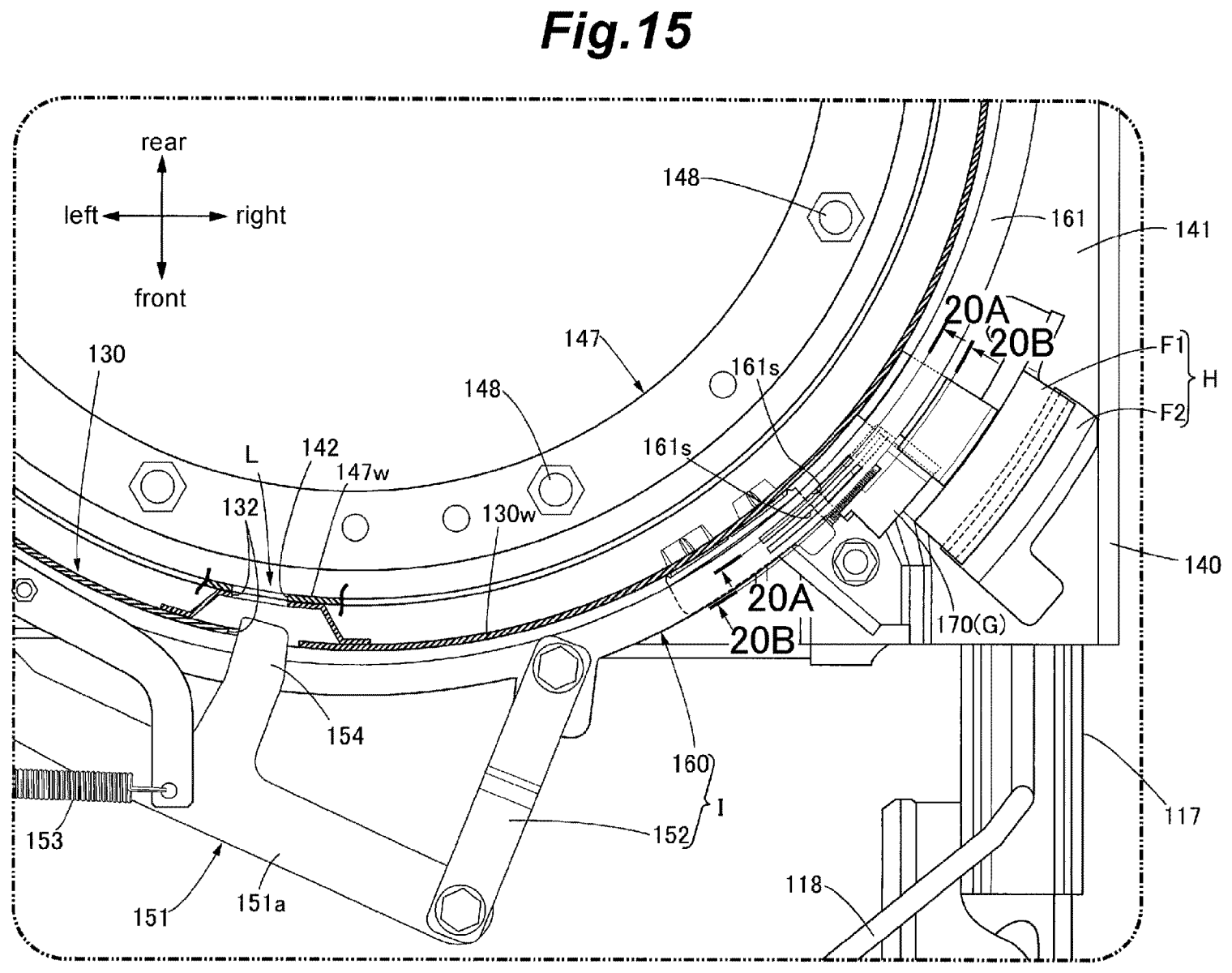
Figure 16:
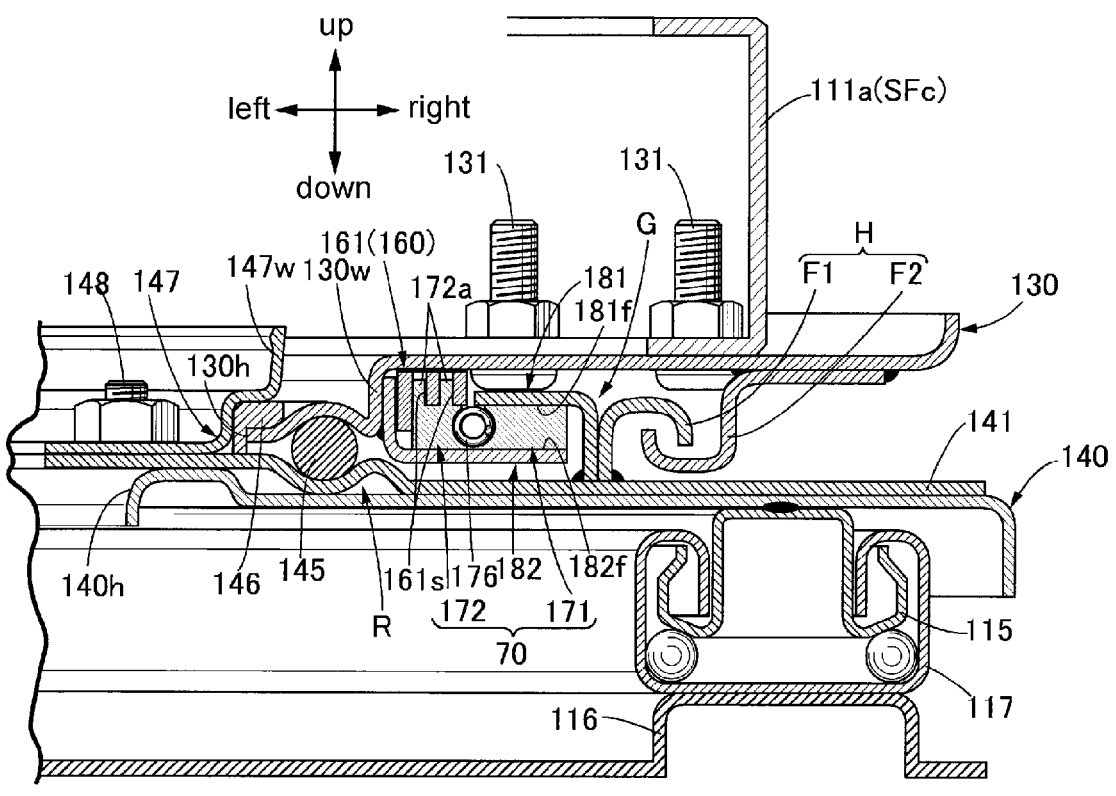
FIG. 16 is an enlarged sectional view taken along line 16X-16X in FIG. 14.
Figure 17:
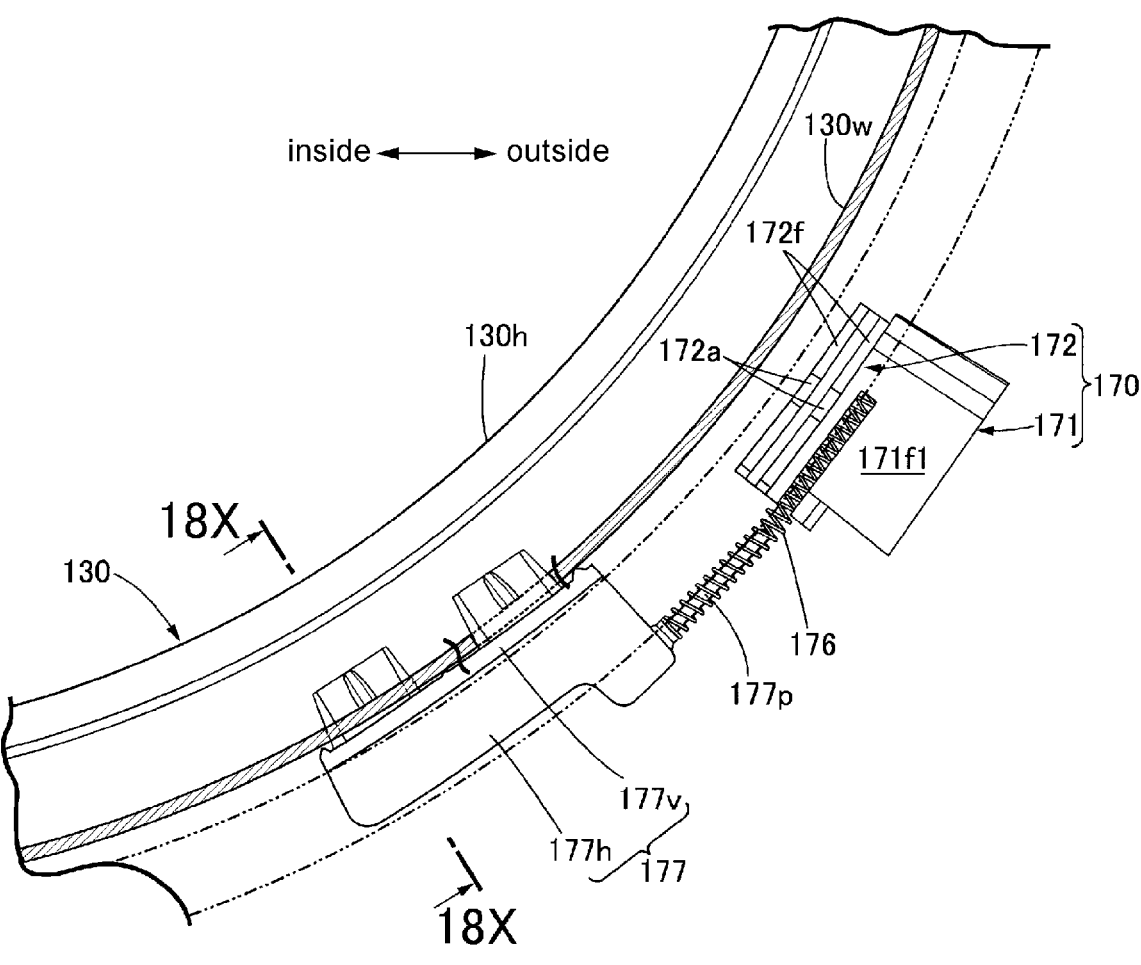
FIG. 17 is a plan view showing a support form of a spring support member and a spring on the rotary support body and an engagement mode between a rattling suppression member and the spring.
Figure 18:
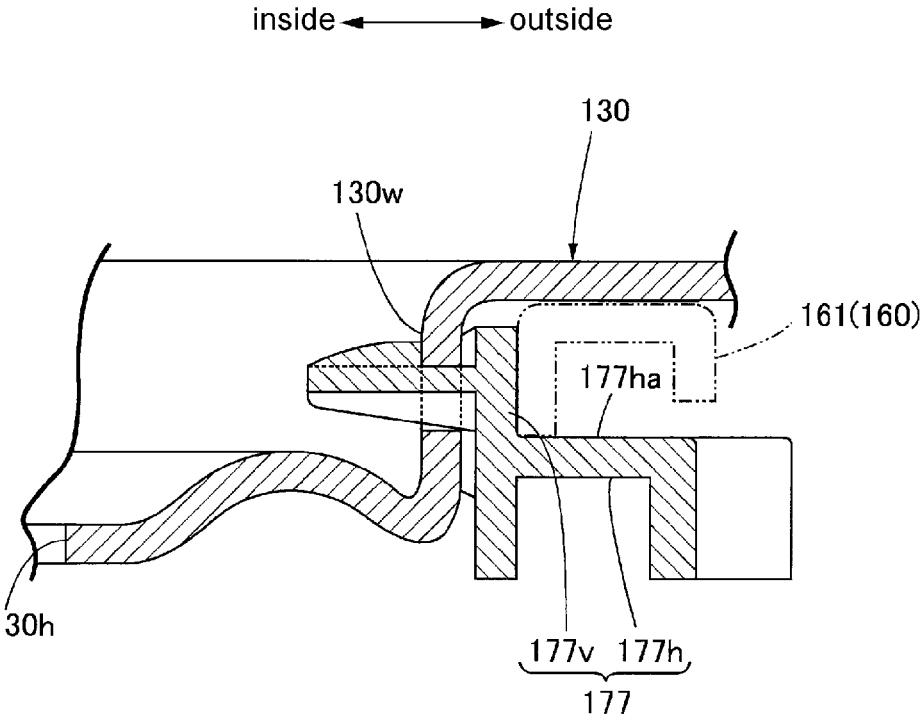
FIG. 18 is an enlarged sectional view taken along line 18X-18X in FIG. 17.
Figure 20:
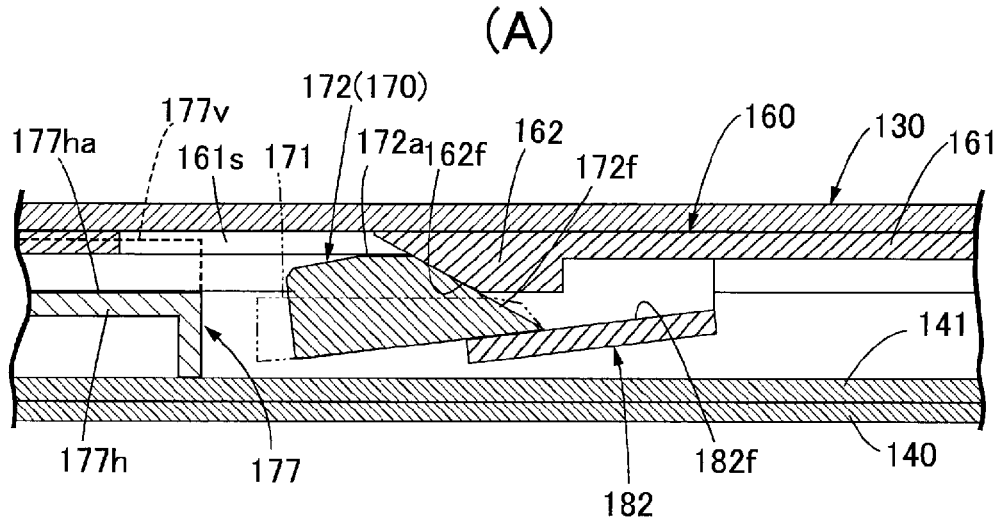
FIG. 20 shows a relative positional relationship between the interlocking member, the rattling suppression member, and the first and second receiving parts in an unlock state, where (A) is a sectional view taken along line 20A-20A in FIG. 15 and (B) is a sectional view taken along line 20B-20B in FIG. 15.
Figure 20:
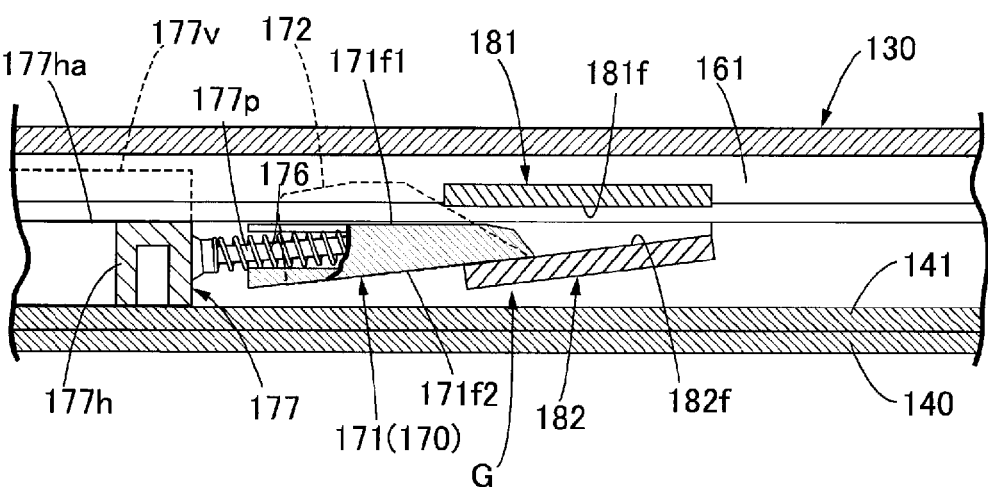
Figure 21:
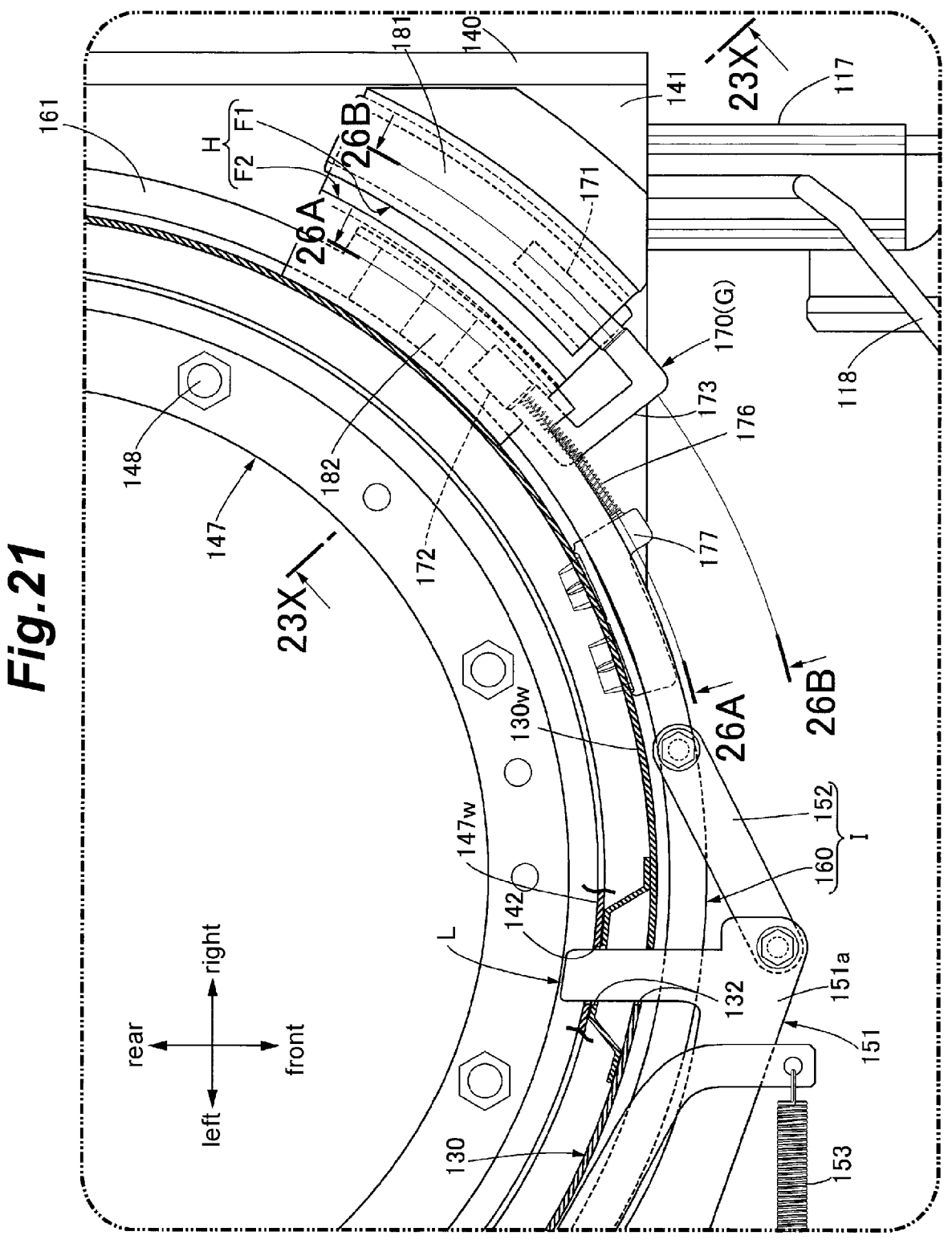
FIG. 21 is a plan view of a main part showing a lock state of the lock mechanism in the second embodiment (a drawing corresponding to FIG. 14).
Figure 22:
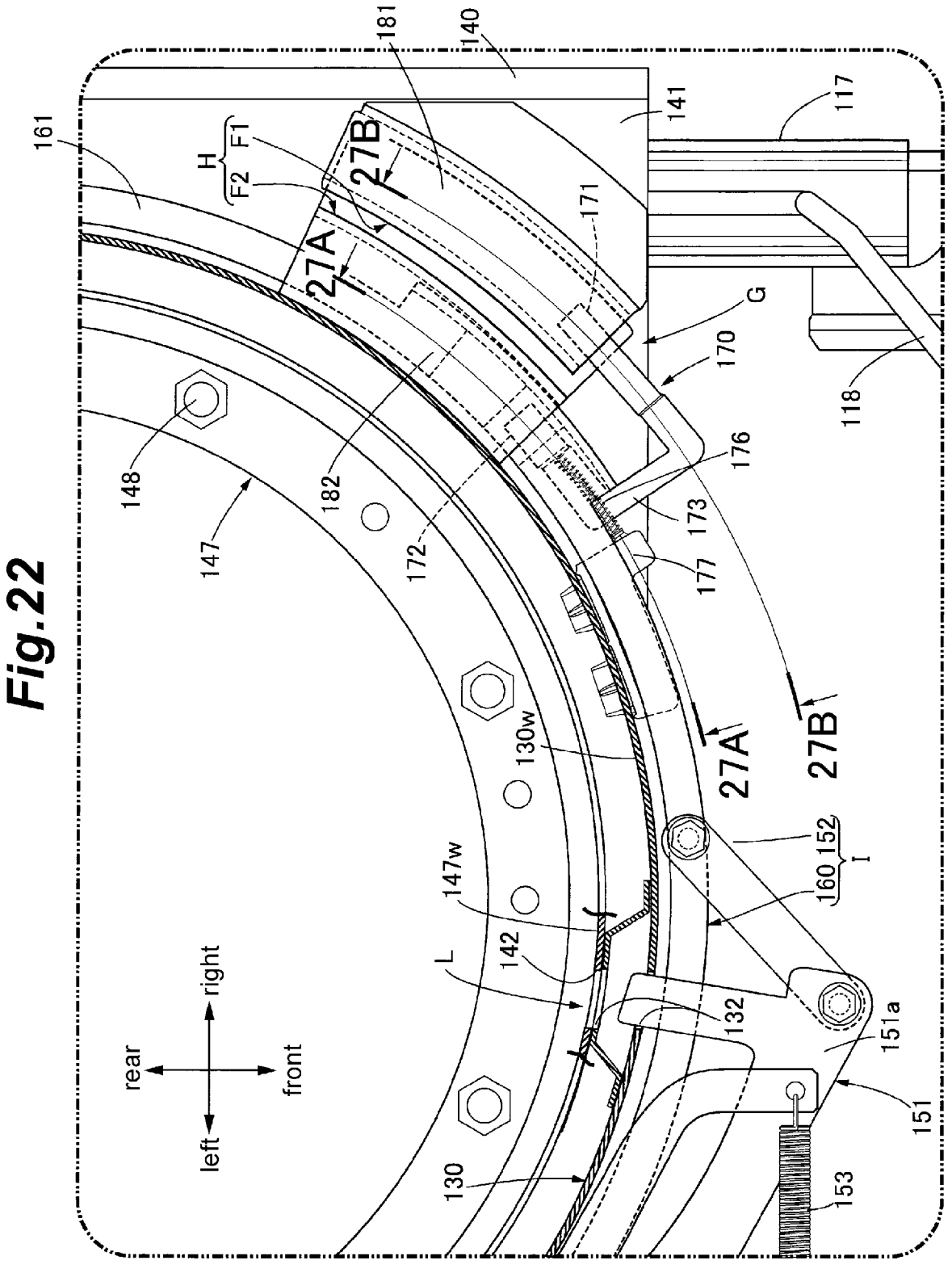
FIG. 22 is a plan view of a main part showing an unlock state of the lock mechanism in the second embodiment (a drawing corresponding to FIG. 15).

As shown in FIGS. 13 and 15, when, from the aforementioned lock state, the lock lever 151 is unlock-operated against the elastic force of the lock spring 153, the locking claw 154 is released from the lock holes 132, 142 of the rotary support body 130 and the base body 140, and in conjunction with the lock lever 151, the interlocking member 160 slightly rotates relative to the rotary support body 130 clockwise in FIG. 13. With this rotation, as shown in FIG. 20, the driven part 172 of the rattling suppression member 170 is pushed by the drive part 162 of the interlocking member 160 and moves backward (leftward in FIG. 20) against the elastic force of the spring 176, and along with this, the main body part 171 also moves backward (leftward in FIG. 20), so that the pressure contact surfaces 171f1, 171f2 of the main body part 171 move backward to be separated from the receiving surfaces 181f, 182f of the first and second receiving parts 181, 182, whereby the rattling suppression function of the rattling suppression member 170 is temporarily disabled.

Thus, arbitrary rotation of the seat body S is permitted in the unlock state, and therefore, the occupant can perform operation to smoothly rotate the seat body S to another rotation position (in the embodiment, to the backward facing rotation position) while seated on the seat body S.

Then, after the seat body S has reached the other rotation position, if the occupant releases the hand from the lock lever 151, the lock lever 151 automatically returns to the lock position shown in FIGS. 11, 12, and 14 under the elastic force of the lock spring 153. And, following the automatic return, the interlocking member 160 rotates accordingly, whereby the locking claw 154 engages with the lock holes 132, 142 of the rotary support body 130 and the base body 140 and restricts the rotation of the seat body S. At this time, the rattling suppression member 170 is in the state in which the driven part 172 thereof is not engaged with the drive part 162 of the interlocking member 160 (namely, free), and therefore, the tapered main body part 171 under the elastic force of the spring 176 is pushed in between the receiving surfaces 181f, 182f of the first and second receiving parts 181, 182 like a wedge, and the pressure contact surfaces 171f1, 171f2 of the main body part 171 are press-contacted with the receiving surfaces 181f, 182f, whereby the rattling of the rotary support body 130, and hence the seat body S, can be suppressed again.

According to the first embodiment described in the foregoing, in the seat device 110 in which the deformation suppression mechanism H is interposed between the rotary support body 130 and the base body 140 in a position radially outside the bearing 145 supporting the rotary support body 130 on the base body 140, the rattling suppression member 170 supported on the rotary support body 130 to be slidable in the circumferential direction can be closely contacted between the rotary support body 130 and the base body 140 to suppress the rattling of the rotary support body 130 in a state in which the seat body S is locked in a predetermined rotation position. Further, since this rattling suppression member 170 is disposed between the deformation suppression mechanism H and the bearing 145 in the radial direction, the contact action points of the rattling suppression member 170 with the rotary support body 130 and the base body 140 can be located distant from the rotational center of the rotary support body 130, and therefore, the rattling suppression effect of the rattling suppression member 170 can be exerted more strongly than in the conventional device due to the lever ratio from the rotational center.

Also, the aforementioned rattling suppression member 170 is configured by integrally joining the main body part 171 which can be pushed in and press-contacted between the first receiving part 181 on the base body 140 and the second receiving part 182 on the rotary support body 130 and the driven part 172 which receives, from the interlocking member 160, a driving force for driving the main body part 171 in the direction opposite to the direction of pushing in between the first and second receiving parts 181, 182 to disable the rattling suppression member 170, and the main body part 171 and the driven part 172 are arranged in parallel to each other in the direction (radial direction in the embodiment) perpendicular to the direction in which they rotate in conjunction with the rotary support body 130. Thus, in the rattling suppression member 170, the main body part 171 for rattling suppression and the driven part 172 for receiving the driving force (unlocking force) from the interlocking member 160 at the time of unlocking are arranged in parallel in the direction perpendicular to their rotation direction so that the functions are divided therebetween. As a result, optimal design in accordance with the respective functions of the main body part 171 and the driven part 172 is possible, and this increases the degree of design freedom of the rattling suppression member 170.

Also, in particular, since the parallel arrangement direction of the main body part 171 and the driven part 172 is a radial direction of the rotary support body 130, even though the main body part 171 and the driven part 172 are arranged in parallel, the rattling suppression member 170 can be vertically flattened as a whole, and therefore, can be disposed in a narrow space between the rotary support body 130 and the base body 140 without difficulty.

Further, since the interlocking member 160 of the embodiment has the drive part 162, which gives the aforementioned driving force to the driven part 172 in response to unlock operation of the lock mechanism L, between the deformation suppression mechanism H and the bearing 145 in the radial direction, the drive part 162 of the interlocking member 160 can be disposed in a position close to the driven part 172 of the rattling suppression member 170. Therefore, at the time of unlocking, the interlocking member 160 (the drive part 162) can efficiently drive the rattling suppression member 170 (the driven part 172).

Further, in the embodiment, the spring 176 which gives the rattling suppression member 170 an elastic force capable of pushing the main body part 171 in between the first and second receiving parts 181, 182 to be press-contacted therewith and the spring support member 177 which supports the base end of the spring 176 on the rotary support body 130 are provided in positions where mutual interference between the deformation suppression mechanism H and each of the spring 176 and the spring support member 177 can be avoided. Therefore, even with the structure for spring-urging the rattling suppression member 170 in one circumferential direction, the spring 176 and the spring support member 177 thereof can be supported on the rotary support body 130 without difficulty while avoiding interference with the deformation suppression mechanism H.

Further, the first and second receiving parts 181, 182 of the embodiment are arranged to oppose each other in the up-down direction so as to sandwich the main body part 171 in the up-down direction when the main body part 171 is pushed in and press-contacted between the two receiving parts 181, 182, the receiving surface 172$f$ of the driven part 172 consists of a first inclined surface which is inclined downward toward the drive part 162 of the interlocking member 160 in the circumferential direction of the rotary support body 130, and the pressure contact surface 171$f2$ of the main body part 171 which can be press-contacted with the lower receiving part 182 of the first and second receiving parts 181, 182 consists of a second inclined surface which is inclined upward toward the lower receiving part 182 in the circumferential direction. Therefore, at the time of unlocking, the drive part 162 of the interlocking member 160 drives the receiving surface 172$f$ of the driven part 1721 (namely, the first inclined surface) in the direction opposite to the direction of pushing the main body part 171 in between the first and second receiving parts 181, 182 (namely, the urging direction of the spring 176) while pushing it downward. Due to this driving, the pressure contact surface 172$f$ (namely, the second inclined surface) of the main body part 171 of the rattling suppression member 170 slides on the lower receiving part 182 while descending, and therefore, the press-contacting state of the main body part 171 with the upper receiving part 181 can be removed quickly and easily. Thus, operation switching of the rattling suppression member 170 to the temporary disabled state is performed smoothly.

Further, the interlocking member 160 of the embodiment is formed in a circular annular shape to pass between the deformation suppression mechanism H and the bearing 145 in the radial direction and is supported by the rotary support body 130 to be relatively rotatable, the interlocking member 160 is formed with one or multiple slits 161$s$ arranged in the radial direction and extending in the circumferential direction of the rotary support body 130, where the upper portion 172$a$ of the driven part 172 is fitted in the slit 161$s$ to be slidable in the circumferential direction. Therefore, when the rotary support body 130 is locked again in the predetermined rotation position from the temporary unlock state and the main body part 171 of the rattling suppression member 170 is pushed in and press-contacted between the first and second receiving parts 181, 182, the upper portion 172$a$ of the driven part 172 is slidably fitted in the aforementioned slit 161$s$, whereby lateral shaking is suppressed effectively. Therefore, the rattling suppression member 170 can make the main body part 171 be press-contacted with the first and second receiving parts 181, 182 properly while maintaining a stable posture.

In addition, in the embodiment, multiple rattling suppression members 170 are provided at the four corners of the rotary support body 130 (namely, to be spaced in the circumferential direction), multiple spring support members 177 corresponding to the rattling suppression members 170 are likewise fixed at the four corners of the rotary support body 130, and the spring support members 177 each have the interlocking member receiving part 177$ha$ that supports the interlocking member 160 which has a circular annular shape to be relatively rotatable. Thereby, the spring support members 177 can be used as means for supporting the interlocking member 160 having a circular annular shape, which can contribute to simplifying the structure of the device.

Further, the deformation suppression mechanism H of the embodiment is disposed such that the second hook F2 fixed to the rotary support body 130 is located outward of the first hook F1 fixed to the base body 140 in the radial direction, and the first receiving part 181 is fixed to the base body 140 in a position inward of the first hook F1 in the radial direction while the second receiving part 182 is fixed to the rotary support body 130 to be on a lower side of the first receiving part 181 so that the main body part 171 can be sandwiched between the first and second receiving parts 181, 182 in the up-down direction. Therefore, even though the whole of the rattling suppression member 170 is radially disposed between the bearing 145 and the deformation suppression mechanism H, it is possible to ensure that in the narrow space between them, the first and second receiving parts 181, 182 have effective receiving surfaces that are sufficiently wide in the radial direction, and the rattling suppression effect can be enhanced.

Moreover, since the rear surface of the first receiving part 181 is supported by the first hook F1, the first hook F1 can be used as reinforcing support means for the first receiving part 181, and therefore, it is possible to simplify the structure of the device while enhancing the support stiffness of the first receiving part 181.

Next, with reference to FIGS. 21 to 27, description will be made of characteristic parts of the second embodiment. In the second embodiment, the rattling suppression member 170 which is a main component part of the rattling suppression mechanism G is radially disposed to straddle a space between the deformation suppression mechanism H and the bearing 145 and an inside of the deformation suppression mechanism H.

Figure 23:
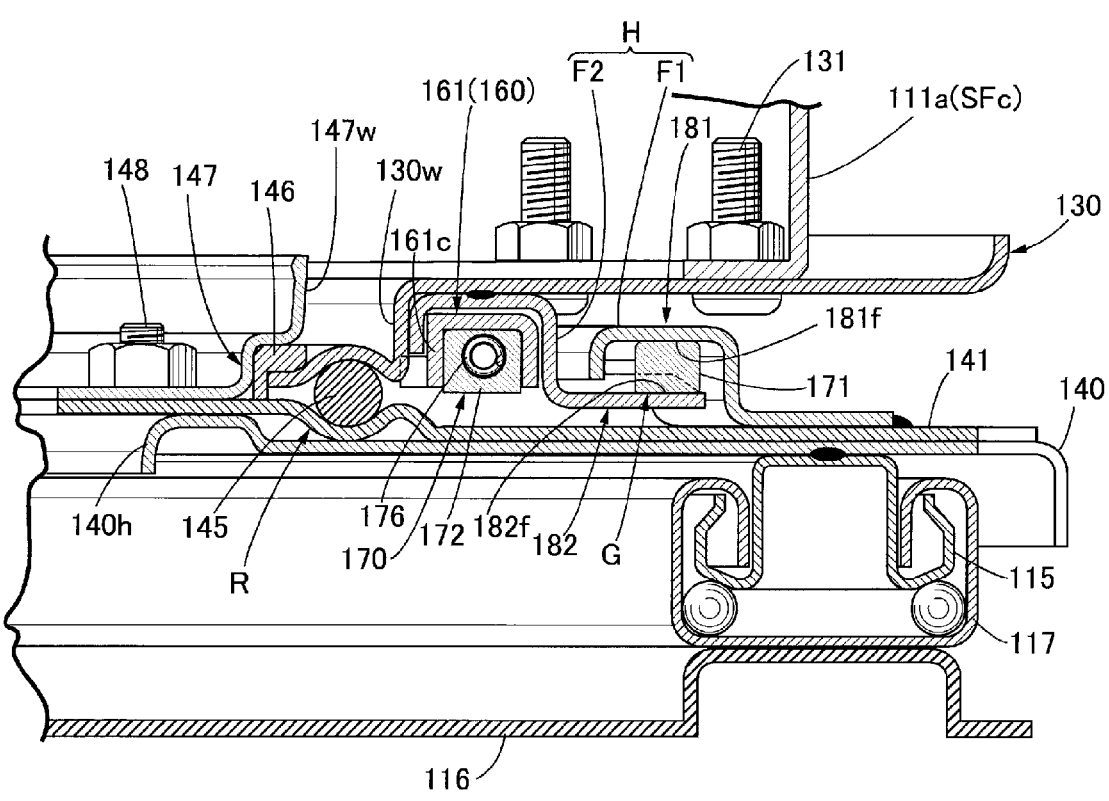
FIG. 23 is an enlarged sectional view taken along line 23X-23X in FIG. 21.
Figure 24:
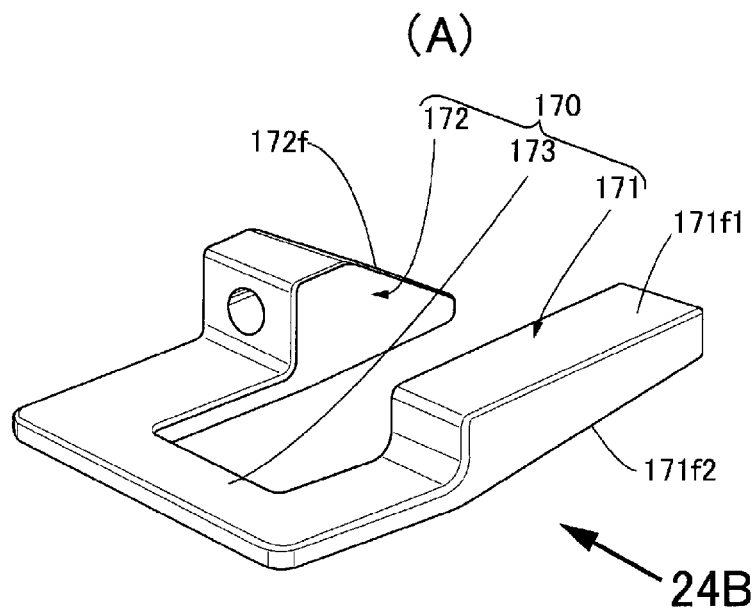
FIG. 24 shows the rattling suppression member of the second embodiment alone, where (A) is a perspective view and (B) is a side view (namely, a view seen in a direction of arrow 24B in FIG. 24(A)).
Figure 24:
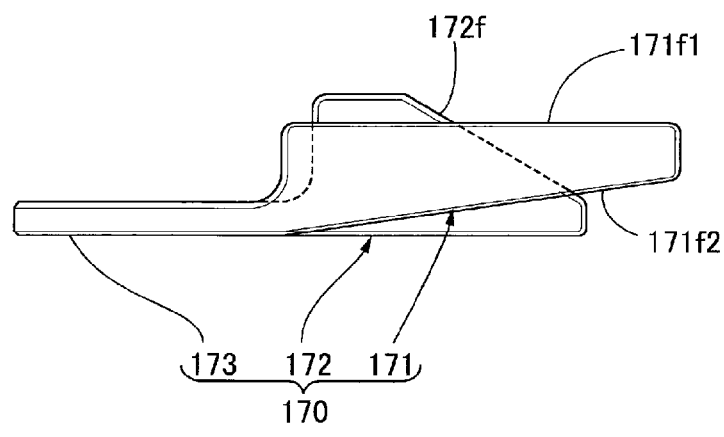
Figure 25:
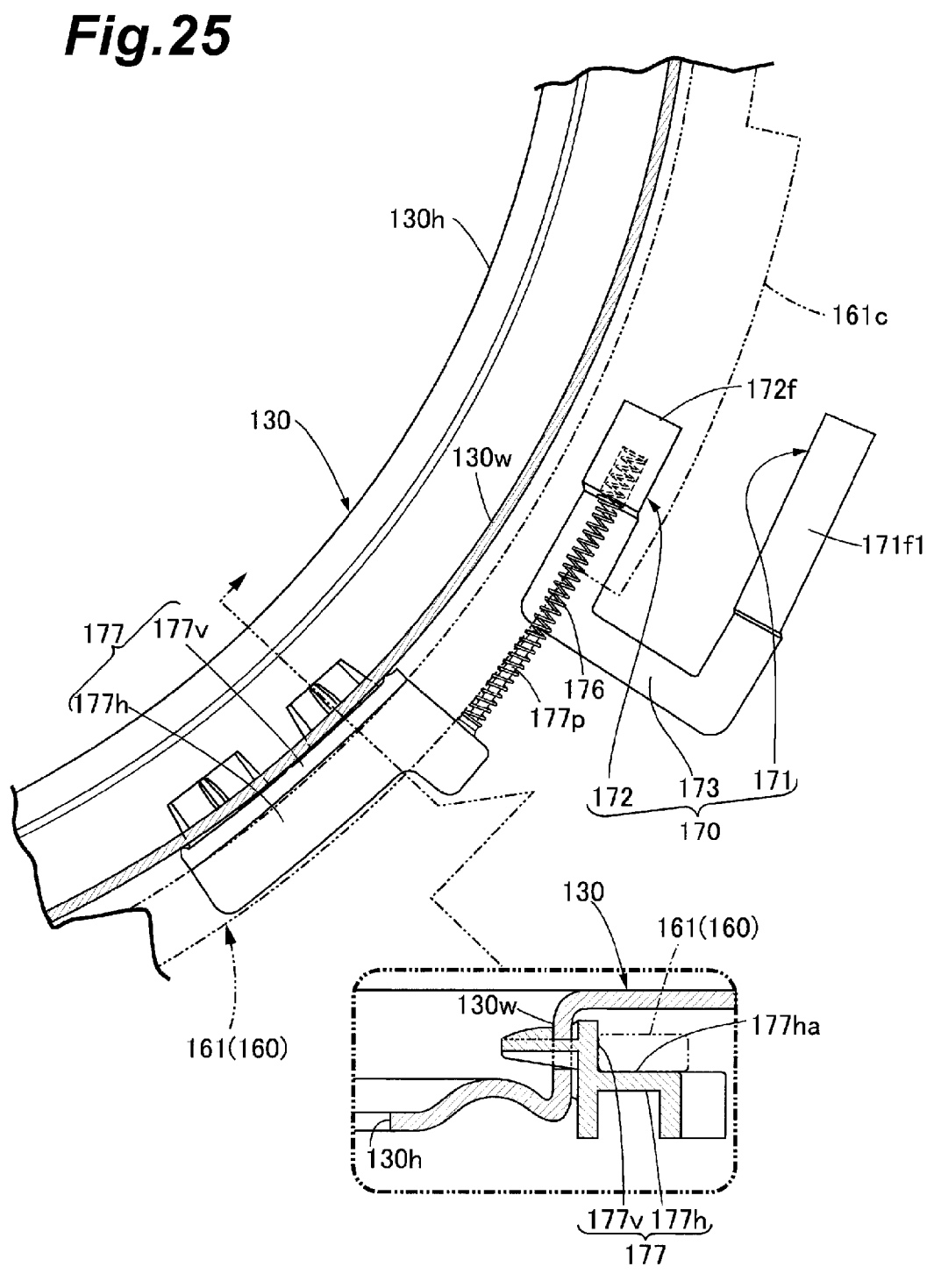
FIG. 25 is a plan view showing a support form of the spring support member and the spring on the rotary support body and an engagement mode between the rattling suppression member and the spring in the second embodiment.

Further, similarly to the first embodiment, the deformation suppression mechanism H is provided with the first hook F1 fixedly provided on the base body 140 to integrally include the first receiving part 181 and the second hook F2 fixedly provided on the rotary support body 130 to integrally include the second receiving part 182, but in the second embodiment, the deformation suppression mechanism H is disposed such that the first hook F1 is located outward of the second hook F2 in the radial direction and the second receiving part 182 is located below the first receiving part 181, as shown in FIG. 23.

The main body part 171 of the rattling suppression member 170 is disposed between the first and second hooks F1, F2, the driven part 172 of the same is disposed between the second hook F2 and the bearing 145, and the main body part 171 can be sandwiched between the first and second receiving parts 181, 182 in the up-down direction.

In the rattling suppression member 170 of this second embodiment, the main body part 171 and the driven part 172 are arranged in parallel to be spaced from each other in the radial direction and are integrally joined to each other via a connecting portion 173. The connecting portion 173 extends outward in the circumferential direction of the deformation suppression mechanism H and is disposed in a position where mutual interference with the deformation suppression mechanism H can be avoided.

Further, the base end of the spring 176 that exerts an elastic force for pushing the rattling suppression member 170 in between the first and second receiving parts 181, 182 is supported by the spring support member 177, and the tip of the spring 176 is engaged with a rear side of the driven part 172 (namely, the side opposite from the drive part 162).

Namely, the tip of the spring 176 is fitted in a depression (concave hole) formed in the rear surface of the driven part 172 and the tip of the spring 176 is engaged with the inner end of the depression. Note that, similarly to the first embodiment, the spring support member 177 is fixed (for example, secured with clips) to the intermediate upright wall 130w of the rotary support body 130.

Figure 26:
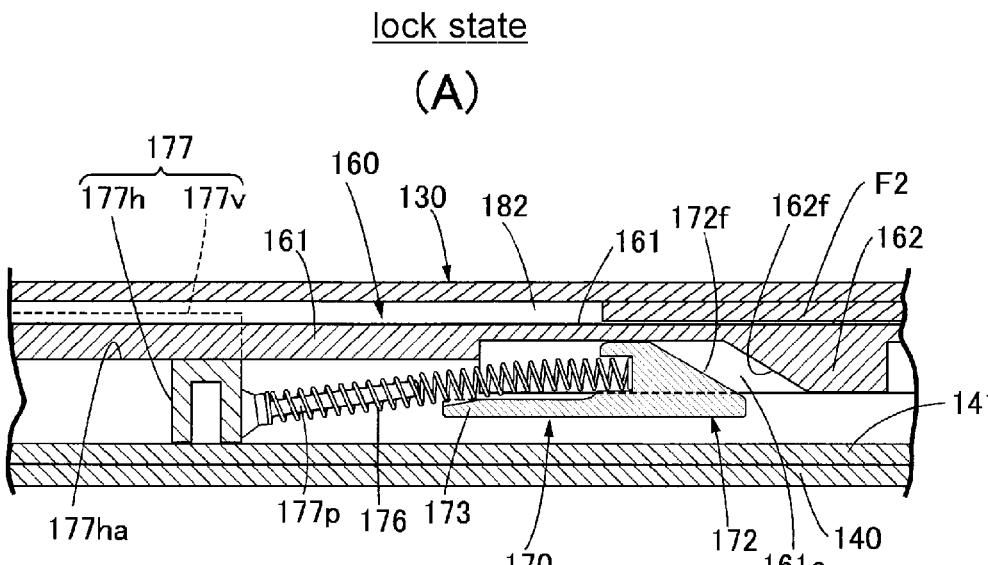
FIG. 26 shows a relative positional relationship between the interlocking member, the rattling suppression member, and the first and second receiving parts in the lock state, where (A) is a sectional view taken along line 26A-26A in FIG. 21 and (B) is a sectional view taken along line 26B-26B in FIG. 21.
Figure 26:
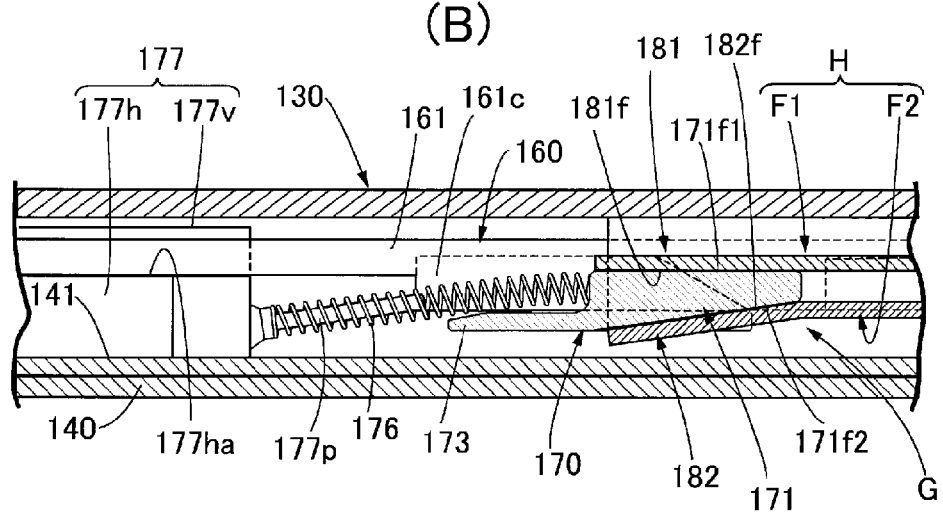
Figure 27:
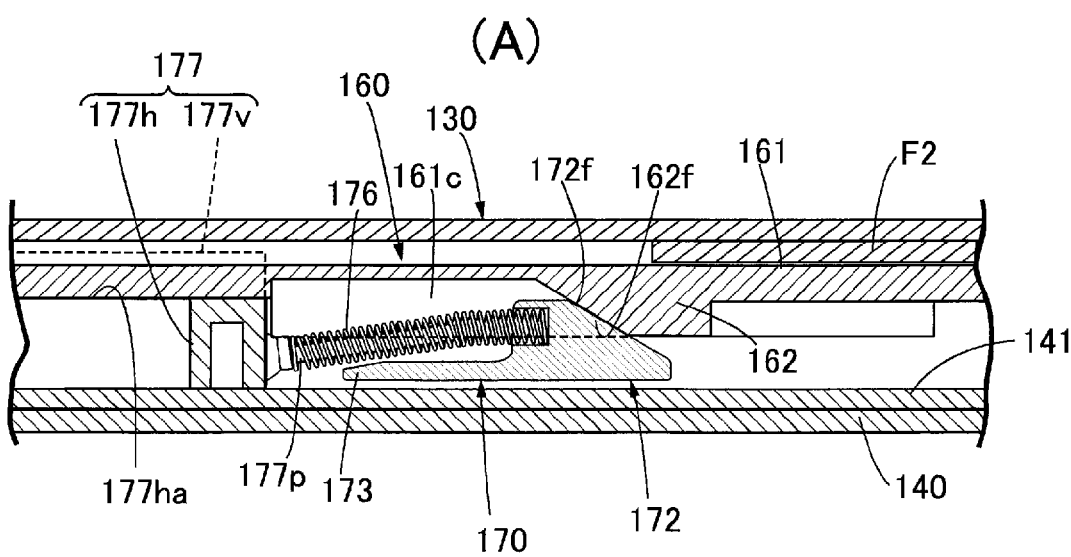
FIG. 27 shows a relative positional relationship between the interlocking member, the rattling suppression member, and the first and second receiving parts in the unlock state, where (A) is a sectional view taken along line 27A-27A in FIG. 22 and (B) is a sectional view taken along line 27B-27B in FIG. 22.
Figure 27:
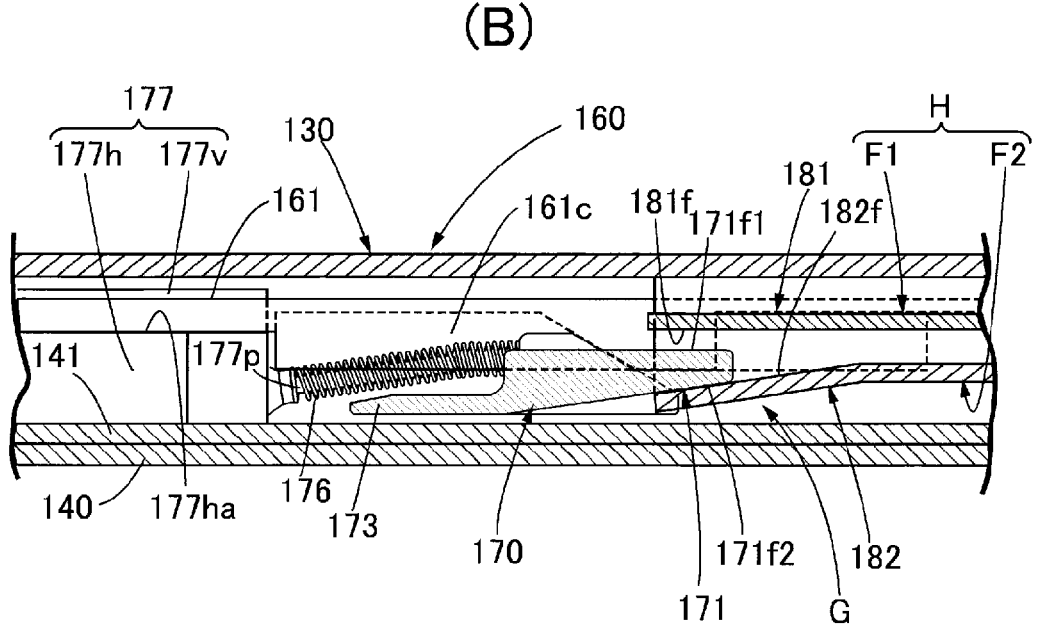

Further, most part of the interlocking member main body 161 of the interlocking member 160 is formed in a vertically flat, circular ring plate shape, but a part thereof (namely, a part in which the driven part 172 is slidably fitted and a part around it) is formed in a U-shape in cross section so as to open on the lower side (see FIGS. 23, 26, and 27). Also, the interlocking member main body 161 is not provided with the slits 161s as shown in the first embodiment in the ceiling wall portion of the U-shaped part 161c.

The other configuration of the second embodiment is basically the same as the first embodiment, and therefore, each component is denoted by the same reference sign as that of the corresponding component in the first embodiment, and further description will be omitted.

In the second embodiment, particularly, the deformation suppression mechanism H is provided with the first hook F1 fixedly provided on the base body 140 to integrally include the first receiving part 181 and the second hook F2 fixedly provided on the rotary support body 130 to integrally include the second receiving part 182 and is disposed such that the first hook F1 is located outward of the second hook F2 in the radial direction and the second receiving part 182 is located lower than the first receiving part 181, the main body part 171 of the rattling suppression member 170 is disposed between the first and second hooks F1, F2, the driven part 172 of the rattling suppression member 170 is disposed between the second hook F2 and the bearing 145, and the main body part 171 can be sandwiched between the first and second receiving parts 181, 182 in the up-down direction. Thereby, the first and second hooks F1, F2 are respectively used as the first and second receiving parts 181, 182, respectively, whereby the structure of the device is simplified, and further, the dead space between the first and second hooks F1, F2 can be effectively used as an installation space for a part (main body part 171) of the rattling suppression member 170, and this contributes to making the device compact accordingly.

Further, since the main body part 171 and the driven part 172 in the second embodiment are integrally joined via the connecting portion 173 which extends outward in the circumferential direction of the deformation suppression mechanism H to be capable of avoiding mutual interference with the deformation suppression mechanism H, even when arrangement is made such that the rattling suppression member 170 (the main body part 171 and the driven part 172) straddles inside and outside of the deformation suppression mechanism H, the main body part 171 and the driven part 172 inside and outside thereof can be integrally joined by the aforementioned connecting portion 173 without difficulty while avoiding interference with the deformation suppression mechanism H.

The other operation and effect of the second embodiment are the same as the operation and effect of the first embodiment, and therefore, further description will be omitted.

In the foregoing, embodiments of the present invention have been described, but the present invention is not limited to them, and various design modifications may be made without departing from the spirit thereof.

For example, in the embodiments, an example in which the rotation position of the seat body S can be selected in two stages from two rotation positions, namely, the front rotation position where the seat body S faces forward and the back rotation position which is phase-shifted by 180 degrees therefrom to face rearward, was shown, but the rotation positions of the seat body S that can be selected arbitrarily are not limited to the embodiments. Namely, the rotation positions may be differently set or three or more rotation positions may be set, and in such cases, the opening positions of the lock holes 142 of the base body 140 may be changed or added in accordance with the set rotation positions.

Embodiment(s) of the Means to Accomplish the Fourth Task

In the following description of the embodiment(s), "front/rear," "left/right," and "up/down" directions refer to the directions as viewed from an occupant seated on the seat when the seat is in such a posture that the occupant faces forward.

Figure 28:
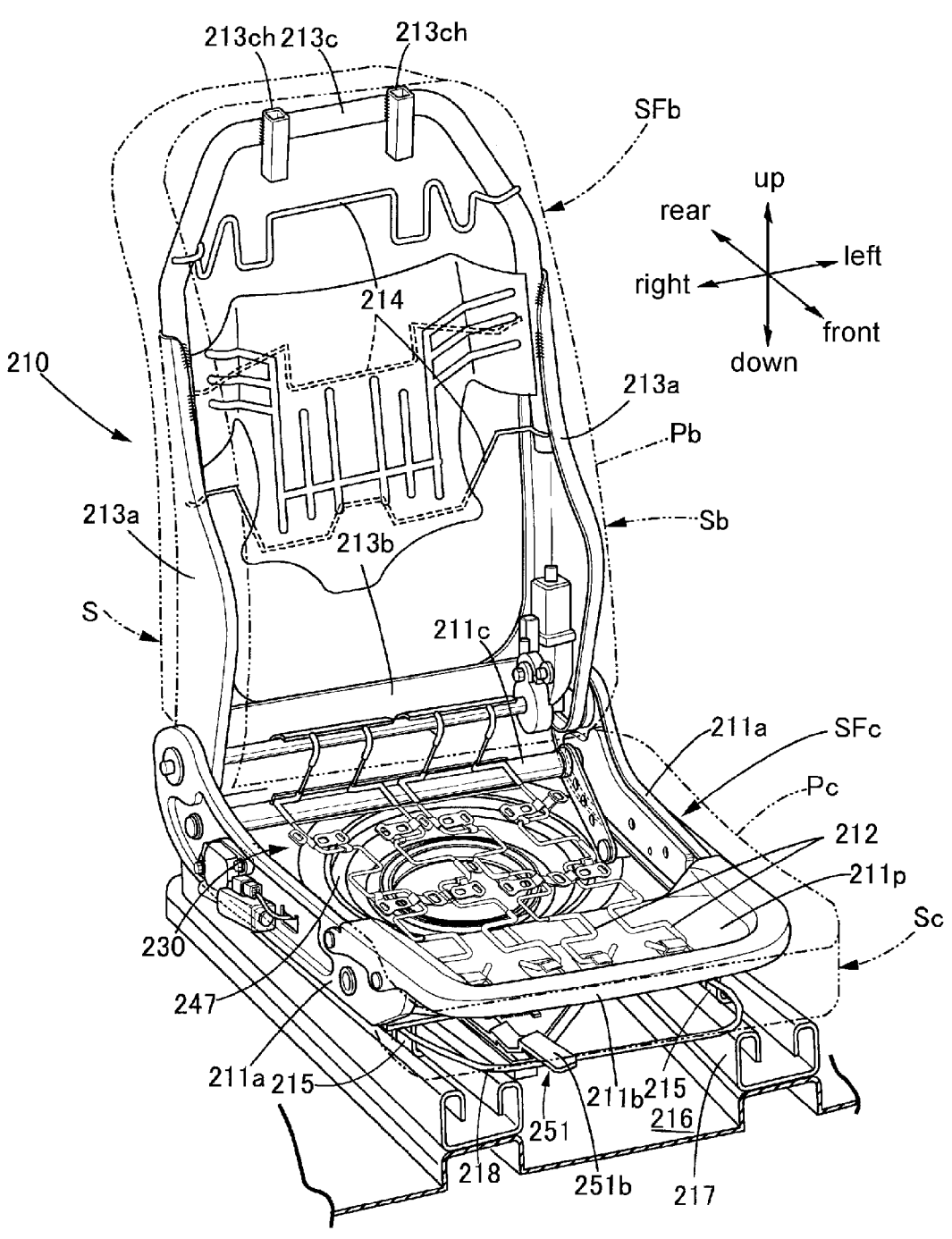
FIG. 28 is an overall perspective view showing one embodiment of a vehicle seat device.

First of all, in FIG. 28, a seat body S of a vehicle seat device 210 installed in a vehicle includes a seat sitting part Sc on which buttocks of an occupant are to be placed, and a seatback part Sb which stands up from a rear portion of the seat sitting part Sc to support the back and waist of the occupant.

A seat frame SF constituting the skeleton of the seat body S includes a sitting part frame SFc constituting the skeleton of the seat sitting part Sc and a back frame SFb constituting the skeleton of the seatback part Sb, the sitting part frame SFc is covered by a seat cushion pad Pc, and the back frame SFb is covered by a seatback pad Pb. The back frame SFb is supported at the rear end portion of the sitting part frame SFc via an electric or manual reclining mechanism (either is conventionally known) to be pivotable forward and backward.

The sitting part frame SFc includes a pair of left and right side frames 211*a* laterally spaced from each other and extending in the front-rear direction, a front frame 211*b* coupling the front end portions of the side frames 211*a*, and a rear pipe 211*c* coupling the rear end portions of the side frames 211*a*. A pan frame 211*p* that connects between the side frames 211*a* is fixed to the front frame 211*b*. Further, front and rear end portions of multiple seat springs 212 which are spaced from each other in the left-right direction and extend the front-rear direction in a zigzag bent manner are provided to bridge between the front frame 211*b* and the rear pipe 211*c*.

Also, the back frame SFb includes a pair of left and right side frames 213*a* laterally spaced from each other and extending in the up-down direction, a lower lateral frame 213*b* coupling the lower end portions of the left and right side frames 213*a*, and an upper lateral frame 213*c* coupling the upper end portions of the left and right side frames 213*a*. Further, left and right end portions of multiple seat springs 214 are provided to bridge between the left and right side frames 213*a*, and headrest support parts 213*ch* for supporting the headrest are fixedly provided on the upper lateral frame 213*c*.

Referring to FIGS. 29 to 35 also, the vehicle seat device 210 includes a base body 240 which functions as a base frame thereof at the lowest part, and the base body 240 is formed rectangular in plan view, with a large circular hole 240*h* at the central part. A pair of left and right movable rails 215 extending in the front-rear direction are secured to the lower surfaces of the left and right side portions of the base body 240, respectively, and these movable rails 215 are respectively supported to be slidable forward and backward by a pair of left and right fixed rails 217 which are secured to the floor portion 216 of the vehicle body to extend in the front-rear direction.

In this way, the movable rails 215 and the fixed rails 217 cooperate with each other to constitute a front-rear slide mechanism SL which couples the base body 240 to the floor portion 216 to be supported thereon such that the base body 240 is slidable only forward and backward. Thus, this front-rear slide mechanism SL constitutes a coupling part that couples the base body 240 to the floor portion 216.

Between each movable rail 215 and the corresponding fixed rail 217, a conventionally known front-rear position adjustment mechanism (not shown in the drawings) which can arbitrarily adjust and fix the front-rear position of the movable rail 215 (namely, the base body 240, and hence the seat body S) is provided, and the front-rear position adjustment mechanism is manually operated with an operation lever 218 which is interlockingly coupled thereto and protrudes forward of the lower portion of the seat sitting part Sc.

Note that the aforementioned front-rear position adjustment mechanism may be omitted, and in such a case, the base body 240 is fixed on the floor portion 216 of the vehicle body such that the front-rear position thereof is not adjustable and the fixed part constitutes the coupling part.

Further, between the base body 240 and the seat sitting part Sc, a seat rotation mechanism R that supports the seat sitting part Sc (and hence the seat body S) to be rotatable about a vertical axis is provided. Namely, a rotary support body 230 which is rotatable together with the seat sitting part Sc is disposed above the base body 240, and the rotary support body 230 is secured (for example, fastened by multiple sets of bolts 231*b* and nuts 231*n*) to the seat sitting part Sc (more specifically, the left and right side frames 211*a* of the sitting part frame SFc) at all four corner portions thereof.

Thus, the bolts 231*b* and the nuts 231*n* constitute joint parts 231 that join the seat body S to the rotary support body 230. Note that by securing the head of each bolt 231*b* to the rotary support body 230 (for example, by welding), each bolt 231*b* may be embodied as a stud bolt erected from the upper surface of the rotary support body 230.

The rotary support body 230 is formed rectangular in plan view with a large circular hole 230*h* at the central part, and a bearing 245 (for example, a ball bearing) for supporting the rotary support body 230 to be rotatable about a vertical axis is interposed between the inner peripheral parts of the rotary support body 230 and the base body 240.

A circular ring-shaped base plate 241 integrally having a lower ball receiving recess of the bearing 245 overlaps with and is secured to the upper surface of the inner peripheral portion of the base body 240 (for example, by bolts), and the bearing 245 is supported by the inner peripheral portion of the base body 240 via the base plate 241. On the other hand, the rotary support body 230 integrally has, on the lower surface of the inner peripheral portion thereof, an upper ball receiving recess of the bearing 245, and the upper surface of the inner peripheral portion of the rotary support body 230 is held in a rotationally slidable manner by an annular holding plate 247 via a slider 246 having a circular annular shape.

The holding plate 247 integrally includes an outer peripheral upright wall 247*w* having a cylindrical shape, a slider holding part 247*s* connected to the lower end of the outer peripheral upright wall 247*w*, and an inward flange part 247*f* connected to the inner peripheral end of the slider holding part 247*s*, and the flange part 247*f* overlaps with and is secured to the inner peripheral portion of the base plate 241 (and hence the base body 240) by multiple fixtures 248 (for example, rivets, bolts, etc.).

Further, between the rotary support body 230 and the base body 240, a lock mechanism L which can selectively lock the rotary support body 230 (and hence the seat body S) in one of multiple rotation positions, a rattling suppression mechanism G which, in a state in which the rotation position of the rotary support body 230 is locked by the lock mechanism L, suppresses rattling of the rotary support body 230, and an interlocking mechanism I which normally allows the rattling suppression function of the rattling suppression mechanism G to be effectively demonstrated but interlocks the rattling suppression mechanism G with the lock mechanism L so as to temporarily disable the aforementioned rattling suppression function in response to unlock operation of the lock mechanism L are interposed. In the following, concrete examples of these mechanisms L, G, I will be described in order.

The lock mechanism L includes a bell-cranked lock lever 251 having an intermediate portion supported by a pivot 251$p$ at a front portion of the rotary support body 230 so as to be pivotally operable, a lock spring 253 which is stretched between the lock lever 251 and the rotary support body 230 to urge the lock lever 251 in a lock direction (counterclockwise in FIGS. 30 and 31), a lock hole 232 provided in a short-cylindrical intermediate upright wall 230$w$ of the rotary support body 230, lock holes 242 provided in the outer peripheral upright wall 247$w$ of the holding plate 247, and a locking claw 254 protrudingly provided on the tip arm 251$a$ of the lock lever 251 to be capable of being engaged with and disengaged from the lock holes 232, 242.

Figure 30:
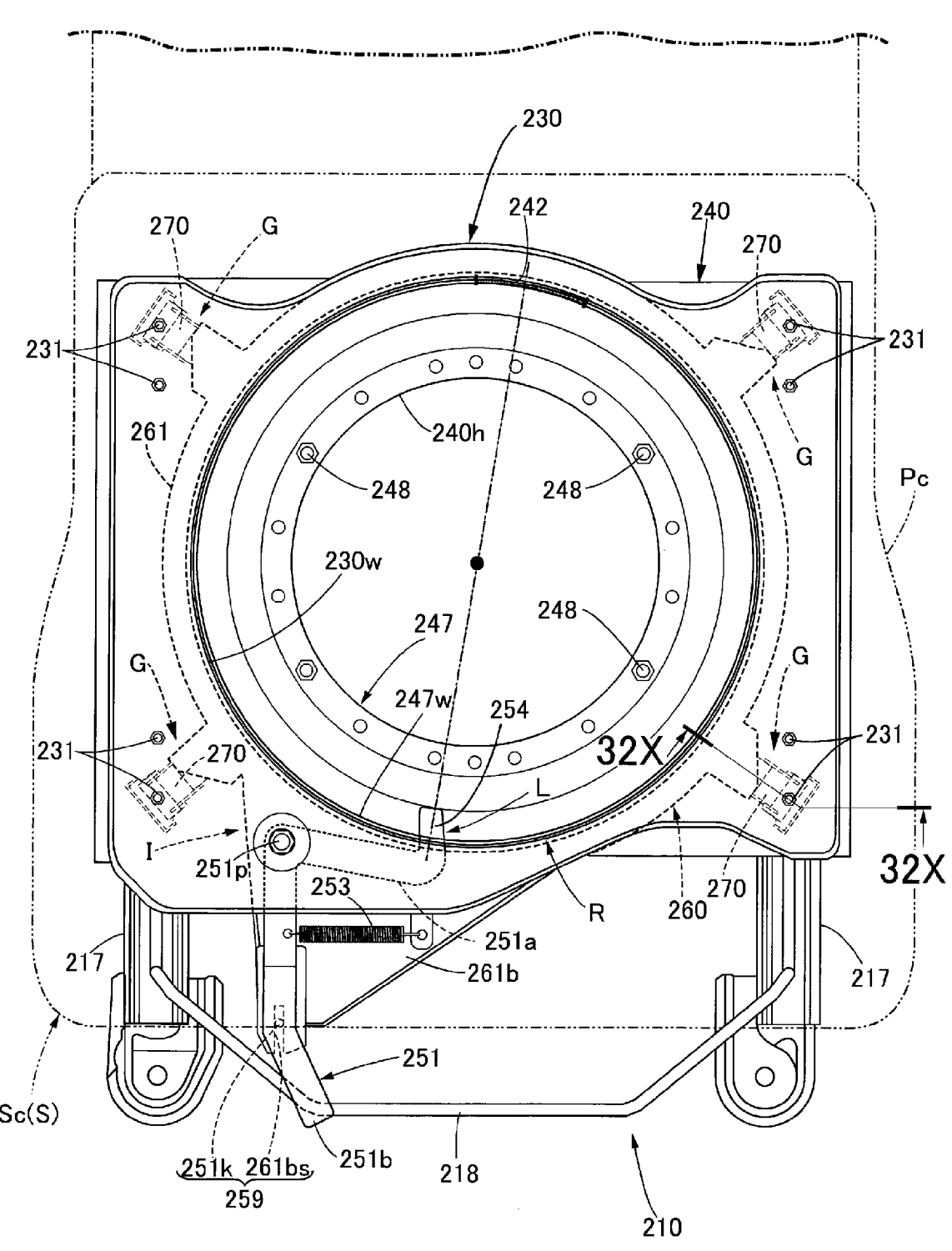
FIG. 30 a view showing a lock state of a lock mechanism as seen in a direction of arrow 30X in FIG. 29.
Figure 31:
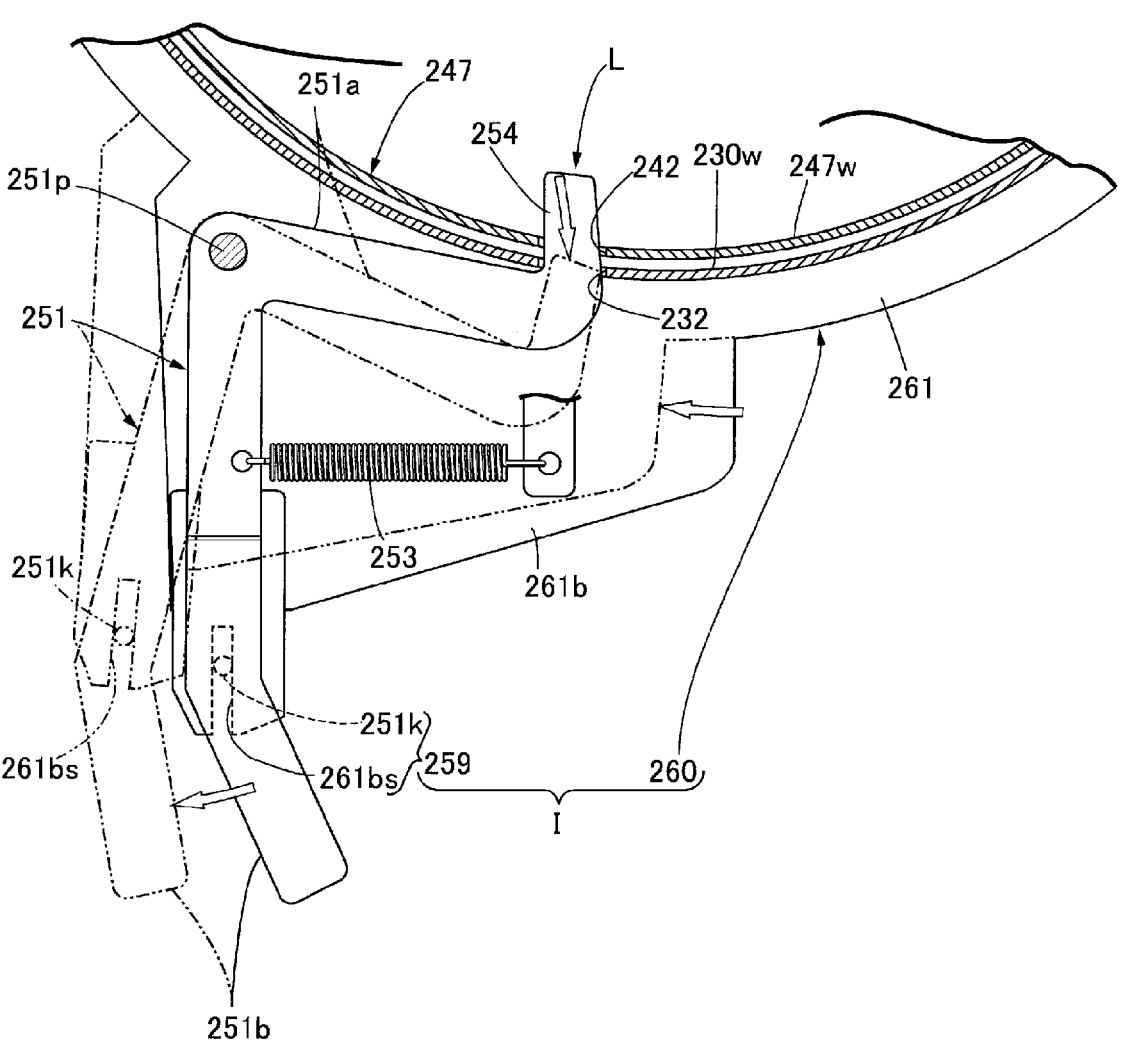
FIG. 31 is an enlarged plan sectional view of a main part of the lock mechanism, where the solid line shows the lock state and the chain line shows the unlock state.
Figure 32:
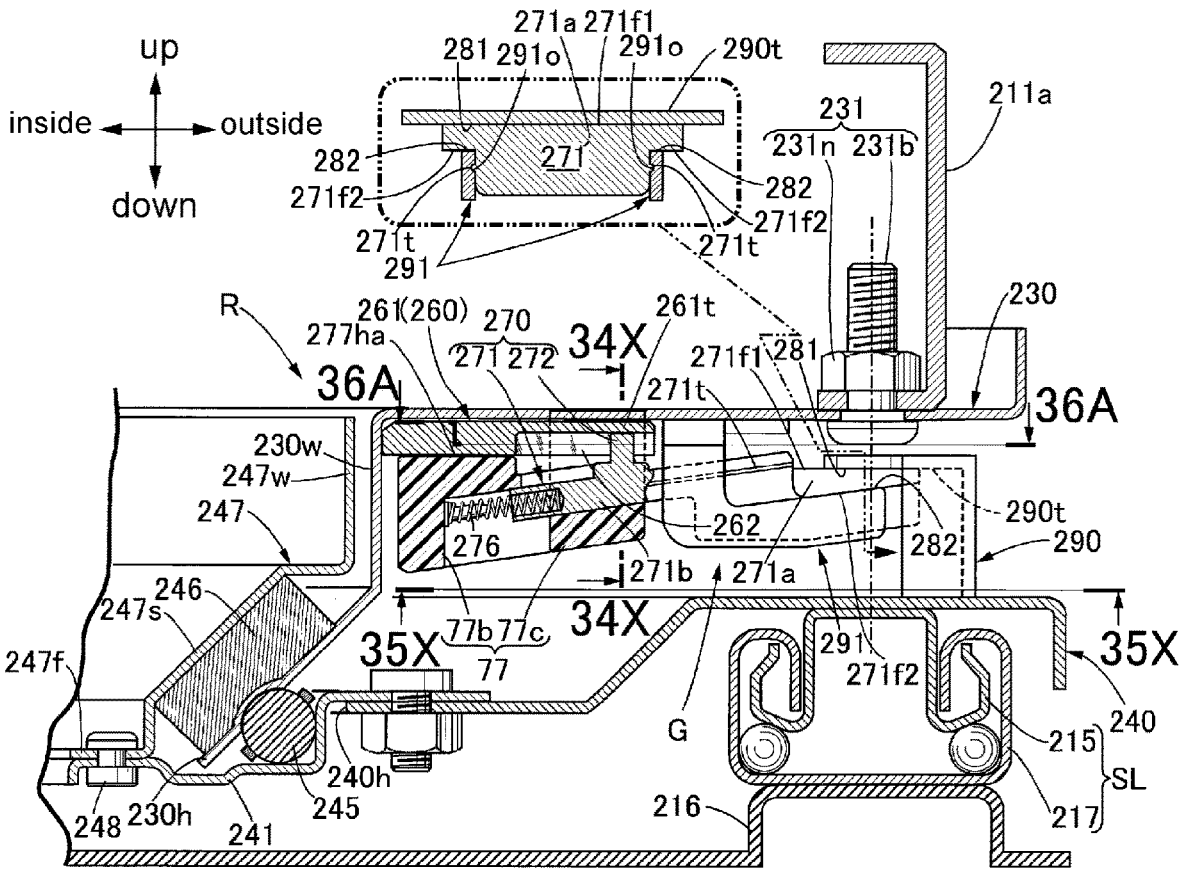
FIG. 32 is an enlarged sectional view taken along line 32X-32X in FIG. 30 (the lock mechanism is in the lock state).

In this way, when the lock lever 251 is in the lock operation position shown by the solid line in FIGS. 30 to 32, the lock mechanism L locks the rotation position of the rotary support body 230 (and hence the seat body S) with the locking claw 254 engaged with the lock holes 232, 242. Also, when the lock lever 251 is unlock-operated and is in the unlock position shown by the chain line in FIG. 31 and in FIG. 33, the locking claw 254 is released from at least the lock hole 242, whereby the rotation of the rotary support body 230 relative to the base body 240 is permitted, and accordingly, the seat body S can be rotated to an arbitrary rotation position.

Figure 29:
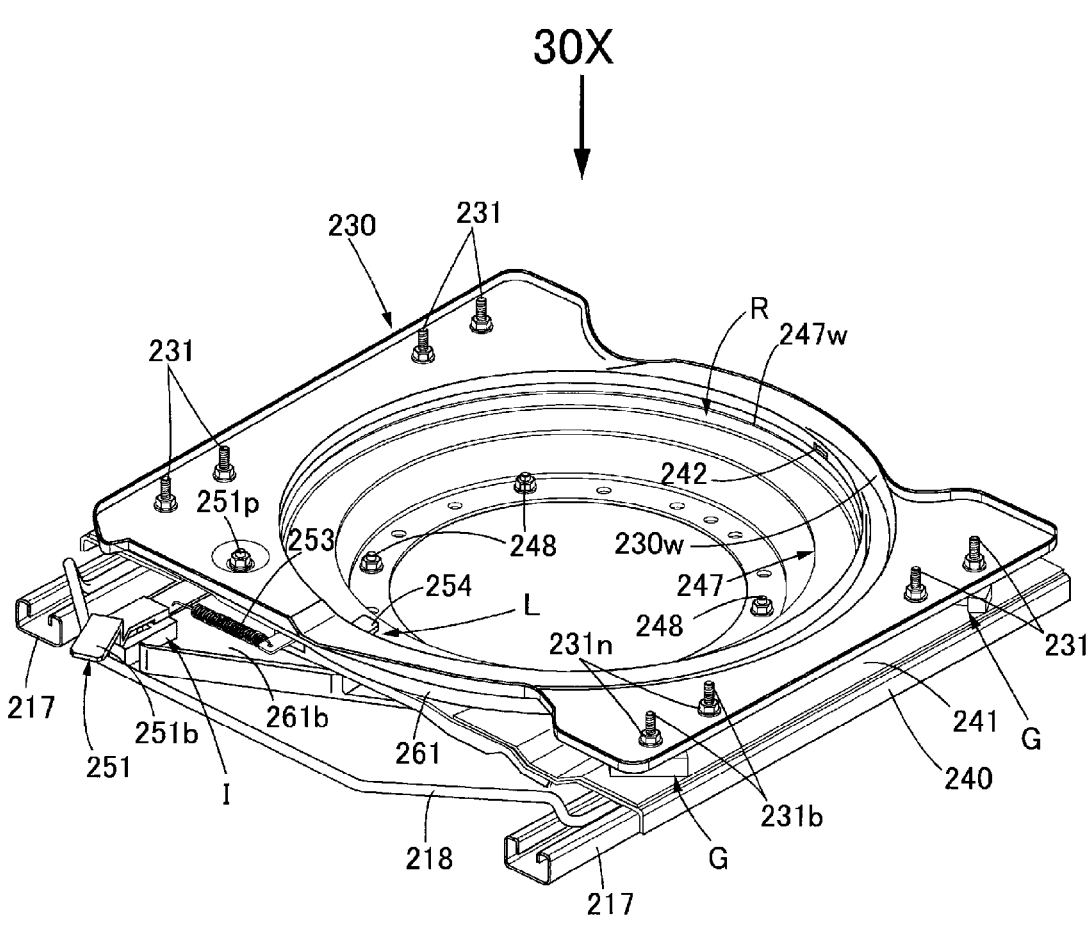
FIG. 29 is a perspective view showing a main part (particularly, the rotary support body and elements below it) of a seat sitting part of the seat device.

Only one lock hole 232 is provided near the lock lever 251 to correspond to the locking claw 254, but multiple lock holes 242 are provided corresponding to multiple rotation positions of the seat body S to be locked by the lock mechanism L. For example, in the illustrated example, the rotation position of the seat body S can be selected in two stages from two rotation positions, namely, a front rotation position where the seat body S faces forward and a back rotation position which is phase-shifted by 180 degrees therefrom to face rearward, and accordingly, the lock holes 242 are provided in a front portion and a rear portion of the holding frame 247 in positions phase-shifted by 180 degrees from each other, as shown in FIGS. 29 and 30.

A base part arm 251$b$ of the lock lever 251 protrudes forward from below the front portion of the seat sitting part Sb and functions as an operation lever that can be manually operated by the occupant. Also, the base part arm 251$b$ of the lock lever 251 is interlockingly coupled to the interlocking mechanism I, as described later.

The interlocking mechanism I includes an interlocking member 260 which is disposed radially outward of and concentrically with the bearing 245 and is supported by the rotary support body 230 in a rotationally slidable manner, and a linkage mechanism 259 which links pivoting operation of the lock lever 251 to the interlocking member 260.

The interlocking member 260 is integrally provided with an interlocking member main body 261 which is formed in a circular ring plate-shape and rotates relative to the rotary support body 230 in accordance with locking/unlocking of the lock mechanism L, and a drive part 262 which is integrally connected to the interlocking member main body 261 and drives a main body part 271 of a later-described rattling suppression member 270 toward the suppression release position via a driven part 272 in response to the unlock operation of the lock mechanism L.

An inner peripheral portion of the interlocking member main body 261 is fitted on and supported by an outer periphery of an intermediate upright wall 230$w$ of the rotary support body 230 rotatably and concentrically, and a lower surface of the interlocking member main body 261 is slidably supported on upper surfaces of base portions 277$b$ of later-described spring support members 277. Further, a front portion of an outer periphery of the interlocking member main body 261 is integrally provided with a bracket part 261$b$ which protrudes radially outward (forward).

The linkage mechanism 259 is provided with an elongated hole or slit 261$bs$ formed in a tip of the bracket part 261$b$, and an engagement pin 251$k$ which slidably engages with the elongated hole or slit 261$bs$ and is fixedly provided on an intermediate portion of the base part arm 251$b$ of the lock lever 251. When the lock lever 251 is unlock-operated in an unlocking direction (clockwise or white arrow direction in FIG. 31), for example, the rotational force of the lock lever 251 is transmitted to the bracket part 261$b$ while the engagement pin 251$k$ slides in the elongated hole or slit 261$bs$, whereby the interlocking member 260 is caused to rotate in the same direction by a predetermined angle.

Figure 33:
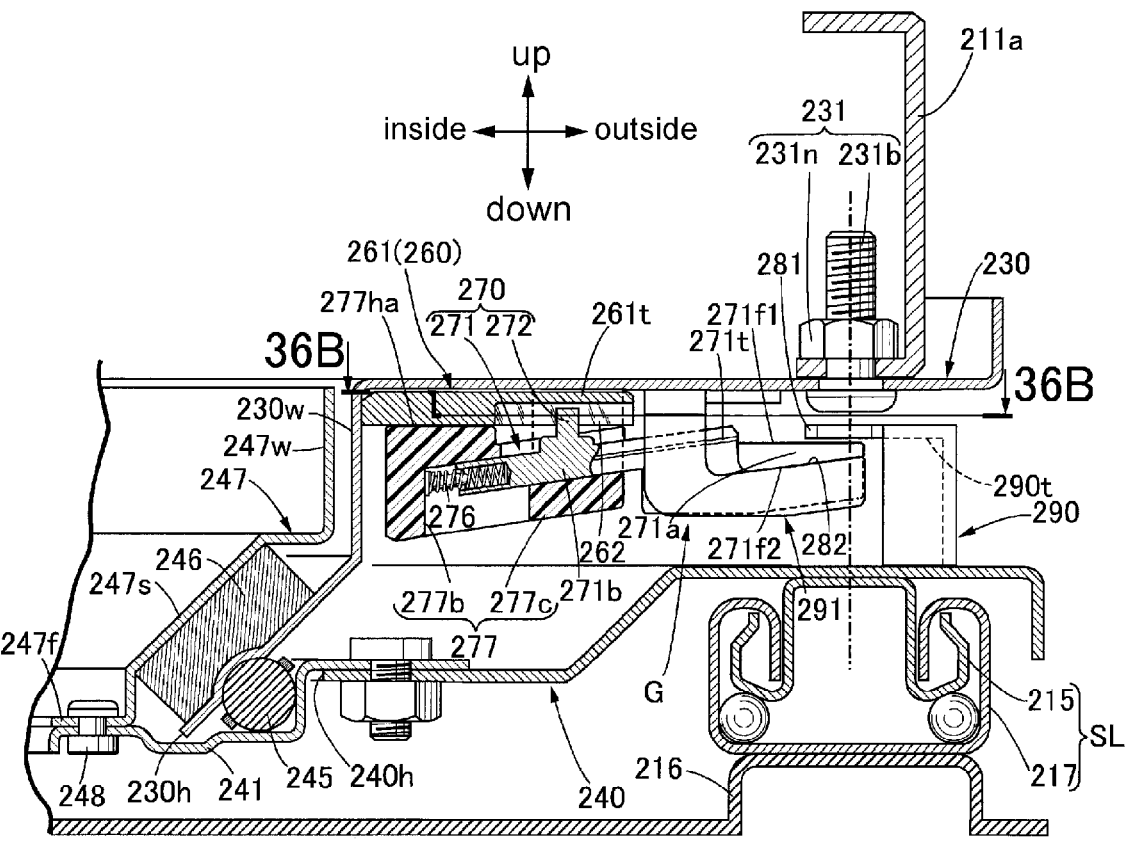
FIG. 33 is an enlarged sectional view taken along line 32X-32X in FIG. 30 (the lock mechanism is in the unlock state).
Figure 34:
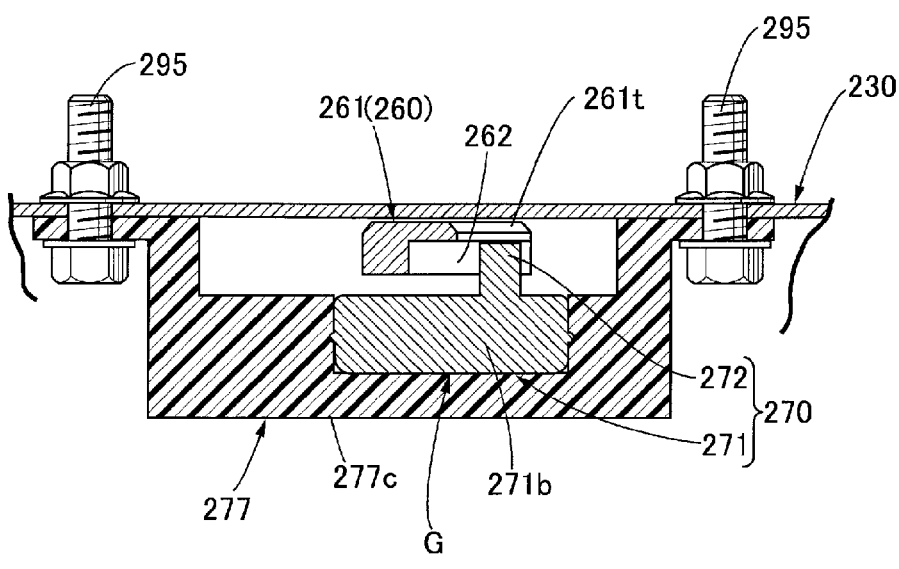
FIG. 34 is an enlarged sectional view taken along line 34X-34X in FIG. 32.
Figure 35:
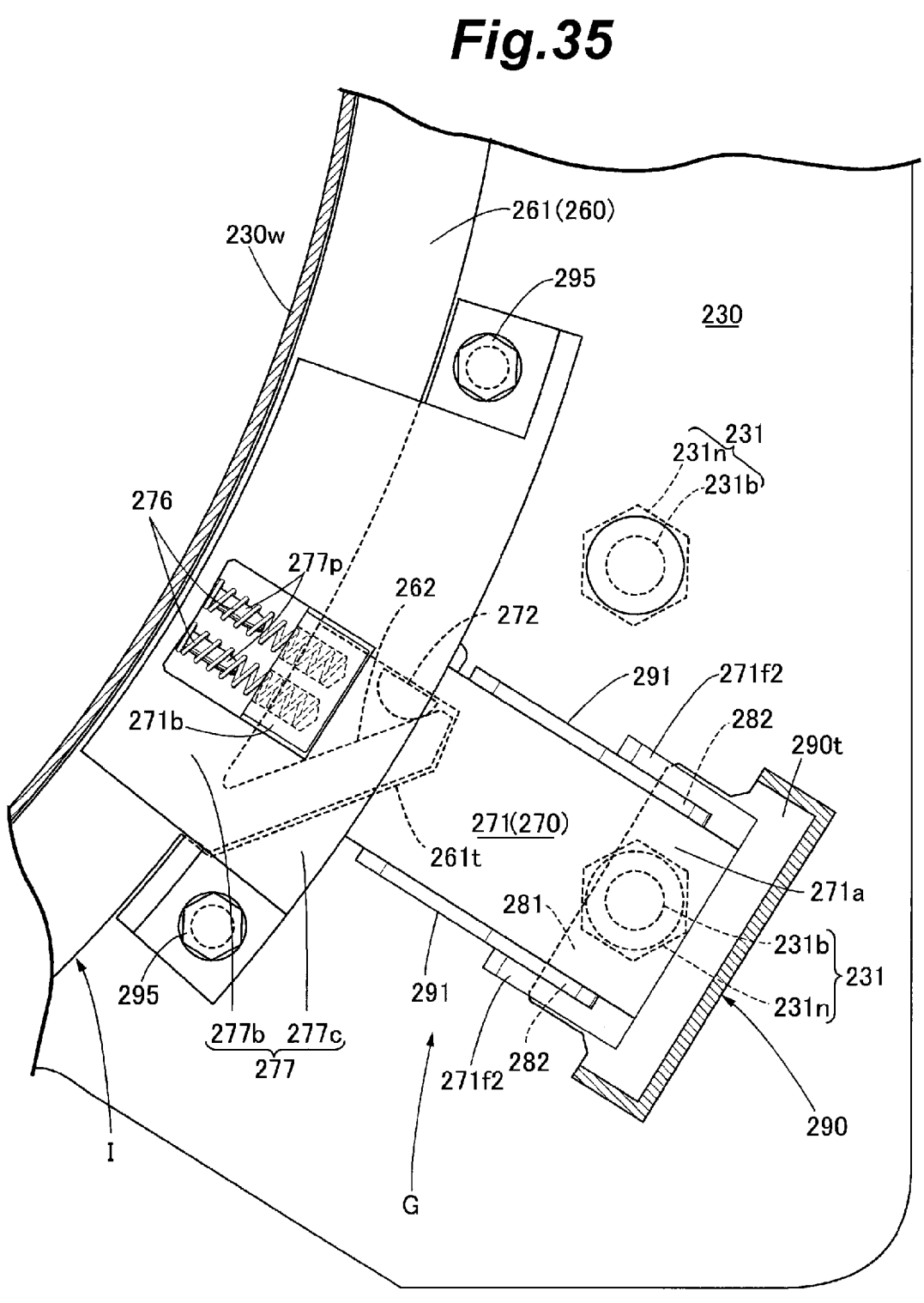
FIG. 35 is an enlarged sectional view taken along line 35X-35X in FIG. 32.

Thus, the interlocking mechanism I transmits the motion of the lock lever 251 to the rattling suppression member 270 via the interlocking member 260, and when the lock lever 251 is unlock-operated in the unlocking direction (white arrow direction in FIG. 31) against the elastic force of the lock spring 253, for example, in response to this operation the interlocking mechanism I causes the interlocking member 260 to rotate in a direction to temporarily disable the rattling suppression member 270 (namely, to hold in the suppression release position) as shown in FIG. 33 and FIG. 36(B).

Next, mainly referring to FIG. 32 to FIG. 36, one example of the rattling suppression mechanism G for suppressing the rattling of the rotary support body 230 in a state in which the rotation position of the rotary support body 230 is locked by the lock mechanism L will be described. The rattling suppression mechanism G includes, as a main component part thereof, a rattling suppression member 270 which suppresses the aforementioned rattling by closely contacting the base body 240 and the rotary support body 230. Namely, the rattling suppression member 270 is positioned radially outward of the bearing 245, and moreover is provided at four corner portions of the rotary support body 230 which is substantially rectangular in plan view to be slidable in the radial direction.

Further, at least a part of the rattling suppression member 270 is disposed in a position which, in plan view, overlaps with a joint part 231, which includes a bolt 231$b$, between the seat body S and the rotary support body 230, and also overlaps with a coupling part (namely, the front-rear slide mechanism SL) with which the base body 240 is coupled to the floor portion 216.

As is apparent in FIGS. 32 to 36, the main body part 271 of the rattling suppression member 270 is formed to be flattened vertically and elongated in the radial direction and is supported on the rotary support body 230 to be slidable in the radial direction. A tapered tip 271a of this main body part 271 is configured to be insertable to and removable from between a first receiving part 281 fixed to the base body 240 and a second receiving part 282 fixed to the rotary support body 230 and to be capable of being pushed in and press-contacted between them like a wedge.

Namely, a horizontal and flat upper surface of the tip 271a of the main body part 271 serves as a first pressure contact surface 271f1 which can be press-contacted with the first receiving part 281 and lower surfaces of both widthwise side portions of the tip 271a serve as a pair of the second pressure contact surfaces 271f2 which can be press-contacted with the second receiving part 282. The second pressure contact surfaces 271f2 are each formed as an inclined surface that is inclined upward toward the tip of the main body part 271.

An upper surface of the base portion 271b of this main body part 271 is provided with a driven part 272 which protrudes upward and receives, from the interlocking member 260 (more specifically, the drive part 262), a driving force for driving the main body part 271 in the direction opposite to the direction of pushing in between the first and second receiving parts 281, 282 to disable the rattling suppression member 270 at the time of unlock operation of the lock mechanism L.

The first receiving part 281 is constituted of a ceiling wall 290t of a frame body 290 which is formed in a box-like shape open on a radially inner side (namely, on a side facing the main body part 271) and which is fixed upright on the base body 240. The ceiling wall 290t extends radially inward so as to ensure a sufficient contact surface area with the first pressure contact surface 271f1 of the main body part 271.

The second receiving part 282 is constituted of inclined upper surfaces of tips of a pair of support frames 291 which are each formed in an L-shape in side view and provided on the lower surface of the rotary support body 230 to protrude downward, and slidably contacts and supports each of the pair of second pressure contact surfaces 271f2 of the rattling suppression member 270. The two support frames 291 support, on respective base portion sides, an intermediate portion of the main body part 271 to be slidable in the radial direction.

One of each pair of opposing surfaces (namely, sliding surfaces) of the inner side surfaces of the base portions of the two support frames 291 and the left and right side surfaces of the main body part 271 is formed with a ridge 271t extending in the sliding direction while the other is formed with a recessed groove 291o engaged with the ridge 271t by concavo-convex engagement. Thereby, the aforementioned support frame 291 which supports the main body part 271 on the rotary support body 230 to be slidable in the radial direction is also used as the second receiving part 282 which performs rattling suppression function in cooperation with the rattling suppression member 270, and thus, the structure can be simplified accordingly.

Also, a part of the main body part 271 and parts of the first and second receiving parts 281, 282 overlap, in plan view, with a joint part between the seat body S and the rotary support body 230. In this case, the main body part 271 of the rattling suppression member 2270 can be formed to be elongated in the radial direction and thereby can be extended to a position directly under the joint part 231 without difficulty.

Further, in the embodiment, multiple sets of rattling suppression members 270 and multiple spring support members 277 are provided to be spaced in the circumferential direction of the rotary support body 230 (namely, at four corners of the rotary support body 230). Thereby, the rattling suppression members 270, the first and second receiving parts 281, 282, etc. can be arranged compactly and without difficulty by using the space at the four corners of the rotary support body 230 and the base body 240.

As shown in FIGS. 32 to 36, the driven part 272 of the rattling suppression member 270 is formed in a shape of a pin provided on the upper surface of the base portion of the main body part 271 to protrude upward, and the surface of the driven part 272 opposing the drive part 262 is formed as a semi-cylindrical surface. Also, the drive part 262 of the interlocking member 260 is constituted of a flat plate-shaped cam body which is inclined toward the driven part 272 while extending from the outer peripheral portion of the interlocking member main body 261 outward in the radial direction. The upper end of the driven part 272 is integrally connected to a flat reinforcement plate part 261t which integrally extends radially outward from an upper portion of an outer periphery of the interlocking member main body 261, whereby the driven part 272 is reinforced.

Figure 36:
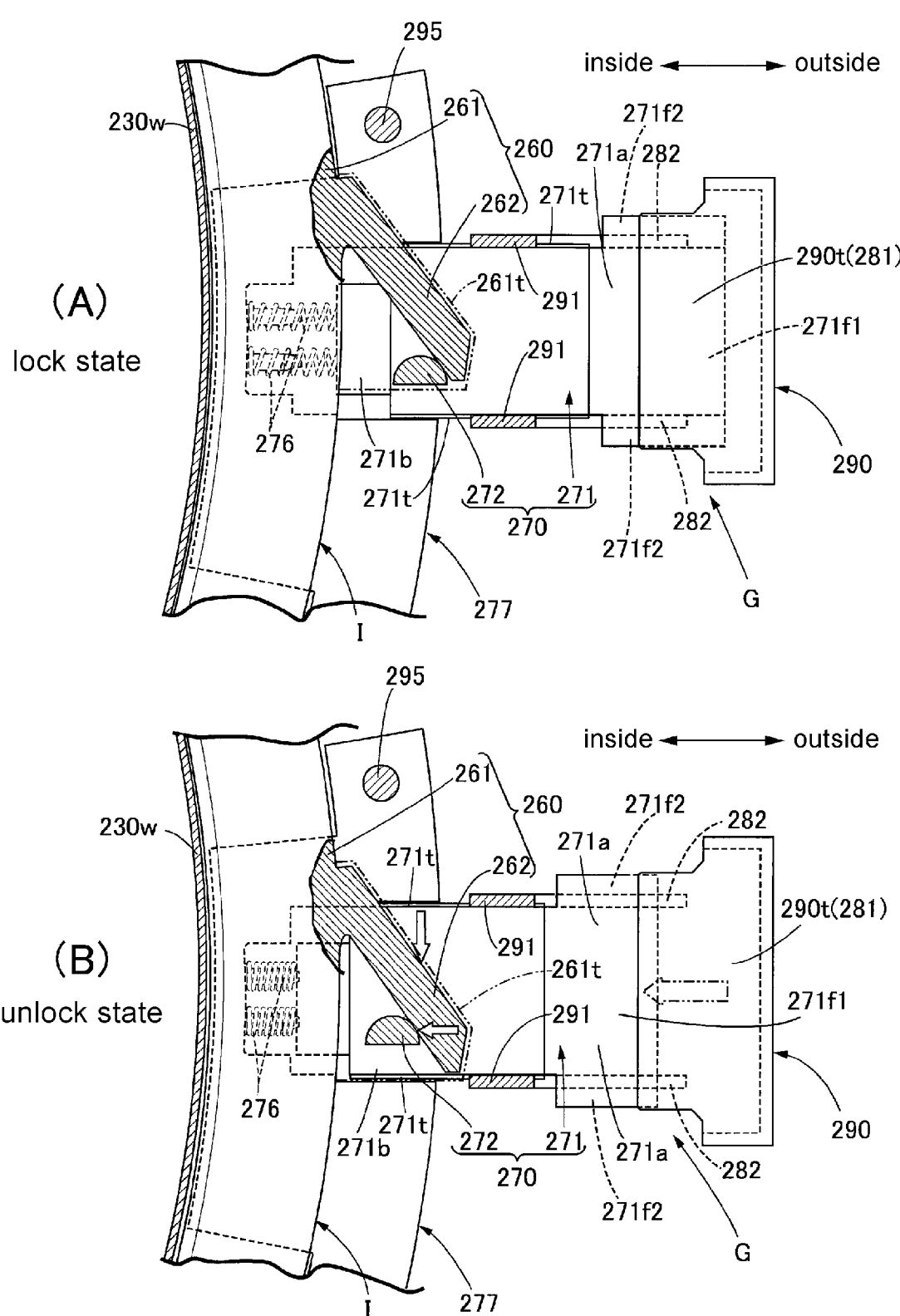
FIG. 36 is a plan sectional view showing a linkage structure between the interlocking member and the rattling suppression member, where (A) is a diagram showing the lock mechanism in the lock state (an enlarged sectional view taken along line 36A-36A in FIG. 32) and (B) is a diagram corresponding to FIG. 36(A) and showing the lock mechanism in the unlock state (an enlarged sectional view taken along line 36B-36B in FIG. 33).

Thus, as shown in FIG. 36, the drive part 262 of the interlocking member 260 which rotates in conjunction with the unlock operation of the lock mechanism L can drive the driven part 272 (and hence the main body part 271) radially inward while making it slide thereon, whereby the main body part 271 can be pulled out from between the first and second receiving parts 281, 282 (namely, the rattling suppression function of the rattling suppression member 270 can be disabled), and along with this pull-out, rotation of the rotary support body 230 to an arbitrary rotation position is permitted.

Further, in the embodiment, springs 276 which give the rattling suppression member 270 a radially outward elastic force capable of pushing the main body part 271 in between the first and second receiving parts 281, 282 to be press-contacted therewith and a spring support member 277 which supports the base ends of the springs 276 on the rotary support body 230 are provided radially inward of the main body part 271. The spring support member 277 has a base portion 277b on a radially inner side thereof such that both circumferential end portions of the base portion 277b are fixed with bolts 295 of the rotary support body 230, and support pins 277p on which the base ends of the springs 276, each consisting of a coil spring, are fitted are protrudingly provided on the base portion 277b. Further, the spring support member 277 slidably supports, at a tip 277c thereof, the lower surface of the base portion of the main body part 277.

Thus, in a state in which the lock mechanism L locks the rotary support body 230 in a desired rotation position, the aforementioned springs 276 which are supported on the rotary support body 230 via the spring support member 277 can exert a wedge effect by pushing, according to the elastic force thereof, the main body part 271 (the rattling suppression member 270) in between the first and second receiving parts 281, 282, whereby the rattling of the rotary support body 230 (and hence the seat body S) can be suppressed. In addition, the upper surface of the base portion 277b of the spring support member 277 has an interlocking member receiving part 277ha which supports the interlocking member 260 (the interlocking member main body 261) to be relatively rotatable.

Thus, the spring support member 277 for supporting the base ends of the springs 276 can be also used as each support means for slidably supporting the interlocking member 260 and the rattling suppression member 270 (the main body part 271), and this can contribute to simplifying the structure.

Further, the first and second receiving parts 281, 282 are arranged to oppose each other in the up-down direction so that when the main body part 271 is pushed in and press-contacted between the two receiving parts 281, 282, the main body part 271 can be reliably sandwiched in the up-down direction, and therefore, vertical rattling of the main body part 271 (the rattling suppression member 270) can be suppressed more effectively.

Next, operation of the embodiment will be described. The rattling suppression member 270 of the embodiment is disposed radially outward of the bearing 245, and according to this arrangement, the contact action points of the rattling suppression member 270 with the rotary support body 230 and the base body 240 can be located distant from the rotational center of the rotary support body 230. Therefore, the rattling suppression effect of the rattling suppression member 270 can be exerted more strongly than in the conventional device due to the lever ratio from the rotational center.

Further, there is a risk that due to weight shift of the occupant seated on the seat sitting part Sc in the forward, rearward, leftward, and rightward directions, the distribution of load received by the rotary support body 230 from the seat body S may become uneven so that rattling may be generated between the rotary support body 230 and the base body 240. In this case, in the embodiment, since at least a part of the rattling suppression member 270 is disposed in a position overlapping, in plan view, with the joint part 231, which includes a bolt 231b, between the seat body S and the rotary support body 230, the rattling suppression member 270 which is right under the joint part 231 (namely, the load input point from the seat body S to the rotary support body 230) can exert the rattling suppression effect more effectively. Therefore, rattling of the rotary support body 230 can be suppressed effectively.

In addition, at least a part of the rattling suppression member 270 is disposed in a position overlapping, in plan view, with the coupling part (the front-rear slide mechanism SL) with which the base body 240 is coupled to the vehicle body floor portion 213. Namely, the rattling suppression member 270 is arranged to also overlap, in plan view, with the coupling part (the front-rear slide mechanism SL) between the base body 240, which receives the rattling suppression member 270 via the first receiving part 281, and the vehicle body floor portion 213, whereby the rattling suppression effect can be exerted more effectively and rattling of the rotary support body 230 can be suppressed more efficiently.

Further, the rotary support body 230 and the base body 240 of the embodiment are formed substantially rectangular in plan view, the rattling suppression member 270 includes the main body part 271 which is supported at each of the four corner portions of the rotary support body 230 to be slidable in the radial direction and is movable between a predetermined rattling suppression position and a predetermined suppression release position, and the main body part 271 has a tapered tip 271a which can be pushed in like a wedge and press-contacted between the first receiving part 281 fixed to each of the four corner portions of the base body 240 and the second receiving part 282 fixed to each of the four corner portions of the rotary support body 230.

Thereby, the rattling suppression member 270 and the first and second receiving parts 281, 282 which receive this can be arranged compactly by using the dead space at the four corners of the rotary support body 230 and the base body 240 each having a rectangular shape. Also, even when the radially slidable main body part 271 of the rattling suppression member 270 is formed longer in the sliding direction (radial direction), the main body part 271 not only can be arranged at each of the four corner portions of the rotary support body 230 without difficulty but also can be extended to directly under the joint part 231 positioned at each of the four corner portions without difficulty.

Further, the spring support member 277 which supports the spring 276 for always urging the main body part 271 of the rattling suppression member 270 toward the rattling suppression position is fixed at each of the four corner portions of the rotary support body 230, and the main body part 271 of the rattling suppression member 270 is supported by the spring support member 277 to be radially slidable. Thereby, the spring support member 277 is also used as sliding guide means for the rattling suppression member 270, and the structure of the device can be simplified accordingly.

Further, the interlocking member 260 is integrally provided with the interlocking member main body 261 which is formed in a circular ring plate shape, is disposed radially outward of and concentrically with the bearing 245, and is supported by the rotary support body 230 to be relatively rotatable in accordance with locking/unlocking of the lock mechanism L, and the drive part 262 which is connected to the interlocking member main body 261 and drives the main body part 271 to the suppression release position in response to the unlock operation of the lock mechanism L. Thereby, regardless of the circumferential position of the lock mechanism L, the lock mechanism L and the rattling suppression member 270 can be linked by the interlocking member 260, and the degree of design freedom of the lock mechanism L is increased accordingly.

Further, since the support frames 291 integrally including the second receiving part 282 and fixed to the four corner portions of the rotary support body 230 support the main body part 271 to be slidable in the radial direction, the support frames 291 which also serve as the second receiving part 282 are also used as sliding guide means for the rattling suppression member 270, and the structure of the device is simplified accordingly.

Further, since the interlocking member main body 261 is supported in a rotationally slidable manner by the spring support member 277 fixed at each of the four corner portions of the rotary support body 230, the spring support member 277 is also used as sliding support means for the interlocking member 260, and the structure of the device is simplified accordingly.

In the foregoing, embodiments of the present invention have been described, but the present invention is not limited to them, and various design modifications may be made without departing from the spirit thereof.

For example, in the embodiments, an example in which the rotation position of the seat body S can be selected in two stages from two rotation positions, namely, the front rotation position where the seat body S faces forward and the back rotation position which is phase-shifted by 180 degrees therefrom to face rearward, was shown, but the rotation positions of the seat body S that can be selected arbitrarily are not limited to the embodiments. Namely, the rotation positions may be differently set or three or more rotation positions may be set, and in such cases, the opening positions of the lock holes 242 of the base body 240 may be changed or added in accordance with the set rotation positions.

The invention claimed is:

1. A vehicle seat device, comprising:

a base member;

a rotating member rotatably supported by the base member via an annular rotary support part;

a seat cushion frame provided on the rotating member;

a pressure receiving member supported by the seat cushion frame to receive a load of a seat cushion; and a rotary drive actuator which exerts power to rotate the rotating member, wherein the pressure receiving member includes a pressure receiving member main body having a plate-like shape, the pressure receiving member main body is formed with a connection port, the rotary drive actuator and the connection port are arranged inside the rotary support part in plan view, and a blower of an air conditioner that supplies air to the seat cushion from below is connected to the connection port.

2. The vehicle seat device according to claim 1, wherein the rotary drive actuator is disposed to avoid a position overlapping with the connection port and the blower in plan view.

3. The vehicle seat device according to claim 2, wherein an actuator support plate that supports the rotary drive actuator is fixed to the rotating member so as to avoid a position overlapping with the connection port and the blower in plan view.

4. The vehicle seat device according to claim 3, wherein the seat cushion frame comprises a pair of side frames spaced from each other and extending in parallel to each other, and the rotary drive actuator is disposed in a position displaced from the connection port and the blower in a longitudinal direction of the side frames in plan view.

5. The vehicle seat device according to claim 4, wherein the rotary drive actuator is disposed in a position forward of a rotational center of the rotating member in a state in which the seat cushion frame is in a forward-facing position where an occupant on the seat cushion faces in a forward direction of a vehicle, and the connection port and the blower are arranged in positions rearward of the rotary drive actuator.

6. The vehicle seat device according to claim 1, wherein the connection port is formed in the pressure receiving member in a shape surrounding the rotational center of the rotating member in plan view.

7. The vehicle seat device according to claim 6, wherein the blower is mounted on a lower surface of the pressure receiving member while being disposed directly under the connection port.

8. The vehicle seat device according to claim 1, wherein a seating sensor is mounted on the pressure receiving member in a position above the rotary drive actuator and not overlapping with the connection port and the blower in plan view.

9. The vehicle seat device according to claim 1, wherein in a state in which the seat cushion frame is in a forward-facing position where an occupant on the seat cushion faces in a forward direction of a vehicle, the rotary drive actuator is disposed rearward of another actuator disposed to correspond to a front portion of the seat cushion frame while avoiding overlap with the other actuator in plan view.

10. The vehicle seat device according to claim 1, wherein a bag member made of a flexible material is interposed between the pressure receiving member main body and the seat cushion, and an upper surface of the bag member that faces the seat cushion is formed with multiple vent holes, and a lower surface of the bag member is formed with an air inlet connected to the connection port.

* * * * *